(12) United States Patent
Chen

(10) Patent No.: US 7,134,236 B2
(45) Date of Patent: *Nov. 14, 2006

(54) GELATINOUS ELASTOMER COMPOSITIONS AND ARTICLES FOR USE AS FISHING BAIT

(75) Inventor: John Y. Chen, Pacifica, CA (US)

(73) Assignee: Applied Elastomerics, Inc., South San Francisco, CA (US)

( * ) Notice: Subject to any disclaimer, the term of this patent is extended or adjusted under 35 U.S.C. 154(b) by 305 days.

This patent is subject to a terminal disclaimer.

(21) Appl. No.: 10/199,361

(22) Filed: Jul. 20, 2002

(65) Prior Publication Data

US 2002/0188057 A1 Dec. 12, 2002

Related U.S. Application Data

(63) Continuation-in-part of application No. 09/896,047, filed on Jun. 30, 2001, which is a continuation-in-part of application No. 09/274,498, filed on Mar. 23, 1999, (Continued)

(51) Int. Cl.
- *A01N 15/00* (2006.01)
- *A01K 85/00* (2006.01)
- *C08F 175/00* (2006.01)

(52) U.S. Cl. .................. 43/42.24; 424/84; 524/81; 524/270; 524/274; 524/284; 524/313; 524/450; 524/505

(58) Field of Classification Search ............ 43/42, 43/42.32, 42.33, 42.34, 42.24; 524/274, 524/505, 313, 81, 450, 270, 284; 424/84
See application file for complete search history.

(56) References Cited

U.S. PATENT DOCUMENTS 2,993,874 A 7/1961 Hoel .................. 260/27

FOREIGN PATENT DOCUMENTS

| EP | 146163 | 11/1984 |
|---|---|---|
| EP | 285181 | 4/1988 |
| EP | 439180 | 1/1991 |
| EP | 483370 | 4/1991 |
| GB | 1268431 | 3/1972 |
| GB | 2019416 | 4/1979 |
| WO | WO8800603 | 7/1987 |
| WO | WO 88/00603 | 1/1988 |
| WO | WO9005166 | 9/1989 |
| WO | WO 90/05166 | 5/1990 |
| WO | WO 91/05014 | 4/1991 |
| WO | WO 93/05113 | 3/1993 |
| WO | WO 93/23472 | 11/1993 |

OTHER PUBLICATIONS

Allen, et al; Comprehensive Polymer Science-vol. 7; 1994; p. 416-431.

Kirk-Othmer; Encyclopedia of Chemical Technology; 1994; 4th Edition; p. 17-37.

Garder, William; Gardner's Chemical Synonyms and Trade Names; 1994.

Holden et al; Thermoplastic Elastomers; 2nd Edition; 1996; Chapter 1—p. 1-26 ; Chapter 3—p. 27-70; Chapter 4—p. 71-100.

"Styrene-Diene Triblock Copolymers: Orientation Conditions and Mechanical Properties of the Oriented Materials" A. Weill and R. Pixa, Journal of Polymer Science Polymer Symposium 58, 381-394 (1977).

Septon Trade Literature, Kurraray Co., Ltd. 1995.8 (4,000) 15 Pages.

SC:1102-89 Shell Chemical Technical Bulletin"KRATON® Thermoplastic Rubber in Oil Gels", Apr. 1989.

Septon, High Performance Thermoplastic Rubber, Kurrary Co., Ltd., 1995.

Kraton Polymers, May 1997, Shell Chemical Company.

Silipos manual, 1994.

*Melt Miscibility In Blends Of Polypropylene, Polystryenhe-Block-Poly (Ethylene-Sat-Butylene)-Block-Polystyrene, And Processing Oil From Melting Point Depression*, Ohlesson et al., Polymer Engineering and Science, 1996, vol. 36, No. 11.

*Blends And Thermoplastic Interpenetrating Polymer Networks Of Polyproptstyrene And Polystyrene-Block-Poly (Ethylene-Stat-Butylene)—Block-Polystyrene Triblock Copolymer. 1: Morphology And Structure-Related Properties*, Ohlesson, et al., Polymer Engineering and Science, Feb.1996, vol. 36, No. 4.

*Migration and Blooming Of Waxes To The Surface Of Rubber Vulcanizates*, Nah, et al., J. Of Polymer Science: Polymer Physics Ed., vol. 18, 511-521 (1980).

"SiloLiner" Sales literature from Knit-Rite medical (Mar. 1, 1999 three pages).

ALPS South Corporation -Gel Liners: NEW! Easy Liner ELPX, ELDT and ELFR published fact sheet downloaded from the Internet on Aug. 10, 1999.

Chung P. Park and George P. Clingerman, "Compatibilization of Polyethylene-Polystyrene blends with Ethylene-Styrene Random Copolymers", the Dow Chemical Company, May 1996.

Steve Hoenig, Bob Turley and Bill Van Volkenburgh, "Material Properties and Applications of Ethylene-Styrene Interpolymers", the Dow Chemical Company, Sep. 1996.

Y. Wilson Cheung and Martin J. Guest, "Structure, Thermal Transitions and Mechanical Properties of Ethylene/Styrene Copolymers", the Dow Chemical Company, May 1996. (17).

Teresa Plumley Karjaia, Y. Wilson Cheung and Martin J. Guest, "Melt Rheology and Processability of Ethylene/Styrene Interpolymers", the Dow Chemical Company, May 1997.

D. C. Prevorsek, et al., Origins of Damage Tolerance in Ultrastrong Polyethylene Fibers and Composites:, Journal of Polymer Science: Polymer Symposia No. 75, 81-104 (1993).

Chen, H., et al, "Classification of Ethylene-Styrene Interpolymers Based on Comonomer Content", J. Appl. Polym. Sci., 1998, 70, 109.

Alizadeh, et al., "Effect of Topological Constraints on The Crystallization Behavior of Ethylene/alpha-Olefin Copolymers", PMSE, vol., 81, pp. 248-249, Aug. 22-26, 1999.

Guest, et al., "Structre/Property Relationships of Semi-Crystalline Ethylene-Styrene Interpolymers (ESI)", PMSE, vol., 81, pp. 371-372, Aug. 22-26, 1999.

*Primary Examiner*—Herbert J. Lilling

(57) ABSTRACT

A non-tacky fishing bait made from a soft gelatinous elastomer composition comprising one or more of a linear, radial or multiblock copolymer(s) and in combination with one or more of a low and high viscosity plasticizers in sufficient amounts to achieve a gel rigidity of from about 20 gram Bloom to about 800 gram Bloom.

25 Claims, 31 Drawing Sheets

Related U.S. Application Data now Pat. No. 6,420,475, and a continuation-in-part of application No. 09/721,213, filed on Nov. 21, 2001, now Pat. No. 6,867,253, which is a continuation-in-part of application No. 09/274,498, filed on Mar. 23, 1999, now Pat. No. 6,420,475, and a continuation-in-part of application No. 09/421,886, filed on Oct. 5, 1999, now abandoned, which is a continuation-in-part of application No. 09/274,498, filed on Mar. 23, 1999, now Pat. No. 6,420,475, and a continuation-in-part of application No. 09/285,809, filed on Apr. 1, 1999, now abandoned, which is a continuation-in-part of application No. 09/274,498, filed on Mar. 23, 1999, now Pat. No. 6,420,475, and a continuation-in-part of application No. 09/896,047, filed on Jun. 30, 2001, which is a continuation-in-part of application No. 09/130,545, filed on Aug. 8, 1998, now Pat. No. 6,627,275, and a continuation-in-part of application No. 09/421,886, filed on Oct. 5, 1999, now abandoned, which is a continuation-in-part of application No. 09/130,545, filed on Aug. 8, 1998, now Pat. No. 6,627,275, and a continuation-in-part of application No. 09/896,047, filed on Jun. 30, 2001, which is a continuation-in-part of application No. 08/984,459, filed on Dec. 3, 1997, now Pat. No. 6,324,703, and a continuation-in-part of application No. 09/721,213, filed on Nov. 21, 2001, now Pat. No. 6,867,253, which is a continuation-in-part of application No. 08/984,459, filed on Dec. 3, 1997, now Pat. No. 6,324,703, and a continuation-in-part of application No. 09/421,886, filed on Oct. 5, 1999, now abandoned, which is a continuation-in-part of application No. 08/984,459, filed on Dec. 3, 1997, now Pat. No. 6,324,703, and a continuation-in-part of application No. 09/896,047, filed on Jun. 30, 2001, which is a continuation-in-part of application No. 08/909,487, filed on Jul. 12, 1997, now Pat. No. 6,050,871, and a continuation-in-part of application No. 09/721,213, filed on Nov. 21, 2001, now Pat. No. 6,867,253, which is a continuation-in-part of application No. 08/909,487, filed on Jul. 12, 1997, now Pat. No. 6,050,871, and a continuation-in-part of application No. 09/421,886, filed on Oct. 5, 1999, now abandoned, which is a continuation-in-part of application No. 08/909,487, filed on Jul. 12, 1997, now Pat. No. 6,050,871, and a continuation-in-part of application No. 09/285,809, filed on Apr. 1, 1999, now abandoned, which is a continuation-in-part of application No. 08/909,487, filed on Jul. 12, 1997, now Pat. No. 6,050,871, and a continuation-in-part of application No. 09/896,047, filed on Jun. 30, 2001, which is a continuation-in-part of application No. 08/863,794, filed on May 27, 1997, now Pat. No. 6,117,176, and a continuation-in-part of application No. 09/721,213, filed on Nov. 21, 2001, now Pat. No. 6,867,253, which is a continuation-in-part of application No. 08/863,794, filed on May 27, 1997, now Pat. No. 6,117,176, and a continuation-in-part of application No. 09/421,886, filed on Oct. 5, 1999, now abandoned, which is a continuation-in-part of application No. 08/863,794, filed on May 27, 1997, now Pat. No. 6,117,176, and a continuation-in-part of application No. 09/285,809, filed on Apr. 1, 1999, now abandoned, which is a continuation-in-part of application No. 08/863,794, filed on May 27, 1997, now Pat. No. 6,117,176, and a continuation-in-part of application No. 09/896,047, filed on Jun. 30, 2001, which is a continuation-in-part of application No. 09/230,940, filed on Sep. 30, 1997, now Pat. No. 6,161,555, and a continuation-in-part of application No. 09/721,213, filed on Nov. 21, 2001, now Pat. No. 6,867,253, which is a continuation-in-part of application No. 09/230,940, filed on Sep. 30, 1997, now Pat. No. 6,161,555, and a continuation-in-part of application No. 09/421,886, filed on Oct. 5, 1999, now abandoned, which is a continuation-in-part of application No. 09/230,940, filed on Sep. 30, 1997, now Pat. No. 6,161,555, and a continuation-in-part of application No. 09/285,809, filed on Apr. 1, 1999, now abandoned, which is a continuation-in-part of application No. 09/230,940, filed on Sep. 30, 1997, now Pat. No. 6,161,555, and a continuation-in-part of application No. 09/896,047, filed on Jun. 30, 2001, which is a continuation-in-part of application No. 08/719,817, filed on Sep. 30, 1996, now Pat. No. 6,148,830, and a continuation-in-part of application No. 09/721,213, filed on Nov. 21, 2001, now Pat. No. 6,867,253, which is a continuation-in-part of application No. 08/719,817, filed on Sep. 30, 1996, now Pat. No. 6,148,830, and a continuation-in-part of application No. 09/421,886, filed on Oct. 5, 1999, now abandoned, which is a continuation-in-part of application No. 08/719,817, filed on Sep. 30, 1996, now Pat. No. 6,148,830, and a continuation-in-part of application No. 09/285,809, filed on Apr. 1, 1999, now abandoned, which is a continuation-in-part of application No. 08/719,817, filed on Sep. 30, 1996, now Pat. No. 6,148,830, and a continuation-in-part of application No. 09/896,047, filed on Jun. 30, 2001, which is a continuation-in-part of application No. 08/665,343, filed on Jun. 17, 1996, which is a continuation-in-part of application No. 08/612,586, filed on Mar. 8, 1996, now Pat. No. 6,552,109, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/612,586, filed on Mar. 8, 1996, now Pat. No. 6,552,109, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/612,586, filed on Mar. 8, 1996, now Pat. No. 6,552,109, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/612,586, filed on Mar. 8, 1996, now Pat. No. 6,552,109, and a continuation-in-part of application No. 09/896,047, filed on Jun. 30, 2001, which is a continuation-in-part of application No. 08/665,343, filed on Jun. 17, 1996, which is a continuation-in-part of application No. 08/211,781, filed on Apr. 19, 1994, now Pat. No. 6,033,383, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/211,781, filed on Apr. 19, 1994, now Pat. No. 6,033,383, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/211,781, filed on Apr. 19, 1994, now Pat. No. 6,033,383, which is a continuation-in-part of application No. 08/665,343, filed on Jun. 17, 1996, which is a continuation-in-part of application No. 08/211,781, filed on Apr. 19, 1994, now Pat. No. 6,033,383, and a continuation-in-part of application No. 09/896,047, filed on Jun. 30, 2001, which is a continuation-in-part of application No. 08/665,343, filed on Jun. 17, 1996, which is a continuation-in-part of application No. 08/256,235, filed on Jun. 27, 1994, now Pat. No. 5,868,597, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/256,235, filed on Jun. 27, 1994, now Pat. No. 5,868,597, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/256,235, filed on Jun. 27, 1994, now Pat. No. 5,868,597, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/256,235, filed on Jun. 27, 1994, now Pat. No. 5,868,597, and a continuation-in-part of application No. 09/896,047, filed on Jun. 30, 2001, which is a continuation-in-part of application No. 08/665,343, filed on Jun. 17, 1996, which is a continuation-in-part of application No. 08/288,690, filed on Aug. 11, 1994, now Pat. No. 5,633,286, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/288,690, filed on Aug. 11, 1994, now Pat. No. 5,633,286, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/288,690, filed on Aug. 11, 1994, now Pat. No. 5,633,286, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/288,690, filed on Aug. 11, 1994, now Pat. No. 5,633,286, and a continuation-in-part of application No. 09/896,047, filed on Jun. 30, 2001, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/288,690, filed on Aug. 11, 1994, now Pat. No. 5,633,286, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/288,690, filed on Aug. 11, 1994, now Pat. No. 5,633,286, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/288,690, filed on Aug. 11, 1994, now Pat. No. 5,633,286, and a continuation-in-part of application No. 09/896,047, filed on Jun. 30, 2001, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/288,690, filed on Aug. 11, 1994, now Pat. No. 5,633,286, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/288,690, filed on Aug. 11, 1994, now Pat. No. 5,633,286, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/288,690, filed on Aug. 11, 1994, now Pat. No. 5,633,286, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/288,690, filed on Aug. 11, 1994, now Pat. No. 5,633,286, and a continuation-in-part of application No. 09/896,047, filed on Jun. 30, 2001, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/288,690, filed on Aug. 11, 1994, now Pat. No. 5,633,286, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/288,690, filed on Aug. 11, 1994, now Pat. No. 5,633,286, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/288,690, filed on Aug. 11, 1994, now Pat. No. 5,633,286, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/288,690, filed on Aug. 11, 1994, now Pat. No. 5,633,286, and a continuation-in-part of application No. 09/896,047, filed on Jun. 30, 2001, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/581,188, filed on Dec. 29, 1995, now abandoned, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 08/896,047, filed on Jun. 30, 2001, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/421,886, filed on Oct. 5, 1999, now abandoned, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/285,809, filed on Apr. 1, 1999, now abandoned, which is a continuation-in-part of application No. 08/665,343, filed on Jun. 17, 1996, which is a continuation-in-part of application No. 08/581,191, filed on Dec. 29, 1995, now Pat. No. 5,760,117, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/896,047, filed on Jun. 30, 2001, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/721,213, filed on Nov. 21, 2001, now Pat. No. 6,867,253, which is a continuation-in-part of application No. 08/665,343, filed on Jun. 17, 1996, which is a continuation-in-part of application No. 08/581,125, filed on Dec. 29, 1995, now Pat. No. 5,962,572, which is a continuation-in-part of application No. 08/256,235, filed on Jun. 27, 1994, now Pat. No. 5,868,597, which is a continuation-in-part of application No. 08/211,781, filed on Apr. 19, 1994, now Pat. No. 6,033,383, and a continuation-in-part of application No. 09/285,809, filed on Apr. 1, 1999, now abandoned.

U.S. PATENT DOCUMENTS

| | | | |
|---|---|---|---|
| 3,149,182 A | 9/1964 | Porter | 260/879 |
| 3,239,476 A | 3/1966 | Harlan | 260/27 |
| 3,239,478 A | 3/1966 | Harlan | 260/27 |
| 3,265,765 A | 8/1966 | Holden | 260/876 |
| 3,325,430 A | 6/1967 | Grasley | 260/25 |

| Patent No. | Date | Name | Class |
|---|---|---|---|
| 3,333,024 A | 7/1967 | Haefele | 260/880 |
| 3,464,850 A | 9/1969 | Haefele | 117/135.5 |
| 3,485,787 A | 12/1969 | Haefele | 260/33.6 |
| RE27,145 E | 6/1971 | Jones | 260/880 |
| 3,595,942 A | 7/1971 | Wald | 260/880 |
| 3,614,836 A | 10/1971 | Snyder | 38/2.5 |
| 3,660,849 A | 5/1972 | Jonnes | 2/2.1 |
| 3,676,387 A | 7/1972 | Lindlof | 260/28.5 |
| 3,756,977 A | 9/1973 | Yoshimoto | 260/33.6 |
| 3,792,005 A | 2/1974 | Harlan | 260/22 |
| 3,810,957 A | 5/1974 | Lunk | 260/876 |
| 3,821,148 A | 6/1974 | Makowski | |
| 3,821,149 A | 6/1974 | Makowski | 260/30.6 |
| 3,827,999 A | 8/1974 | Crossland | 260/33.6 |
| 3,830,767 A | 8/1974 | Condon | 260/28.5 |
| 3,860,013 A | 1/1975 | Czapor | 132/91 |
| 3,898,208 A | 8/1975 | Krause | 260/85.1 |
| 3,914,480 A * | 10/1975 | Lang | 428/395 |
| 3,929,715 A | 12/1975 | Nowell | 260/34.2 |
| 3,933,723 A | 1/1976 | Grenness | 260/33.6 |
| 3,965,019 A | 6/1976 | St. Clair | 252/59 |
| 4,006,116 A | 2/1977 | Dominguez | 260/33.6 |
| 4,032,459 A | 6/1977 | Crossland | 252/51.5 |
| 4,036,910 A | 7/1977 | Anderson | |
| 4,039,629 A | 8/1977 | Himes | 260/880 |
| 4,041,103 A | 8/1977 | Davison | 260/880 |
| 4,080,348 A | 3/1978 | Korpman | 260/27 |
| 4,136,071 A | 1/1979 | Korpman | 260/27 |
| 4,136,699 A | 1/1979 | Collins et al. | 128/290 |
| 4,151,057 A | 4/1979 | St. Clair | |
| 4,176,240 A | 11/1979 | Sabia | 174/23 |
| 4,259,540 A | 3/1981 | Sabia | |
| 4,313,867 A | 2/1982 | Duvdevani | 260/33.6 |
| 4,351,913 A | 9/1982 | Patel | |
| 4,361,508 A | 11/1982 | Bourland | 523/173 |
| 4,369,284 A * | 1/1983 | Chen | 524/476 |
| 4,432,607 A | 2/1984 | Levy | 350/96.34 |
| 4,481,323 A | 11/1984 | Sterling | 524/269 |
| 4,492,428 A | 1/1985 | Levy | |
| 4,497,538 A | 2/1985 | Patel | |
| 4,509,821 A | 4/1985 | Stenger | 350/96.23 |
| 4,511,354 A | 4/1985 | Sterling | 604/98 |
| 4,600,261 A | 7/1986 | Debbaut | |
| 4,610,738 A | 9/1986 | Jervis | 156/49 |
| 4,618,213 A | 10/1986 | Chen | |
| 4,643,924 A | 2/1987 | Uken | 428/35 |
| 4,662,692 A | 5/1987 | Uken | 339/96 |
| 4,678,664 A | 7/1987 | Schmolka | 424/65 |
| 4,680,233 A | 7/1987 | Camin | 428/424.6 |
| 4,690,831 A | 9/1987 | Uken | 427/44 |
| 4,692,369 A | 9/1987 | Nomi | 428/198 |
| 4,709,982 A | 12/1987 | Corne | 427/44 |
| 4,716,183 A | 12/1987 | Gamarra | 522/90 |
| 4,721,832 A | 1/1988 | Toy | 174/87 |
| 4,731,247 A * | 3/1988 | Wolford et al. | 426/1 |
| 4,764,535 A | 8/1988 | Leicht | |
| 4,798,853 A | 1/1989 | Handlin | 523/173 |
| 4,801,346 A | 1/1989 | Huddleston | |
| 4,822,834 A | 4/1989 | Blevins | 524/427 |
| 4,833,193 A | 5/1989 | Sieverding | |
| 4,842,931 A | 6/1989 | Zook | 428/354 |
| 4,864,725 A | 9/1989 | Debbaut | 29/871 |
| 4,865,905 A | 9/1989 | Uken | 428/220 |
| 4,875,305 A * | 10/1989 | Bridges | 43/42.06 |
| 4,880,676 A | 11/1989 | Pulgcerver | 428/35.7 |
| 4,880,878 A | 11/1989 | Himes | 525/89 |
| 4,883,431 A | 11/1989 | Uken | |
| 4,888,070 A | 12/1989 | Clark | |
| 4,889,403 A | 12/1989 | Zucker | |
| 4,889,717 A | 12/1989 | Covington | 428/304 |
| 4,900,877 A | 2/1990 | Dubrow | 174/35 |
| 4,909,756 A | 3/1990 | Jervis | |
| 4,929,211 A | 5/1990 | Resnick | 446/14 |
| 4,942,270 A | 7/1990 | Gamarra | 174/93 |
| 4,944,363 A | 7/1990 | Osher | 273/58 |
| 4,944,973 A | 7/1990 | Follette | |
| 4,968,747 A | 11/1990 | Mallikarjun | 525/74 |
| 4,983,008 A | 1/1991 | Campbell | 350/96.16 |
| 5,026,054 A | 6/1991 | Osher | 273/58 |
| 5,059,748 A | 10/1991 | Allen | 174/87 |
| 5,068,138 A | 11/1991 | Mitchell | 428/36.8 |
| 5,085,597 A | 2/1992 | Story | 439/521 |
| 5,088,734 A | 2/1992 | Glava | 273/73 |
| 5,098,421 A | 3/1992 | Zook | 604/367 |
| 5,112,900 A | 5/1992 | Buddenhagen | 524/484 |
| 5,126,182 A | 6/1992 | Lumb et al. | 428/90 |
| 5,149,736 A | 9/1992 | Gamarra | 524/490 |
| 5,153,254 A | 10/1992 | Chen | 524/505 |
| 5,159,022 A | 10/1992 | Ikematu | 525/250 |
| 5,167,649 A | 12/1992 | Zook | 604/307 |
| 5,173,573 A | 12/1992 | Jervis | 174/138 |
| 5,177,143 A | 1/1993 | Chang et al. | 524/848 |
| 5,181,914 A | 1/1993 | Zook | 604/307 |
| 5,191,752 A | 3/1993 | Murphy | 54/44.5 |
| 5,221,534 A | 6/1993 | Deslauriers | 424/78.03 |
| 5,239,723 A | 8/1993 | Chen | 15/104 |
| 5,262,468 A | 11/1993 | Chen | 524/476 |
| 5,313,019 A | 5/1994 | Brusselmans | 174/93 |
| 5,324,222 A | 6/1994 | Chen | 446/34 |
| 5,330,452 A | 7/1994 | Zook | 604/307 |
| 5,333,405 A | 8/1994 | Bowles | 43/42.06 |
| 5,334,646 A | 8/1994 | Chen | 524/474 |
| 5,336,708 A | 8/1994 | Chen | 524/474 |
| 5,442,004 A | 8/1995 | Sutherland | 524/140 |
| 5,459,193 A | 10/1995 | Anderson | 524/505 |
| 5,475,890 A | 12/1995 | Chen | 15/104 |
| 5,479,952 A | 1/1996 | Zachariades | 132/321 |
| 5,541,250 A | 7/1996 | Hudson et al. | 524/505 |
| 5,559,165 A | 9/1996 | Paul | 523/111 |
| 5,580,572 A | 12/1996 | Mikler | 424/448 |
| 5,606,149 A | 2/1997 | Yaworski | 174/92 |
| 5,618,882 A | 4/1997 | Hammond | 525/92 |
| 5,624,294 A | 4/1997 | Chen | 446/253 |
| 5,626,657 A | 5/1997 | Pearce | 106/122 |
| 5,633,286 A | 5/1997 | Chen | 524/474 |
| 5,655,947 A | 8/1997 | Chen | 446/46 |
| 5,703,162 A | 12/1997 | Anderson | 525/89 |
| 5,863,977 A | 1/1999 | Fisher | |
| 5,872,201 A | 2/1999 | Cheung | |
| 5,884,639 A * | 3/1999 | Chen | 132/321 |
| 5,929,138 A | 7/1999 | Mercer | |
| 5,952,396 A | 9/1999 | Chang | 522/1 |
| 5,994,446 A | 11/1999 | Graulus et al. | |
| 5,994,450 A | 11/1999 | Pearce | 524/505 |
| 6,117,176 A * | 9/2000 | Chen | 623/36 |
| 6,148,830 A * | 11/2000 | Chen | 132/321 |
| 6,161,555 A * | 12/2000 | Chen | 132/321 |
| 6,187,837 B1 | 2/2001 | Pearce | 523/105 |
| 6,552,109 B1 | 4/2003 | Chen | 524/270 |
| 6,794,440 B1 * | 9/2004 | Chen | 524/505 |
| 6,797,765 B1 | 9/2004 | Pearce | 524/505 |
| 6,881,776 B1 * | 4/2005 | Butuc | 524/284 |
| 2004/0254277 A1 * | 12/2004 | Shelton et al. | 524/313 |
| 2004/0261309 A1 * | 12/2004 | Shelton et al. | 43/42.24 |

* cited by examiner

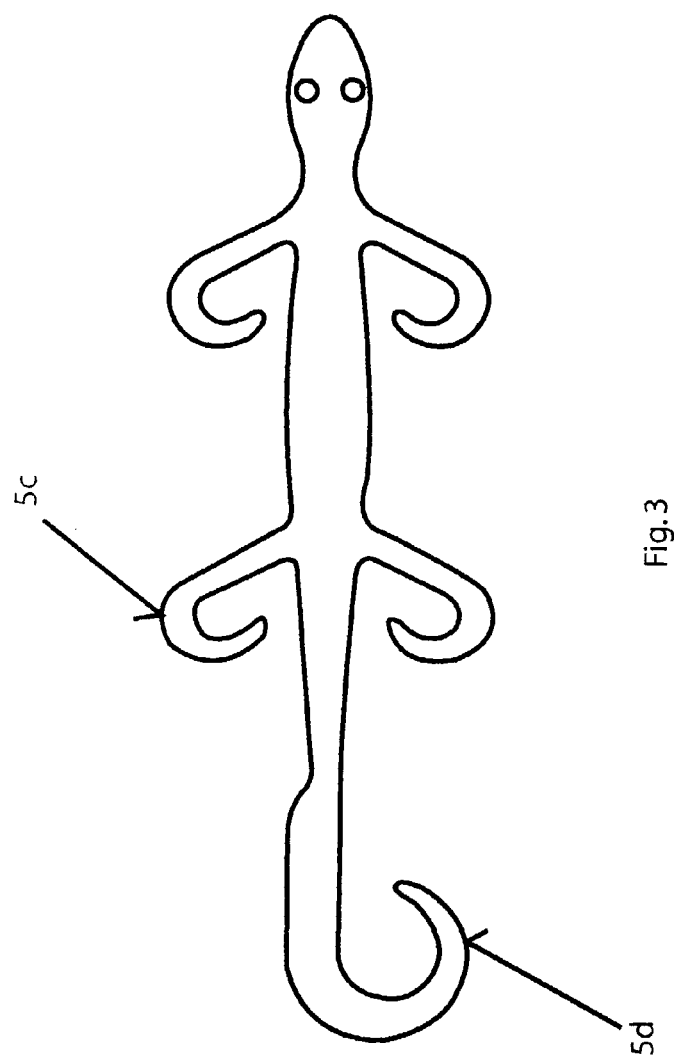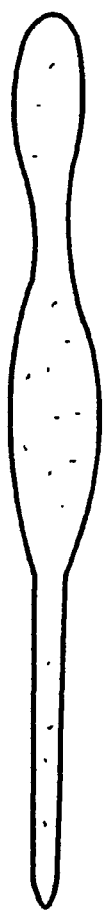
Fig. 3
Fig. 3a

GELATINOUS ELASTOMER COMPOSITIONS AND ARTICLES FOR USE AS FISHING BAIT

RELATED APPLICATIONS

This application is a continuation-in-part (CIP) of application U.S. Ser. No.: 09/896,047 filed Jun. 30, 2001 which is a CIP of Ser. No. 09/274,498, filed Mar. 23, 1999 (now U.S. Pat. No. 6,420,475). This application is also a CIP of U.S. Ser. No.: 09/721,213 filed Nov. 21, 2001 (now U.S. Pat. No. 6,867,253), which is a CIP of Ser. No. 09/274,498, filed Mar. 23, 1999 (now U.S. Pat. No. 6,420,475). This application is a CIP of application U.S. Ser. No.: 09/421,886, filed Oct. 5, 1999 (abandoned), which is a CIP of Ser. No. 09/274,498, filed Mar. 23, 1999 (now U.S. Pat. No. 6,420,475). This application is also a CIP of application U.S. Ser. No.: 09/285,809, filed Apr. 1, 1999 (abandoned), which is a CIP of Ser. No. 09/274,498, filed Mar. 23, 1999 (now U.S. Pat. No. 6,420,475). This application is also a CIP of U.S. Ser. No.: 09/896,047 filed Jun. 30, 2001, which is a CIP of Ser. No. 09/130,545, filed Aug. 8, 1998 (now U.S. Pat. No. 6,627,275). This application is also a CIP of U.S. Ser. No.: 09/721,213 filed Nov. 21, 2001 (now U.S. Pat. No. 6,867,253), which is a CIP of Ser. No. 09/130,545, filed Aug. 8, 1998 (now U.S. Pat. No. 6,627,275). This application is also a CIP of U.S. Ser. No.: 09/421,886, filed Oct. 5, 1999 (abandoned), which is a CIP of Ser. No. 09/130,545, filed Aug. 8, 1998 (now U.S. Pat. No. 6,627,275). This application is also a CIP of U.S. Ser. No.: 09/285,809 filed Apr. 1, 1999 (abandoned), which is a CIP of Ser. No. 09/130,545, filed Aug. 8, 1998 (now U.S. Pat. No. 6,627,275). This application is also a CIP of U.S. Ser. No.: 09/896,047 filed Jun. 30, 2001, which is a CIP of U.S. Ser. No.: 08/984,459, filed Dec. 3, 1997 (now U.S. Pat. No. 6,324,703). This application is also a CIP of U.S. Ser. No.: 09/721,213 filed Nov. 21, 2001 (now U.S. Pat. No. 6,867,253), which is a CIP of Ser. No. 08/984,459, filed Dec. 3, 1997 (now U.S. Pat. No. 6,324,703). This application is also a CIP of U.S. Ser. No.: 09/421,886, filed Oct. 5, 1999 (abandoned), which is a CIP of Ser. No. 08/984,459, filed Dec. 3, 1997 (now U.S. Pat. No. 6,324,703). This application is also a CIP of U.S. Ser. No.: 09/285,809 filed Apr. 1, 1999 (abandoned), which is a CIP of Ser. No. 08/984,459, filed Dec. 3, 1997 (now U.S. Pat. No. 6,324,703). This application is also a CIP of U.S. Ser. No.: 09/896,047 filed Jun. 30, 2001, which is a CIP of Ser. No. 08/909,487, filed Jul. 12, 1997 (now U.S. Pat. No. 6,050,871). This application is also a CIP of U.S. Ser. No.: 09/721,213 filed Nov. 21, 2001 (now U.S. Pat. No. 6,867,253), which is a CIP of 08/909,487, filed Jul. 12, 1997 (now U.S. Pat. No. 6,050,871). This application is also a CIP of U.S. Ser. No.: 09/421,886, filed Oct. 5, 1999 (abandoned), which is a CIP of Ser. No. 08/909,487, filed Jul. 12, 1997 (now U.S. Pat. No. 6,050,871). This application is also a CIP of U.S. Ser. No.: 09/285,809 filed Apr. 1, 1999 (abandoned), which is a CIP of Ser. No. 08/909,487, filed Jul. 12, 1997 (now U.S. Pat. No. 6,050,871). This application is also a CIP of U.S. Ser. No.: 09/896,047, filed Jun. 30, 2001, which is a CIP of Ser. No. 08/863,794, filed May 27, 1997 (now U.S. Pat. No. 6,117,176). This application is also a CIP of U.S. Ser. No.: 09/721,213, filed Nov. 21, 2001 (now U.S. Pat. No. 6,867,253), which is a CIP of Ser. No. 08/863,794, filed May 27, 1997 (now U.S. Pat. No. 6,117,176). This application is also a CIP of U.S. Ser. No.: 09/421,886, filed Oct. 5, 1999 (abandoned), which is a CIP of Ser. No. 08/863,794, filed May 27, 1997 (now U.S. Pat. No. 6,117,176). This application is also a CIP of U.S. Ser. No.: 09/285,809, filed Apr. 1, 1999 (abandoned), which is a CIP of 08/863,794, filed May 27, 1997 (now U.S. Pat. No. 6,117,176). This application is also a CIP of U.S. Ser. No.: 09/896,047 filed Jun. 30, 2001, which is a CIP of PCT/US97/17534, filed Sep. 30, 1997 (U.S. Ser. No.: 09/230,940 now U.S. Pat. No. 6,161,555). This application is also a CIP of U.S. Ser. No.: 09/721,213 filed Nov. 21, 2001 (now U.S. Pat. No. 6,867,253), which is a CIP of PCT/US97/17534, filed Sep. 30, 1997 (U.S. Ser. No.: 09/230,940 now U.S. Pat. No. 6,161,555). This application is also a CIP of U.S. Ser. No.: 09/421,886, filed Oct. 5, 1999 (abandoned), which is a CIP of PCT/US97/17534, filed Sep. 30, 1997 (U.S. Ser. No.: 09/230,940 now U.S. Pat. No. 6,161,555). This application is also a CIP of U.S. Ser. No.: 09/285,809 filed Apr. 1, 1999 (abandoned), which is a CIP of PCT/US97/17534, filed Sep. 30, 1997 (U.S. Ser. No.: 09/230,940 now U.S. Pat. No. 6,161,555). This application is also a CIP of U.S. Ser. No.: 09/896,047 filed Jun. 30, 2001, which is a CIP of 08/719,817 filed Sep. 30, 1996 (No. U.S. Pat. No. 6,148,830). This application is also a CIP of U.S. Ser. No.: 09/721,213 filed Nov. 21, 2001 (now U.S. Pat. No. 6,867,253), which is a CIP of 08/719,817 filed Sep. 30, 1996 (No. U.S. Pat. No. 6,148,830). This application is also a CIP of U.S. Ser. No.: 09/421,886, filed Oct. 5, 1999 (abandoned), which is a CIP of Ser. No. 08/719,817 filed Sep. 30, 1996 (No. U.S. Pat. No. 6,148,830). This application is also a CIP of U.S. Ser. No.: 09/285,809 filed Apr. 1, 1999 (abandoned), which is a CIP of Ser. No. 08/719,817 filed Sep. 30, 1996 (No. U.S. Pat. No. 6,148,830). This application is also a CIP of U.S. Ser. No.: 09/896,047 filed Jun. 30, 2001, which is a CIP of Ser. No. 08/665,343 filed Jun. 17, 1996, which is a CIP of Ser. No. 08/612,586 filed Mar. 8, 1996 (now U.S. Pat. No. 6,552,109). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/612,586 filed Mar. 8, 1996 (now U.S. Pat. No. 6,552,109). This application is also a CIP of U.S. Ser. No.: 09/421,886, filed Oct. 5, 1999 (abandoned), which is a CIP of Ser. No. 08/665,343 filed Jun. 17, 1996, which is a CIP of Ser. No. 08/612,586 filed Mar. 8, 1996 (now U.S. Pat. No. 6,552,109). This application is also a CIP of U.S. Ser. No.: 09/285,809 filed Apr. 1, 1999 (abandoned), which is a CIP of Ser. No. 08/665,343 filed Jun. 17, 1996, which is a CIP of Ser. No. 08/612,586 filed Mar. 8, 1996 (now U.S. Pat. No. 6,552,109). This application is also a CIP of U.S. Ser. No.: 09/896,047 filed Jun. 30, 2001, which is a CIP of Ser. No. 08/665,343 filed Jun. 17, 1996, which is a CIP of PCT/US94/04278 filed Apr. 19, 1994 (U.S. Ser. No.: 08/211,781 now U.S. Pat. No. 6,033,383). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of PCT/US94/044278 filed Apr. 19, 1994 (U.S. Ser. No.: 08/211,781 now U.S. Pat. No. 6,033,383). This application is also a CIP of U.S. Ser. No.: 09/421,886, filed Oct. 5, 1999 (abandoned), which is a CIP of Ser. No. 08/665,343 filed Jun. 17, 1996, which is a CIP of PCT/US94/044278 filed Apr. 19, 1994 (U.S. Ser. No.: 08/211,781 now U.S. Pat. No. 6,033,383). This application is also a CIP of U.S. Ser. No.: 09/285,809 filed Apr. 1, 1999 (abandoned), which is a CIP of Ser. No. 08/665,343 filed Jun. 17, 1996, which is a CIP of PCT/US94/044278 filed Apr. 19, 1994 (U.S. Ser. No.: 08/211,781 now U.S. Pat. No. 6,033,383). This application is also a CIP of U.S. Ser. No.: 09/896,047 filed Jun. 30, 2001, which is a CIP of Ser. No. 08/665,343 filed Jun. 17, 1996, which is a CIP of PCT/US94/07314 filed Jun. 27, 1994 (U.S. Ser. No.: 08/256,235 now U.S. Pat. No. 5,868,597). This application is also a CIP of U.S. Ser. No.: 09/721,213 filed Nov. 21, 2001 (now U.S. Pat. No. 6,867,253), which is a CIP of 08/665,343 filed Jun. 17, 1996, which is a CIP of PCT/US94/07314 filed Jun. 27, 1994 (U.S. Ser. No.: 08/256235 now U.S. Pat. No. 5,868,597). This application is also a CIP of U.S. Ser. No.: 09/421,886, filed Oct. 5, 1999 (abandoned), which is a CIP of Ser. No. 08/665,343 filed Jun. 17, 1996, which is a CIP of PCT/US94/07314 filed Jun. 27, 1994 (U.S. Ser. No.: 08/256,235 now U.S. Pat. No. 5,868,597). This application is also a CIP of U.S. Ser. No.: 09/285,809 filed Apr. 1, 1999 (abandoned), which is a CIP of Ser. No. 08/665,343 filed Jun. 17, 1996, which is a CIP of PCT/US94/07314 filed Jun. 27, 1994 (U.S. Ser. No.: 08/256,235 now U.S. Pat. No. 5,868,597). This application is also a CIP of U.S. Ser. No.: 09/896,047 filed Jun. 30, 2001, which is a CIP of 08/665,343 filed Jun. 17, 1996, which is a CIP of Ser. No. 08/288,690 filed Aug. 11, 1994 (now U.S. Pat. No. 5,633,286). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of 08/288,690 filed Aug. 11, 1994 (now U.S. Pat. No. 5,633,286). This application is also a CIP of U.S. Ser. No.: 09/421,886, filed Oct. 5, 1999 (abandoned), which is a CIP of Ser. No. 08/665,343 filed Jun. 17, 1996, which is a CIP of Ser. No. 08/288,690 filed Aug. 11, 1994 (now U.S. Pat. No. 5,633,286). This application is also a CIP of U.S. Ser. No.: 09/285,809 filed Apr. 1, 1999 (abandoned), which is a CIP of Ser. No. 08/665,343 filed Jun. 17, 1996, which is a CIP of Ser. No. 08/288,690 filed Aug. 11, 1994 (now U.S. Pat. No. 5,633,286). This application is also a CIP of U.S. Ser. No.: 09/896,047 filed Jun. 30, 2001, which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No.: 09/421,886, filed Oct. 5, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No.: 09/285,809 filed Apr. 1, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of Ser. No. 08/288,690 filed Aug. 11, 1994 (now U.S. Pat. No. 5,633,286). This application is also a CIP of U.S. Ser. No.: 09/896,047 filed Jun. 30, 2001, which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No.: 09/421,886, filed Oct. 5, 1999 (abandoned), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No.: 09/285,809 filed Apr. 1, 1999 (abandoned), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of Ser. No. 08/288,690 filed Aug. 11, 1994 (now U.S. Pat. No. 5,633,286). This application is also a CIP of U.S. Ser. No.: 09/896,047 filed Jun. 30, 2001, which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of Ser. No. 08/288,690 filed Aug. 11, 1994 (now U.S. Pat. No. 5,633,286). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of Ser. No. 08/288,690 filed Aug. 11, 1994 (now U.S. Pat. No. 5,633,286). This application is also a CIP of U.S. Ser. No.: 09/421,886, filed Oct. 5, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of Ser. No. 08/288,690 filed Aug. 11, 1994 (now U.S. Pat. No. 5,633,286). This application is also a CIP of U.S. Ser. No.: 09/285,809 filed Apr. 1, 1999 (abandoned), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of Ser. No. 08/288,690 filed Aug. 11, 1994 (now U.S. Pat. No. 5,633,286). This application is also a CIP of U.S. Ser. No.: 09/896,047 filed Jun. 30, 2001, which is a CIP of 08/665,343 filed Jun. 17, 1996, which is a CIP of Ser. No. 08/581,188 filed Dec. 29, 1995 (abandoned), which is a CIP of PCT/US94/07314 FILED Jun. 27, 1994 (U.S. Ser. No.: 08/256,235 now U.S. Pat. No. 5,868,597), which is a CIP of PCT/US94/04278 FILED Apr. 19, 1994 (U.S. Ser. No.: 08/211,781 NOW U.S. Pat. No. 6,033,383). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,188 filed Dec. 29, 1995 (abandoned), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781 now U.S. Pat. No. 6,033,383). This application is also a CIP of (U.S. Ser. No.: 09/421,886, filed Oct. 5, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of PCT/US94/07314 filed Jun. 27, 1994 (U.S. Ser. No.: 08/256,235 now U.S. Pat. No. 5,868,597, which is a CIP of PCT/US94/04278 (U.S. Ser. No.: 08/211,781 now U.S. Pat. No. 6,033,383). This application is also a CIP of (U.S. Ser. No.: 09/285,809 filed Apr. 1, 1999 (abandoned), which is a CIP of Ser. No. 08/665,343 filed Jun. 17, 1996, which is a CIP of Ser. No. 08/581,188 filed Dec. 29, 1995 (abandoned), which is a CIP of PCT/U594/07314 filed Jun. 27, 1994 (U.S. Ser. No.: 08/256235 now U.S. Pat. No. 5,868,597), which is a CIP of PCT/U594/04278 (U.S. Ser. No.: 08/211,781 now U.S. Pat. No. 6,033,383). This application is also a CIP of (U.S. Ser. No.: 09/896,047 filed Jun. 30, 2001, which is a CIP of Ser. No. 08/665,343 filed Jun. 17, 1996, which is a CIP of 08/581,191 filed Dec. 29, 1995 (now U.S. Pat. No. 5,760,117), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781 now U.S. Pat. No. 6,033,383). This application is also a CIP of U.S. Ser. No.: 09/721,213 filed Nov.

21, 2001 (now U.S. Pat. No. 6,867,253), which is a CIP of Ser. No. 08/665,343 filed Jun. 17, 1996, which is a CIP of Ser. No. 08/581,191 filed Dec. 29, 1995 (now U.S. Pat. No. 5,760,117), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781 now U.S. Pat. No. 6,033,383). This application is also a CIP of U.S. Ser. No.: 09/421,886, filed Oct. 5, 1999 (abandoned), which is a CIP of 08/665,343 filed Jun. 17, 1996, which is a CIP of Ser. No. 08/581,191 filed Dec. 29, 1995 (now U.S. Pat. No. 5,760,117), which is a CIP of PCT/US94/07314 filed Jun. 27, 1994 (U.S. Ser. No.: 08/256, 235 now U.S. Pat. No. 5,868,597), which is a CIP of PCT/US94/04278 (U.S. Ser. No.: 08/211,781 now U.S. Pat. No. 6,033,383). This application is also a CIP of U.S. Ser. No.: 09/285,809 filed Apr. 1, 1999 (abandoned), which is a CIP of Ser. No. 08/665,343 filed Jun. 17, 1996, which is a CIP of 08/581,191 filed Dec. 29, 1995 (now U.S. Pat. No. 5,760,117), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781 now U.S. Pat. No. 6,033,383). This application is also a CIP of U.S. Ser. No.: 09/896,047 filed Jun. 30, 2001, which is a CIP of 08/665,343 filed Jun. 17, 1996, which is a CIP of Ser. No. 08/581,125 filed Dec. 29, 1995 (now U.S. Pat. No. 5,962,572), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781). This application is also a CIP of U.S. Ser. No.: 09/721,213 filed Nov. 21, 2001 (now U.S. Pat. No. 6,867,253), which is a CIP of Ser. No. 08/665,343 filed Jun. 17, 1996, which is a CIP of Ser. No. 08/581,125 filed Dec. 29, 1995 (now U.S. Pat. No. 5,962,572), which is a CIP of PCT/US94/07314 filed Jun. 27, 1994 (U.S. Ser. No.: 08/256,235 now U.S. Pat. No. 5,868,597), which is a CIP of PCT/US94/04278 (U.S. Ser. No.: 08/211,781 now U.S. Pat. No. 6,033,383). The following applications: Ser. No. 08/612,586 filed Mar. 8, 1996; U.S. Ser. Nos. PCT/US94/04278 filed Apr. 19, 1994 (published May 26, 1995 No. WO95/13851); PCT/US94/07314 filed Jun. 27, 1994 (published Jan. 4, 1996 No. WO 96/00118); U.S. Ser. No. 08/288,690 filed Aug. 11, 1994, now U.S. Pat. No. 5,633,286 are the same specifically identified applications and patents incorporated-by-reference on Jul. 20, 2002 in the original papers as included in the specification-as-filed (at page 1, lines 4–14) which specification is specifically referred to in the combined oath and declaration executing this application that the subject matter contained in the related (said) applications and patents (Ser. No: 08/612,586 filed Mar. 8, 1996; U.S. Ser. Nos. PCT/US94/04278 filed Apr. 19, 1994 (published May 26, 1995 No. WO95/13851); PCT/US94/07314 filed Jun. 27, 1994 (published Jan. 4, 1996 No. WO 96/00118); U.S. Ser. No. 08/288,690 filed Aug. 11, 1994, now U.S. Pat. No. 5,633,286) are specifically incorporated herein by reference. This application is being filed even date with the following multiple applications having titles: (1) "GELATINOUS ELASTOMER COMPOSITIONS AND ARTICLES FOR USE AS FISHING BAIT", (now U.S. Ser. No. 10/199,361), (2) "TEAR RESISTANT GELATINOUS ELASTOMER COMPOSITIONS AND ARTICLES FOR USE AS FISHING BAIT", (now U.S. Ser. No. 10/199,264), (3) "GELATINOUS FOOD-ELASTOMER COMPOSITIONS AND ARTICLES FOR USE AS FISHING BAIT", (now U.S. Ser. No. 10/199,362), (4) "GELATINOUS FOOD-ELASTOMER COMPOSITIONS AND ARTICLES", (now U.S. Ser. No. 10/199,363); said currently filed applications U.S. Ser. Nos.: 10/199,362; 10/199,363; and 10/199,364 (now U.S. Pat. No. 6,794,440) are the same specifically identified applications incorporated-by-reference on Jul. 20, 2002 in the original papers as included in the specification-as-filed (at page 1, lines 4–14) which specification is specifically referred to in the combined oath and declaration executing this application that the subject matter contained in the related (said) applications U.S. Ser. Nos. 10/199,362; 10/199,363; and 10/199,364 (now U.S. Pat. No. 6,794,440) are specifically incorporated herein by reference in this application (now U.S. Ser. No. 10/199,361).

BACKGROUND OF THE INVENTION

This invention relates to fishing baits.

SUMMARY OF THE INVENTION

The present invention comprises a soft gelatinous elastomer composition and article useful as fishing bait formed from (I) 100 parts by weight of one or more linear, radial or multiblock copolymer(s);

(II) one or more first low viscosity plasticizers with one or more second high viscosity plasticizers being in sufficient amounts to achieve a gel rigidity of from about 20 gram Bloom to about 800 gram Bloom;

said gelatinous elastomer composition in combination with or without one or more selected (III) polymers or copolymers;

said first low viscosity plasticizers being in effective amounts for said gelatinous compositions to have a Gram Tack lower than a gelatinous composition having the same rigidity formed from said second high viscosity plasticizers alone;

said second high viscosity plasticizers being in effective amounts in combination with said first low viscosity plasticizers for said gelatinous compositions to have a greater temperature compression set than a gelatinous composition having the same rigidity formed from said first low viscosity plasticizers alone;

said second high viscosity plasticizers for said gelatinous compositions to have a greater temperature compression set than a gelatinous composition having the same rigidity formed from a combination of said first low viscosity plasticizers and said second high viscosity plasticizers;

said first low viscosity plasticizers being in effective amounts with said second high viscosity plasticizers for said gelatinous compositions to have a Gram Tack lower than a gelatinous composition having the same rigidity formed from said second high viscosity plasticizers alone;

said selected (III) polymers or copolymers being in effective amounts for said gelatinous compositions to have a greater temperature compression set than a gelatinous composition having the same rigidity formed from said block copolymers and corresponding said first low viscosity plasticizers alone or said first plasticizers with said second high viscosity plasticizers;

said fishing bait being life like, soft; and said fishing bait capable of exhibiting a success hook to catch ratio greater than a conventional plastisol polyvinyl chloride fishing bait of corresponding rigidity.

A further embodiment of the present invention comprises a soft gelatinous elastomer composition and article useful as fishing bait formed from (I) 100 parts by weight of one or more of a poly(styrene-ethylene-butylene-styrene) block copolymer(s) and from (II) about 300 to about 1,600 parts by weight of a selected amount of one or more of a low viscosity plasticizer and a selected amount of one or more of a high viscosity plasticizer; said gelatinous elastomer compositions characterized by a gel rigidity of from about 20 to about 800 gram Bloom; said gel being in combination with or without (III) a selected amount of one or more polymers or copolymers of poly(styrene-butadiene-styrene), poly(styrene-butadiene)$_n$, poly(styrene-isoprene-styrene)$_n$, poly(styrene-isoprene)$_n$, poly(styrene-ethylene-propylene), poly(styrene-ethylene-propylene-styrene), poly(styrene-ethylene-butylene-styrene), poly(styrene-ethylene-butylene), poly(styrene-ethylene-propylene)$_n$, poly(styrene-ethylene-butylene)$_n$, polystyrene, poly(alpha-methylstyrene), poly(4 methylstyrene), polyphenylene oxide, polybutylene, poly(ethylene-propylene), poly(ethylene-butylene), polypropylene, or polyethylene, wherein said selected copolymer is a linear, radial, star-shaped, branched or multiarm copolymer, wherein n is greater than one.

The various aspects and advantages of the invention will become apparent to those skilled in the art upon consideration of the accompanying disclosure.

DESCRIPTION OF THE DRAWINGS

FIGS. 1, 2, 3, 3a, 4, 5, 6, 7, 8, 9, 10, 11, 12, 12a, 13, 13a, 14, 14a, 15, 15a, 16, 17, 18, 18a, 19, 19a, 20, 20a, 21, 22, 23, 24, 25, 25a, 26, 26a, 27, 27a, 28a, 28b, 29, 29a, 29b, 29c, 29d, 30, 31, 32, 33, 34, 35, 36, 37, 38, and 39 are representative of fishing bait shapes.

DESCRIPTION OF THE INVENTION

Figure 1:
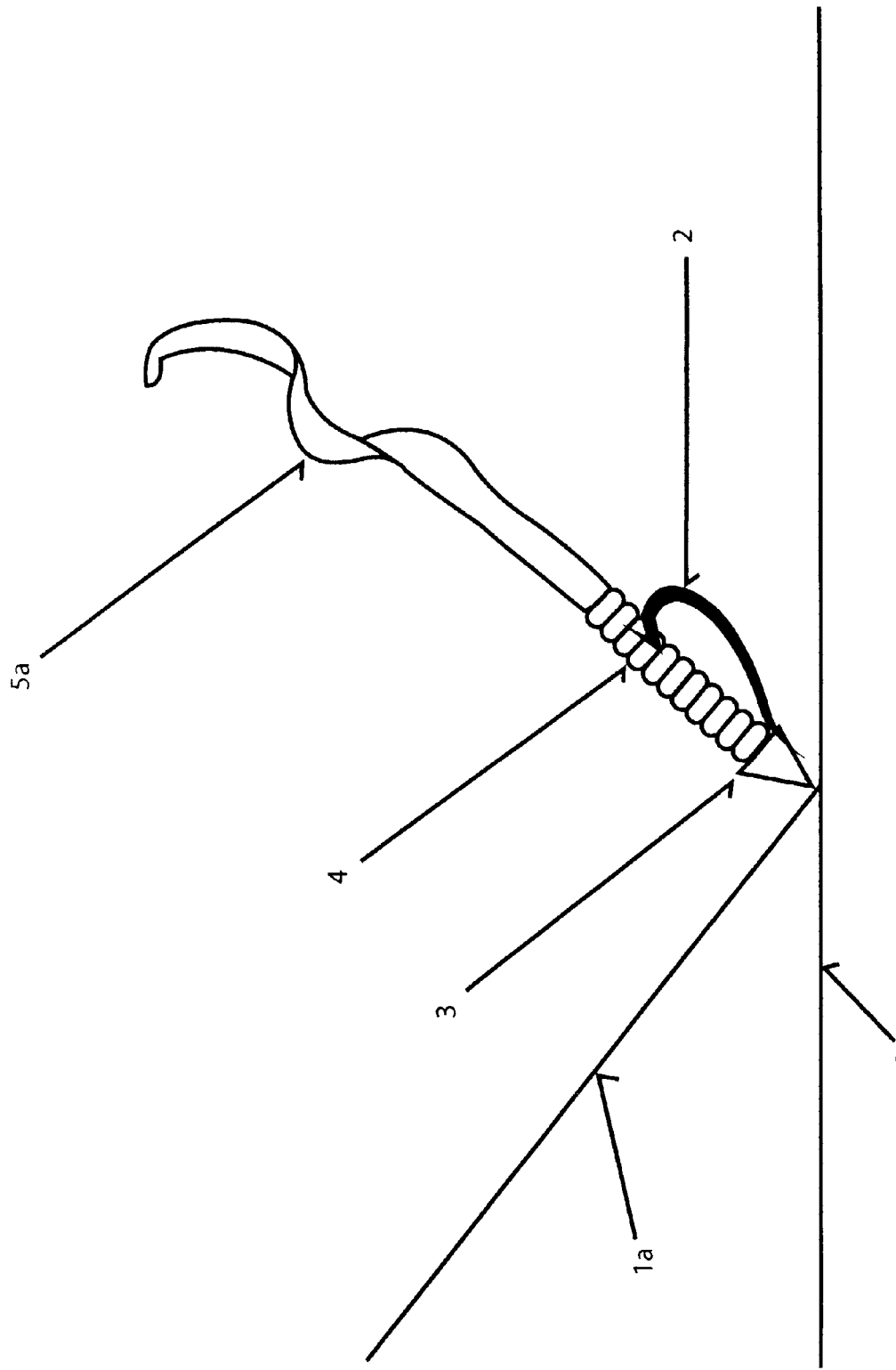
Figure 2:
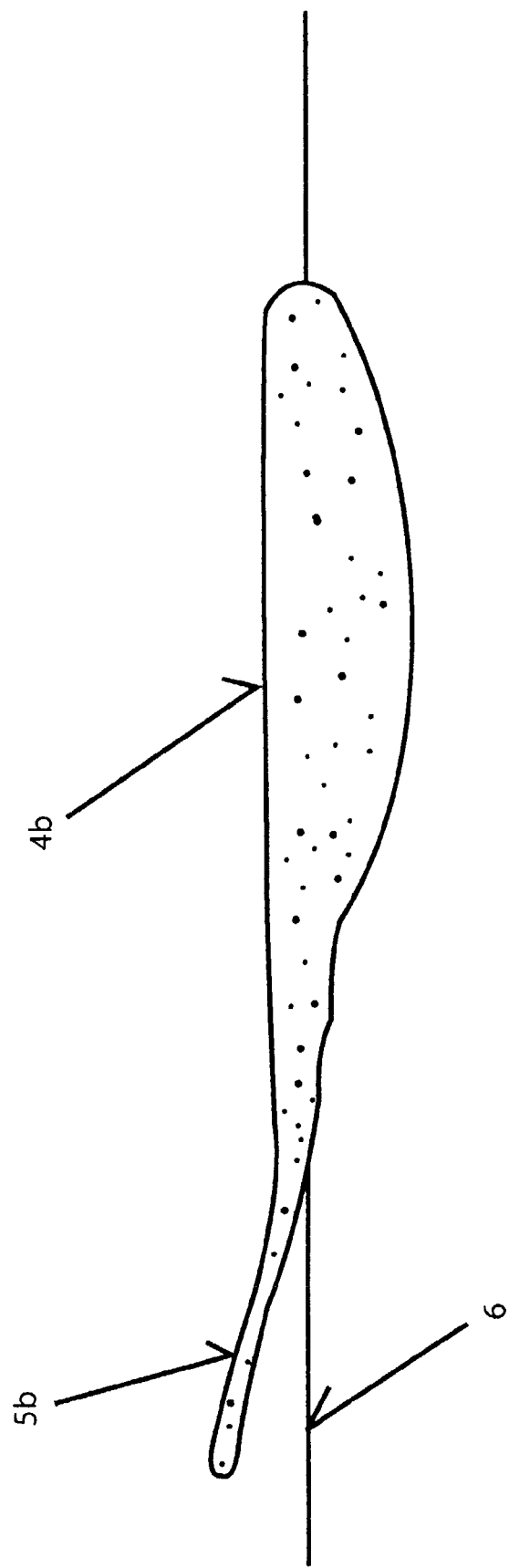
Figure 4:
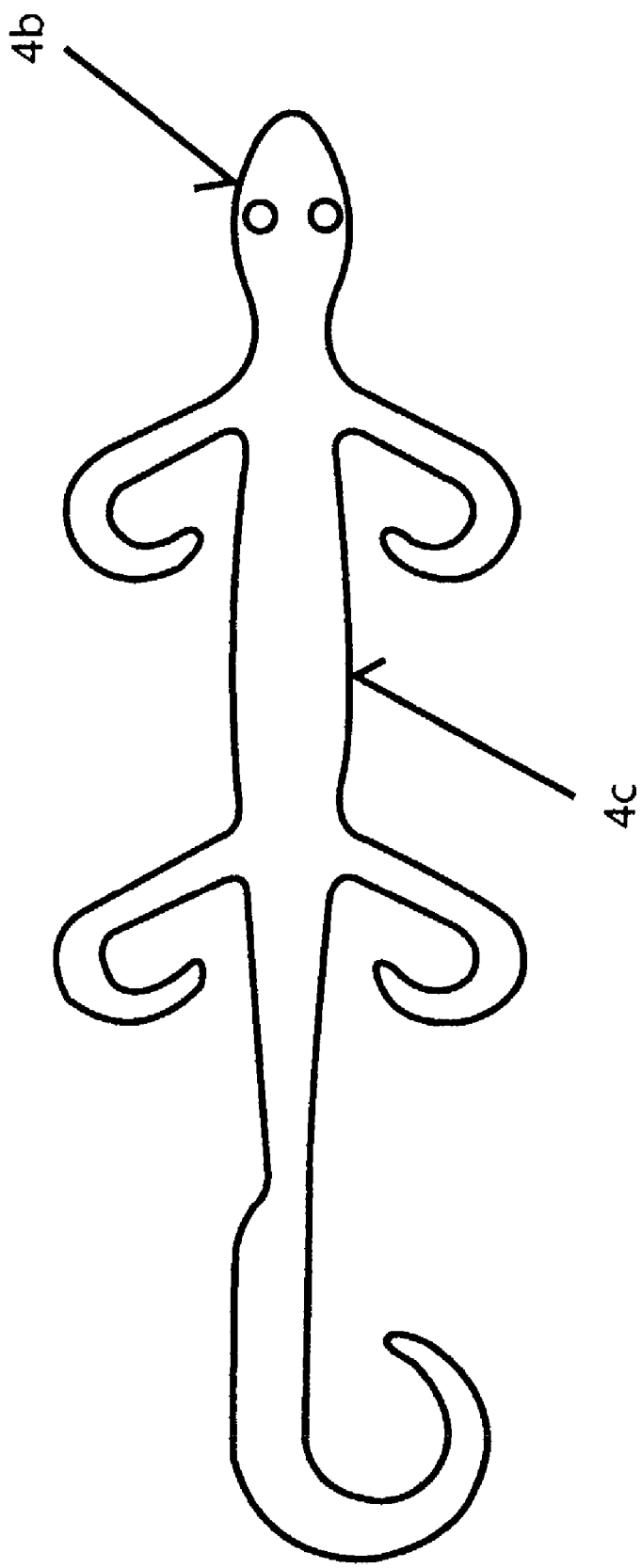

A internet search of the USPTO Patent Data Base of Applicant's published patent applications and issued patent describing gel compositions useful for fishing identified: U.S. Pat. Nos. 6,161,555, 6,333,374; 6,324,703; 6,148,830; 6,117,176; 6,050,871; 5,884,639; 5,508,334; 5,334,646; 5,262,468; 5,153,254; PCT/US97117534, PCT/US94/04278 and PCT/US94/07314 which are incorporated herein by reference.

A search of the internet USPTO Patent Data Base for "fishing lure" and rattles, "rattle pocket", "soft plastic lure" and rattle, "soft plastic fishing lure", "plastic fishing lure", "rubber fishing lure", "elastomer fishing lure", "soft plastic fishing lure", kraton and "fishing lure", soft and "fishing bait" produced the following list of patent documents: U.S. Pat. Nos. 3,958,358; 3,964,204; 3,971,152; 3,988,851; 4,047,320; 4,094,087; 4,144,665; 4,203,246; 4,205,476; 4,437,257; 4,468,881; 4,492,054; 4,505,952; 4,528,770; 4,551,333; 4,589,222; 4,592,161; 4,592,161; 4,650,245; 4,652,048; 4,664,857; 4,744,169; 4,745,700; 4,750,290; 4,790,100; 4,823,497; 4,831,770; 4,835,897; 4,841,665; 4,854,070; 4,862,628; 4,873,783; 4,893,430; 4,916,850; 4,920,686; 4,976,060; 4,993,183; 5,001,856; 5,038,513; 5,070,639; 5,081,787; 5,197,221; 5,201,784; 5,203,103; 5,209,007; 5,216,831; 5,230,178; 5,251,395; 5,266,323; 5,270,044; 5,297,354; 5,321,906; 5,333,405; 5,347,744; 5,355,613; 5,394,638; 5,412,901; 5,426,886; 5,461,815; 5,499,471; 5,517,782; 5,537,770; 5,586,405; 5,600,916; 5,632,113; 5,638,631; 5,653,458; 5,661,921; 5,709,047; 5,887,379; 5,926,994; 5,930,937; 5,934,006; 5,941,010; 5,943,811; 5,953,849; 5,956,886; 5,956,888; 5,960,578; 5,960,580; 6,035,574; 6,041,540; 6,061,948; 6,063,324; 6,082,038; 6,094,855; 6,101,636; 6,105,304; 6,108,963; 6,112,450; 6,113,968; 6,123,016; 6,170,190; 6,173,523; 6,176,033; 6,182,391; 6,192,616; 6,192,618; 6,199,312; 6,205,697; 6,251,466; 6,266,915; 6,266,916; 6,269,586; 6,272,786; 6,293,779; 6,301,822; 6,301,823; and 6,305,118 which are incorporated herein by reference.

Block and other copolymers are described in the following publications:

(1) W. P. Gergen, "Uniqueness of Hydrogenated Block Copolymers for Elastomeric Applications," presented at the German Rubber Meeting, Wiesbaden, 1983; Kautsch, Gummi, Kunstst. 37, 284 (1984). (2) W. P. Gergen, et al., "Hydrogenated Block Copolymers," Paper No. 57, presented at a meeting of the Rubber Division ACS, Los Angeles, Apr. 25, 1985. Encyclopedia of Polymer Science and Engineering, Vol. 2, pp 324434, "Block Copolymers". (3) L. Zotteri and et al., "Effect of hydrogenation on the elastic properties of poly(styrene-b-diene-b-styrene) copolymers", Polymer, 1978, Vol. 19, April. (4) J. Kenneth Craver, et al., Applied Polymer Science, Ch. 29, "Chemistry and Technology of Block Polymers", pp. 394–429, 1975. (5) Y. Mahajer and et al., "The influence of Molecular Geometry on the Mechanical Properties of homopolymers and Block Polymers of Hydrogenated Butadiene and Isoprene" reported under U.S. ARO Grant No. DAAG29-78-G-0201. (6) J. E. McGrath, et al., "Linear and Star Branched Butadiene-Isoprene Block Copolymers and Their Hydrogenated Derivatives", Chem. Dept, Virginia Polytechnic Institute and State University Blacksturg, Va., reported work supported by Army Research Office. (7) Legge, Norman R., "Thermoplastic Elastomers", Charles Goodyear Medal address given at the 131st Meeting of the Rubber Division, American Chemical Society, Montreal, Quebec, Canada, Vol. 60, G79–G115, May 26–29, 1987. (8) Falk, John Carl, and et al., "Synthesis and Properties of Ethylene-Butylene-1 Block Copolymers", Macromolecules, Vol. 4, No. 2, pp. 152–154, March–April 1971. (9) Morton, Maurice, and et al., "Elastomeric Polydiene ABA Triblock Copolymers within Crystalline End Blocks", University of Arkon, work supported by Grant No. DMR78-09024 from the National Science Foundation and Shell Development Co. (10) Yee, A. F., and et al., "Modification of PS by S-EB-S Block Copolymers: Effect of Block Length", General Electric Corporate Research & Development, Schenectady, N.Y. 12301. (11) Siegfried, D. L., and et al., "thermoplastic Interpenetrating Polymer Networks of a Triblock Copolymer elastomer and an Ionomeric Plastic Mechanical Behavior", Polymer Engineering and Science, January 1981, Vol. 21, No. 1, pp 3946. (12) Clair, D. J., "S-EB-S Copolymers Exhibit Improved Wax Compatibility", Adhesives Age, November, 1988. (13) Shell Chemical Technical Bulletin SC: 1102-89, "Kraton® Thermoplastic Rubbers in oil gels", April 1989. (14) Chung P. Park and George P. Clingerman, "Compatibilization of Polyethylene-Polystyrene Blends with Ethylene-Styrene Random Copolymers", the Dow Chemical Company, May 1996. (15) Steve Hoenig, Bob Turley and Bill Van Volkenburgh, "Material Properties and Applications of Ethylene-Styrene Interpolymers", the Dow Chemical Company, September 1996. (16) Y. Wilson Cheung and Martin J. Guest, "Structure, Thermal Transitions and Mechanical Properties of Ethylene/Styrene Copolymers", the Dow Chemical Company, May 1996. (17) Teresa Plumley Karjaia, Y. Wilson Cheung and Martin J. Guest, "Melt Rheology and Processability of Ethylene/Styrene Interpolymers", the Dow Chemical Company, May 1997. (18) D. C. Prevorsek, et al., "Origins of Damage Tolerance in Ultrastrong Polyethylene Fibers and Composites: Journal of Polymer Science: Polymer Symposia No. 75, 81–104 (1993). (19) Chen, H., et al, "Classification of Ethylene-Styrene Interpolymers Based on Comonomer Content", J. Appl. Polym. Sci., 1998, 70, 109.

(20–24) U.S. Pat. Nos. 5,872,201; 5,460,818; 5,244,996; EP 415815A; JP07,278,230 describes substantially random, more appropriately presudo-random copolymers (interpolymers), methods of making and their uses. (25) Alizadeh, et al., "Effect of Topological Constraints on The Crystallization Behavior of Ethylene/alpha-Olefin Copolymers", PMSE, Vol, 81, pp. 248–249, Aug. 22–26, 1999. (26) Guest, et al., "Structure/Property Relationships of Semi-Crystalline Ethylene-Styrene Interpolymers (ESI)", PMSE, Vol, 81, pp. 371–372, Aug. 22–26, 1999. (27) A. Weill and R. Pixa, in Journal of Polymer Science Symposium, 58, 381–394 (1977), titled: "Styrene-diene Triblock Copolymers: Orientation Conditions and Mechanical Properties of the Oriented Materials" describe techniques of orientation of neat SIS and SBS block copolymers and their properties. (28) Elastomeric Thermoplastic, Vol. 5, pages 416–430; Block Copolymers, Vol. 2, pages 324; Block and Graft Copolymers; Styrene-Diene Block Copolymers, Vol. 15, pages 508–530; and Microphase Structure, can be found in ENCYCLOPEDIA OF POLYMER SCIENCE AND ENGINEERING, 1987. (29) Legge, N. R, et al., Chemistry and Technology of Block Polymers, Ch. 29, pages 394–429, ACS, Organic Coatings and Plastics Chemistry, © 1975. (30) Legge, N. R., Thermoplastic Elastomers, Rubber Chemistry and Technology, Vol. 60, pages G79–117. (31) Lindsay, G. A., et al., Morphology of Low Density Polyethylene/EPDM Blends Having Tensile Strength Synergism, source: unknown. (32) Cowie, J. M. G., et al., Effect of Casting on the Stress-Hardening and Stress-Softening Characteristics of Kraton-G 1650 Copolymer Films, J. Macromol. Sci.-Phys., B16(4), 611–632 (1979). (33) Futamura, S., et al., Effects of Center Block Structure on the Physical and Rheological Properties of ABA Block Copolymers. Part II. Rheological Properties, Polymer Engineering and Science, August, 1977, Vol. 17, No. 8, pages 563–569. (34) Kuraray Co., LTD. MSDS, Kuraray Septon 4055, Hydrogenated Styrene Isoprene/Butadiene Block Copolymer, Apr. 25, 1991. (35) Hoening, et al. U.S. Pat. No.: 6,156,842, 23, May 2000, "Structures and fabricated articles having shape memory made from Alpha.-olefin/vinyl or vinylidene aromatic and/or hindered aliphatic vinyl or vinylidene interpolymers. (36) Shell Technical bulletin SC: 1102-89 "Kraton® Thermoplastic Rubbers in oil gels", April 1989. (37) Witco products literature #19610M 700-360: "White oils Petrolatum, Microcrystalline Waxes, Petroleum Distillates", 1996 Witco Corporation. (38) Witco presentation: "White Mineral Oils in Thermoplastic Elastomers", ANTEC 2002, May 5–8, 2002. (39) Lyondell literature LPC-81261/93, "Product Descriptions of White Mineral Oils", pp 30–33. (40) Collins, Jr., Henry Hill, "COMPLETE FIELD GUIDE TO AMERICAN WILDLIFE", 1959, LCCN: 58-8880. (41) Romanack, Mark, Bassin' with the Pros, 2001, LCCN: 2001086512. (42) Salamone, Joseph C., Concise Polymeric Materials Encyclopedia, CRC Press, 1999. (43) Lide, David R., Handbook of Chemistry and Physics, CRC Press, 78th Edition, 1997–1998. (44) Sigma year 2002–2003 Biochemical and Reagents for life Science Research, sigma-aldrich.com. (45) Kraton Polymers and Compounds, Typical Properties Guide, K0137 Brc-00U, 2001. (46) Kraton Thermoplastic Rubber, Typical properties 1988, SC: 68–78, 5/88 5M. (47) Humko chemical Product Guide, Witco 1988. (48) Opportunities with Humko chemical Kemamide fatty amides, Witco 1987. The above applications, patents and publications are specifically incorporated herein by reference.

Legge's paper teaches the development of (conventional substantially amorphous elastomer mid segment) SEBS triblock copolymers. In the polymerization of butadiene by alkylithium initiators, 1,4-addition or 1,2-addition polymers, mixtures, can be obtained. In forming styrene butadiene triblock copolymers involving the addition of solvating agents such as ethers just before the final styrene charge is added, any excess of ethers can alter the polybutadiene structure from a 1,4-cis or trans structure to a 1,2- or 3,4-addition polymer. Using difunctional coupling agent would give linear block copolymers and multifuntional agents would give star-shaped or radial block copolymers. Hydrogenation of the 1,4-polybutadiene structure yields polyethylene, while that of the 1,2-polybutadiene yields polybutylene. The resulting polyethylene will be essentially identical with linear, high-density polyethylene with a melting point, Tm, of about 136° C. Hydrogenation of 1,2-polybutadiene would yield atactic poly(1-butene) (polybutylene). The Tg of polybutylene is around −18° C. Random mixtures of ethylene and butylene units in the chain would suppress crystallinity arising from polyethylene sequences. The objective for a good elastomer should be to obtain a saturated olefin elastomeric segment with the lowest possible Tg and the best elastomeric properties. Such an elastomer favored using styrene as the hard-block monomer and selecting the best monomer for hydrogenation of the elastomer mid segment. Using a mixture of 1,4 and 1,2-polybutadiene as the base polymer for the mid segment would result in an ethylenelbutylene mid segment in the final product. The elements of selection of the midsegment composition is elastomer crystallinity and the elastomer Tg of an ethylene/butylene copolymer. Very low levels of crystallinity can be achieved around 40–50% butylene concentration. The minimum in dynamic hysteresis around 35% butylene concentration in the elastomeric copolymer. A value of 40% butylene concentration in the ethylene/butylene midsegment was chosen for the S-EB-S block copolymers. Clair's paper teaches that the EB midblock of conventional S-EB-S polymers is a random copolymer of ethylene and 1-butene exhibiting nearly no crystallinity in the midblock. In the preparation of ethylene-butylene (EB) copolymers, the relative proportions of ethylene and butylene in the EB copolymer chain can be controlled over a broad range from almost all ethylene to almost all butylene. When the EB copolymer is nearly all ethylene, the methylene sequences will crystallize exhibiting properties similar to low density polyethylene. In differential scanning calorimeter (DSC) curves, the melting endotherm is seen on heating and a sharp crystallization exotherm is seen on cooling. As the amount of butylene in the EB copolymer is increased, the methylene sequences are interrupted by the ethyl side chains which shorten the methylene sequences length so as to reduce the amount of crystallinity in the EB copolymer. In conventional S-EB-S polymers, the amount of 1-butene is controlled at a high enough level to make the EB copolymer midblock almost totally amorphous so as to make the copolymer rubbery and soluble in hydrocarbon solvents. Clair suggests that an S-EB-S polymer retaining at least some crystallinity in the EB copolymer midblock may be desirable. Therefore, a new family of S-EB-S polymers are developed (U.S. Pat. No. 3,772,234) in which the midblock contains a higher percentage of ethylene. The molecular weights of the new crystalline midblock segment S-EB-S polymers can vary from low molecular weight, intermediate molecular, to high molecular weight; these are designated Shell GR-3, GR-1, and GR-2 respectively. Unexpectly, the highest molecular weight polymer, GR-2 exhibits an anomalously low softening point. A broad melting endotherm is seen in the DSC curves of these polymers. The maximum in this broad endotherm occurs at about 40° C. Himes, et al., (U.S. Pat.

No. 4,880,878) describes SEBS blends with improved resistance to oil absorption. Papers (14)–(17) describes poly (ethylene-styrene) substantially random copolymers (Dow Interpolymers™): Dow S, M and E Series produced by metallocene catalysts, using single site, constrained geometry addition polymerization catalysts resulting in poly(ethylene-styrene) substantially random copolymers with weight average molecular weight (Mw) typically in the range of $1 \times 10^4$ to $4 \times 10^5$, and molecular weight distributions (Mw/Mn) in the range of 2 to 5. Paper (18) Prevorsek, et al., using Raman spectroscopy, WAXS, SAXD, and EM analysis interprets damage tolerance of ultrastrong PE fibers attributed to the nano scale composite structure that consists of needle-like—nearly perfect crystals that are covalently bonded to a rubbery matrix with a structure remarkably similar to the structure of NACRE of abalone shells which explains the damage tolerance and impact resistance of PE fibers. PE because of its unique small repeating unit, chain flexibility, ability to undergo solid state transformation of the crystalline phase without breaking primary bonds, and its low glass transition temperature which are responsible for large strain rate effects plays a key role in the damage tolerance and fatigue resistance of structures made of PE fibers. Chen (19) classifies 3 distinct categories of E (approximately 20–50 wt % styrene), M (approximately 50–70 wt % styrene), & S (greater than approximately 70 wt % styrene) substantially random or more appropriately pseudo-random ethylene-styrene copolymers or random copolymers of ethylene and ethylene-styrene dyads. The designated Ethylene-styrene copolymers are: E copolymers (ES16, ES24, ES27, ES28, ES28, ES30, and ES44 with styrene wt % of 15.7, 23.7, 27.3, 28.1, 39.6 & 43.9 respectively), M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively), S copolymers (ES72, ES73, and ES74 with styrene wt % of 72.7, 72.8, and 74.3 respectively). The maximum comonomer content for crystallization of about 20% is similar in other ethylene copolymers, such as in ethylene-hexene and ethylene-vinyl acetate copolymers. If the comonomer can enter the crystal lattice, such as in ethylene-propylene, compositions in excess of 20 mol % comonomer can exhibit crystallinity. The molecular weight distribution of these copolymers is narrow, and the comonomer distribution is homogeneous. These copolymers exhibit high crystalline, lamellar morphologies to fringed micellar morphologies of low crystallinity. Crystallinity is determined by DSC measurements using a Rheometric DSC. Specimens weighing between 5 and 10 mg are heated from −80 to 180° C. at a rate of 10° C./min (first heating), held at 190° C. for 3 min, cooled to −80° C. at 10° C./min, held at −80° C. for 3 min, and reheated from −80° C. to 180° C. at 10° C./min (second heating). The crystallinity (wt %) is calculated from the second heating using a heat of fusion of 290 J/g for the polyethylene crystal. Contributing effects of the crystallinity include decrease volume fraction of the amorphous phase, restricted mobility of the amorphous chain segments by the crystalline domains, and higher styrene content of the amorphous phase due to segregation of styrene into the amorphous phase. Table I of this paper shows values of Total Styrene (wt %), aPS (wt %), Styrene (wt %), Styrene (mol %), $10^{-3}$ Mw, Mw/Mn, and Talc (wt %) for Ethylene-styrene copolymers ES16–ES74 while FIGS. 1–12 of this paper shows: (1) melting thermograms of ESI 1st and 2nd heating for ES16, ES27, ES44, ES53, ES63, & ES74; (2) crystallinity from DSC as a function of comonomer content; (3) Logarithmic plot of the DSC heat of melting vs. Mole % ethylene for ESIs; (4) measured density as a function of styrene content for semicrystalline and amorphous ESIs; (5) % crystallinity from density vs % crystallinity from DSC melting enthalpy; (6) Dynamic mechanical relaxation behavior; (7) Glass transition temperature as a function of wt % ethylene-styrene dyads for semicrystalline and amorphous ESIs; (8) Arrhenius plots of the loss tangent peak temperature for representative semicrystalline and amorphous ESIs; (9) Draw ratio vs engineering strain; (10) Engineering stress-strain curves at 3 strain rates for ES27, ES63 and ES74; (11) Engineering stress-strain curves of ESIs; (12) Classification scheme of ESIs based on composition. (20) U.S. Pat. No. 5,872,201 describes interpolymers: terpolymers of ethylene/styrene/propylene, ethylene/styrene/4-methyl-1-pentene, ethylene/styrene/hexend-1, ethylene/styrene/octene-1, and ethylene/styrene/norbornene with number average molecular weight ($M_n$) of from 1,000 to 500,000. (21–24) U.S. Pat. Nos. 5,460,818; 5,244,996; EP 415815A; JP07,278,230 describes substantially random, more appropriately presudo-random copolymers (interpolymers), methods of making and their uses. (25) Alizadeh, et al., find the styrene interpolymers impedes the crystallization of shorter ethylene crystallizable sequences and that two distinct morphological features (lamellae and fringe micellar or chain clusters) are observed in ethylene/styrene (3.4 mol %) as lamella crystals organized in stacks coexisting with interlamellar bridge-like structures. (26) Guest, et al., describes ethylene-styrene copolymers having less than about 45 wt % copolymer styrene being semicrystalline, as evidenced by a melting endotherm in DSC testing (Dupont DSC-901, 10° C./min) data from the second heating curve. Crystallization decreases with increasing styrene content. Based on steric hindrance, styrene unit is excluded from the crystalline region of the copolymers. Transition from semi-crystalline to amorphous solid-state occurs at about 45 to 50 wt % styrene. At low styrene contents (<40%), the copolymers exhibit a relatively well-defined melting process. FIGS. 1–5 of this paper shows (a) DSC data in the T range associated with the melting transition for a range of ESI differing primarily in copolymer styrene content, (b) variation in percent crystallinity (DSC) for ESI as a function of copolymer S content, (c) elastic modulus versus T for selected ESI differing in S content, (d) loss modulus versus T for selected ESI differing in S content, (e) Tensile stress/strain behavior of ESI differing in S content, respectively. (35) Hoening, et al, teaches preparation of interpolymers ESI #1 to #38 having number average molecular weight (Mn) greater than about 1000, from about 5,000 to about 500,000, more specifically from about 10,000 to about 300,000.

(36) J. C. Randall, "A Review of High Resolution Liquid 13Carbon Nuclear Magnetic Resonance Characterizations of Ethylene-Based Polymers" JMS—Review Macromol. Chem. Phys., C29 (2 & 3), 201–317 (1989).

The present invention gel fishing bait are life like, soft, flexible, and capable of exhibiting buoyancy in water;

said fishing bait are resistant to ball-up during casting, resistant to tearing encountered during hook penetration, casting, and presentation;

said fishing bait having greater elongation, greater tear resistance, capable of exhibiting a greater success hook to catch ratio or greater fatigue resistance than a conventional plastisol polyvinyl chloride fishing bait of corresponding rigidity.

The gelatinous elastomer compositions of the present invention can be made firm or soft and non-tacky to the touch. For simplicity, the gelatinous elastomer compositions of the invention (which are highly tear resistant and rupture resistant than a conventional PVC fishing bait and optically transparent or clear) will be referred to herein as "invention gel(s)", or more simply refer to as "the gel(s)" or "said gel(s)".

As use herein, the tack level in terms of "Gram Tack" is determined by the gram weight displacement force to lift a polystyrene reference surface by the tip of a 16 mm diameter hemi-spherical gel probe in contact with said reference surface as measured on a scale at 23° C. (about STP conditions).

As used herein, the term "gel rigidity" in gram Bloom is determined by the gram weight required to depress a gel a distance of 4 mm with a piston having a cross-sectional area of 1 square centimeter at 23° C.

As described herein, the conventional term "major" means greater than 50 parts by weight and higher (e.g. 5.01, 50.2, 50.3, 50.4, 50.5, . . . 51, 52, 53, 54, 55, 56, 57, 58, 59, 60, 61, 62, 63, 64, 65, 66, 67, 68, 69, . . . 580 and higher based on 100 part by weight of (I) copolymers) and the term "minor" means 49.99 parts by weight and lower (e.g. 49, 48, 47, 46, 45, 44, 43, 42, 41, 40, 39, 38, 37, 36, 35, 34, 33, 32, 21, . . . 10, 9, 8, 7, 6, 5, 4, 3, 2, 1, 0.9, 0.8, 0.7 . . . 0.09 and the like) based on 100 parts by weight of the base (1) block copolymer(s).

The requirements of the invention gels for use as fishing bait are many. The invention gels (because of their non tacky feel in the hand) are suitable for forming articles for use outdoors (excellent for exposure to environmental extremes) requiring properties suitable for use under high stress, elongation, extremes of temperature as inside the fishermen's tickle box placed in the hot Sun. Summer heat can reach above about 90° F. to about 133° F. or higher inside an automobile or fishing metal or plastic tackle box. The invention gels are suitable for fishing presentations in fresh as well as in salt waters. The invention gels can be made with selectively low or soft to high gel rigidities and can be orientated multiple colored for special effects.

The fishing terms typically used in the sport which were developed by the fishermen prior to the invention gel fishing baits are given below. In many instants the terms defined refer to conventional PVC plastic or soft plastic baits which this invention gel improves upon. For purpose of the fishing baits made from the invention gels, the definition (although speaks in terms of PVC plastic baits) is adopted for the improved elastomer fishing bait of the instant invention gel and (when reading) in place of plastic or soft plastic, the fishing techniques as defined for use with conventional PVC are applicable to the present improved invention gel fishing baits. Keeping this in mind, one can appreciated the article in BASS Times, vol. 32, No. 6, page, and page 36, written by its Senior writer, Louie Stout regarding an experimental fishing bait of the invention being tested. The new improved fishing bait under test was expressed by Mr. Senior in terms of his knowledge in the plastic PVC and silicone lure art which explains the inaccuracy of language used in the article. For example, before this invention, the definition of artificial baits use by the sports fishing art does not include "soft elastomers", "elastomers", "elastomeric materials", or reference to the invention gel bait composition. This is why the BASS Times has termed the invention gel fishing bait a revolution.

Action—Measure of rod performance that describes the elapse time between flexion and return to straight configuration, ranges from slow to fast, with slow being the most amount of flexion.

Angler—Person using pole or rod and reel to catch fish.

Angling—Usually refers to the recreational catching of fish by means of hook and line; sport fishing; game fishing.

Artificial Baits—Lures or flies made of wood, plastic, metal, feathers, or similar inert material.

Aquatic insects: Water-bred insects which spend all or part of their life in water; e.g., midges, stoneflies, mayflies Baitcasting—Fishing with a revolving-spool reel and baitcasting rod; reel mounted on topside of rod.

Bait additive—Any liquid or powder used to color or flavor a bait.

Bait colorings—Various powder and liquid dyes are available to color a variety of baits.

Baitfish—Small fish often eaten by predators.

Bait flavorings—There are hundreds of different concentrated liquid bait flavorings.

Barbed hook—A hook with a barb cut into it near the point that helps keep the bait on the hook and ensures that fish stay hooked.

Barbless hook—A hook with no barb, that miminizes damage to delicate baits, ensures full penetration of the point into the mouth of a fish, and allows easy removal of the hook without damaging the fish.

Bent hook rig—A carp rig that originally featured a hook with a bent shank, which improved the hook-up rate of self-hooking rigs.

Black Bass—Term used to describe several types of bass; the most common being smallmouth, largemouth, and spotted bass.

Bloodworm—The small, red larvae of midges, found in the silt at the bottom of most waters.

Buoyancy—The tendency of a body to float or rise when submerged in a fluid.

C&R—Catch and Release.

CPR—Catch, Photograph, Release.

Cabbage—Any of several species of weeds, located above the surface or underwater.

Caddis—An insect of the order Trichoptera.

Carolina Rig—A deep-water assembly comprised of a heavy slip sinker, plastic bead, barrel swivel, 16- to 18-inch leader, hook, and soft-plastic bait such as a worm, lizard, or crawfish. Rigged weedless with the hook buried in the body of the bait, this combination is excellent for fishing ledges, points, sandbars, and humps.

Casters—The pupae of large maggots, widely used as a bait for most species of fish, often in conjunction with hemp and groundbait. Casters exposed to the air until they become crisp, dark floaters are best for the hook.

Catchability—The fraction of a fish stock which is caught by a defined unit of the fishing effort.

Catch Per Unit Of Effort—The catch of fish, in numbers or in weight, taken by a defined unit of fishing effort. Also called: catch per effort, fishing success, availability.

Cover—Cover refers to anything that a fish can hide in, behind or underneath. That includes weeds, rocks, trees, boat docks, boats, stumps, anything in the water that improves their chances to ambush unsuspecting baitfish.

Creel limit—The number of fish an angler can keep as set by local or state regulations.

Critically balanced bait—A hookbait, usually a boilie, whose buoyancy is such that it perfectly balances the weight of the hook, to minimize resistance to a taking fish.

Dropshot Rig—A hook such as the Yamamoto series 53 Splitshot hook is normally tied onto the main line with a Palomar knot. The tag end of the knot is left anywhere from 12" to 24" inches long. Once the knot is tied, the tag end is threaded through the hook eye in the direction that keeps the hook point positioned up. A swiveling style of sinker is then attached to the dangling tag end of the Palomar knot anywhere from 12" to 24" below the hook. The bait is then nose-hooked.

Eyed/spade-end hooks—Small hooks (size 16 or below) tend to be spade end, while larger sizes tend to be eyed. A spade is lighter than an eye for the same size hook, making the hook lighter and improving bait presentation with small baits.

Effectiveness Of Fishing—A general term referring to the percentage removal of fish from a stock (but not as specifically defined) as either rate of exploitation or instantaneous rate of fishing.

Fancast—A systematic series of casts to a specific area of water.

Finesse Fishing—An angling technique characterized by the use of light tackle—line, rods, reel and artificial baits (often tube worms, grubs, or other small-sized soft-plastic lures); often productive in clear, fairly uncluttered water.

Fish—Literally, a vertebrate (animal with a backbone) that has gills and lives in water, but generally used more broadly to include any harvestable animal living in water. Fishes refers to more than one type of fish; finfish refers to sharks, some rays and bony fishes, and scalefish refers to fish bearing scales.

Fishing Effort—The total fishing gear in use for a specified period of time. When two or more kinds of gear are used, they must be adjusted to some standard type. 2. Effective fishing effort.

Fisherman—One who engages in fishing for sport or occupation.

Fishhook—A barbed or barbless hook used for catching fish.

Fish oil —Various kinds of fish oil can be used to flavor deadbaits, pastes and boilies.

Flavor enhancer—A bait additive, usually in liquid form, designed to enhance the attractiveness of a bait flavoring.

Flipping—The term "Flipping" comes from the method of presentation that you use when fishing a jig or worm in heavy shallow cover.

Florida Rig—An advancement over the toothpick-pegging method, Florida rig sinkers are molded around a thin Teflon tube, and a corkscrew wire that screws in to the nose of a soft bait. Slip the sinker on the main line, tie the hook directly to the main line, and screw it into the bait. This provides the ultimate in weedless and snagless presentation for big bass in heavy cover.

Freshwater—In a broad sense 'freshwater' is used for all continental aquatic systems such as rivers and lakes. In a technical sense it refers to water with less than 0.5 grams per liter of total dissolved mineral salts.

Grub—A short, plastic type of worm usually rigged with a weighted jig hook.

Internet—The most widely used international communications computer network. To get access to the Internet, you need a modem or a connection to a LAN with Internet access. "What does that have to do with fishing?" you ask. Simple, that's how you got here.

Jerkbait—plugs that move with no built-in action of their own; any action comes from the fisherman's maneuvering the rod and line. The soft bodied baits are not worked so hard as their design requires a much less vigorous twitch or "jerk".

Jig—a hook with a leadhead that is usually dressed with hair, silicone, or plastic.

Jig-N-Pig—Combination of a leadhead jig and pork rind trailer; among the most effective baits for attracting trophy-size bass.

Larva—Refers to the subsurface stage of development of an aquatic insect.

Lipless Crankbaits—Artificial baits designed to resemble a swimming baitfish. Such plugs vibrate and/or wobble during retrieve; some have built-in rattles. Also called swimming baits.

Lobworm—A large garden worm that can be used whole or in sections on the hook, especially for eels, chub, tench, carp, barbel, bream and roach, or chopped up for use as feed.

Maggots—Large maggots, the larvae of bluebottles, are the most commonly used bait in coarse fishing.

Mealworms—Small, wiry grubs that can be an effective hookbait, especially for roach.

Microbarbed hook—A hook with a tiny barb to minimize damage to the mouth of a fish and to baits such as maggots.

Minnow—A shoal fish found in running water but rarely exceeding 7.5 cm (3 in) in length. Minnows are regarded as a nuisance by most anglers, but make effective livebaits or deadbaits for perch, eels and chub.

Nymphs—Flies made to sink below the surface of the water and imitate immature insects Offset hook—A hook with the point bent at a slight angle to the shank. If you lay this kind of hook down, it will not sit flat.

Outpoint hook—A hook with the point curved slightly away from the shank.

Paternoster rig—A rig in which hooklength branches from the main line, rather than being a continuation of it.

Presentation—A collective term referring to choice of type of lure, color, and size; structure targeted; amount of disturbance a bait makes when entering the water; and retrieval technique, speed, and depth used to catch fish.

Redworm—Small (2.5–5 cm/1–2 in) red worm found in compost and manure heaps.

Round-bend hook—Hooks with round bends have a wider gape for large baits such as bread, worms, luncheon meat and sweetcorn.

Sea fish—Various sea fish, including sprats, sardines, herrings, smelts and mackere as baits for pike.

Shad—Any of several cluepeid fishes that have a rather deep body.

Skirt—Usually a rubber or vinyl addition to a lure that gives it action and texture Slugs—Large black slugs are a good bait for chub, especially when freelined.

Soft Jerkbait—A plastic jerkbait.

Splitshot Rig—Knot a hook to the end of your line, bait up and pinch one or a few split shot 18" to 24" inches above the bait.

Soft Bottom—River bottoms which are comprised of soft material such as silt, mud, or muck.

Spinnerbait—A spinnerbait is a hard lure generally consisting of a large single hook, a lead head, a rubber or vinyl skirt, wire and a spinning blade. These are one of the most versatile of all the lures made for bass fishing. They can be buzzed along the surface, worked with a steady or erratic retrieve at any depth and slowly crawled along the bottom with the blade just barely turning.

Success (of fishing)—Catch per unit of effort.

Tail—The length of line, including the hooklength, between the hook and a leger or paternoster.

Tail-Spinners—Compact, lead-bodied lures with one or two spinner blades attached to the tail, and a treble hook suspended from the body; designed to resemble a wounded shad; effective on schooling bass.

Texas Rig—The method of securing a hook to a soft-PVC plastic bait—worm, lizard, crawfish, by burying the hook point into the body of the lure. The "Texas rig" is probably the most popular and most recognized method of fishing plastic worms. This rig consists of a bullet shaped sinker (of any size), a single hook (called a Sproat, Offset or Worm hook). This rig can be used in any depth of in any type of cover. The type of plastic bait that you attach is usually a plastic worm or lizard of some size.

Texas Rigged Worms—The most popular worm-fishing technique, but also the most difficult to master. In this rig, the hook is threaded through the tip of the worm and the point is turned back into the head of the worm to make it weedless, meaning the point is not exposed and will not get snagged in the weeds. When fishing in heavy cover, you can peg the slip sinker by inserting a toothpick through the hole of the sinker. This will keep the sinker from hanging up, and will increase your feel of the lure. To prevent the worm from sliding down the hook shank, push the eye of the hook down into the plastic worm, spear a 50 lb test piece of monofilament fishing line through both the tip of the worm and the hook eye and trim the ends of the monofilament.

Texposed—A Texas rigged plastic bait that has the point of the hook going through the plastic, thus exposing the point of the hook. This is a good rig to use in relatively brush or weed free water conditions.

Trailer Hook—A trailer in fishing terms is an extra piece of plastic that you attach to the end of the hook of your spinnerbait or jig. It makes your bait look bigger and gives more action. A trailer hook is an extra single hook that you attach to your lure (more commonly a spinnerbait) if the bass are striking at the skirt of the bait and are missing the main hook.

Trigger—The sight, sound, smell, taste, texture, or vibration of a lure which entices a fish to strike.

Unpegged Texas Rig—A conical sinker is allowed to slide freely on the main line, with the hook tied directly to the main line. Optionally use a bead. The sinker will jackhammer constantly against the bead and make a tiny clicking noise that can attract fish at times. One difficulty is an unpegged sinker can slide far up the line on the cast, making for inaccurate casts and imprecise presentations. An unpegged sinker can also slide far down the line and get your rig stuck in snaggy cover. For more control over an unpegged sinker, you can contain it on a short 12 to 24" leader tied to a swivel. This gives you the desirable unpegged lure movement (and bead-clicking option) while at the same time, the short leader gives you better control over the cast and presentation.

Water Dog—Any of several large American salamanders.

Wacky Rig—In relatively open water, simply tie a hook such as the Red Octopus to your line, and thread the hook straight through the middle of a slanky bait such as a Senko or worm. In some cases, to get a thin bait deeper quicker, you may want to string a very small bullet sinker to slide freely on the line above the hook.

Weightless Rig—The purest form of rigging, and most deadly with the Senko. No sinker is used and the hook can be tied directly to the main line. Optionally, tie the hook to a 12" to 24" inch leader tied to a free-turning swivel that dissipates the line twist which often occurs with unweighted soft baits.

Worming—The act of fishing with a plastic worm, lizard, crawfish, or similar bait. A soft thin PVC plastic bait that is in the shape of your garden variety earthworm. However the shape is about the only thing that resembles them. Their sizes range from about 3 inches to over twelve inches! Their colors are every color imaginable and unimaginable. You can fish these as topwater, using floating worms or on the bottom using any number of methods.

Yolk Sac—In embryos and early fish larvae, a bag-like ventral extension of the gut containing materials. It nourishes the growing fish until it is able to feed itself.

Almost all fish love live fish. The big fish likes to eat smaller fish and other natural looking prey, such as baitfish, boodworm, caddis, casters, cheese, crayfish, cricket, cut bait, fish eggs, fish larvae, frogs, grub, guppies, insects, lizards, lobworm, maggots, mayflies, mealworms, minnows, night-crawler, nymphs, redworm, reptiles, salamanders, shad, shrimp, sinks, slugs, small fishes, snakes, squid, swordtails, water dog, other worms, and the like.

Fishing baits made from the invention gels may have one or more built-in rattles or pre-formed cavity connected by a channel for later insertion of a rattle for trigger which are conventionally use with PVC soft plastic baits. Since the molten temperature of the invention is much higher than required to melt PVC plastosol, rattles must be contained in a heat resistant (above about 275° F. to about 450° F.) enclosure for molding into the invention gel bait or the rattles can be glue onto the invention gel bait with glues described below. When molded into the invention gel bait, the rattle can be removed by inserting a sewing needle (the sharp point of a fishing hook, a thumb tack, tip of a wire, or any sharp point) through the gel into the region of the rattle. A pin hole can also be molded by using a fine wire with the rattle in place to avoid having to push a needle through the gel. This is called the "rattle through a pin hole method" or "pin hole method". The rattle can then be forced or pushed out through the pin hole path made by the needle. Because of the invention gel is tear resistant, the pin hole can be enlarged without tearing. The pin hole method does not require a connecting channel to a pre-formed cavity which promotes drag in the water. The small side of the fishing bait, any cavity or connecting channel can promote a great amount of drag. Any undesirable drag will affect the performance of the fishing bait. The same rattle or a larger rattle can be re-inserted any time as desired or any liquid substance (such as a fish attractant, e.g., fish oil and the like) can be injected in the rattle's place. Multiple pin holes can be made in the invention gel bait as desired with out affecting the use of the gel bait. A low temperature rattle can also be use with the fishing bait by first molding the fishing bait with a similar shaped temperature resistant blank, later removed through a pin hole and the desired rattle inserted in place.

The invention baits are suitable for catching all types of freshwater fish such as: lampreys, bony fishes, sturgeons, paddlefishes, gars, perch, pike, muskellunge, walleye, white bass, pickerel, carp, all types of bass (smallmouth bass, yellow bass, and the like) catfish, bullhead, herrings, shads, salmons, trouts, and the like.

The live action invention gel fishing baits can last more than five times longer without damage and replace completely the used of conventional PVC plastisol fishing baits which have been determined to contain controversial toxic plasticizers and banned by JAFTMA and certain European countries.

The invention gel fishing baits are about the best to live food, since they can be made soft, they move fast and are extremely slippery in the water and have the motion very much like live prey. The invention gel fishing baits can not only exhibit action, but are capable of exhibiting buoyancy in water, and can be made to have low tack or be non-tacky to the touch. The invention gel fishing baits are rupture resistant to dynamic stretching, shearing, resistant to ball-up during casting, resistant to tearing encountered during hook penetration, and casting. Therefore, the invention gel fishing baits can be use to catch fish in all manner of presentations of bait, hook, and line combinations including with barbed hooks, barbless hooks bent hooks rig, carolina rig, when critically balanced baiting, dropshot rig, eyed hook, fancasting, finesse fishing, flipping, floating (float fishing), florida rig, jerkbait, jig, jig-n-pig, offset hook, paternoster rig, pegged texas rig, pro-jo rig, round-bend hook, splitshot rig, strike zone, swimming lure, texas rigged worms, tight-action plug, trailer hook, unpegged texas rig, wacky rig, weightless rig, worming and the like. The invention gel fishing bait exhibits five times greater elongation, greater tear resistance, and greater fatigue resistance than a conventional plastisol polyvinyl chloride fishing bait of corresponding rigidity.

As a consequence, the invention gel fishing baits are a boon to the angler giving him a success hook to catch ratio of at least greater than 5 in side by side fishing with a conventional plastisol PVC bait. Thereby, increasing his catch per unit of effort, increasing his fishing effectiveness, minimizing his fishing effort of presentation and maximizing his success.

The polymers useful in forming the gel compositions of the invention comprises high viscosity triblock and branched copolymers. The triblock copolymers have the general configuration A-B-A, wherein each A is a glassy polymer end block segment of polystyrene and B is a elastomeric polymer center block segment of poly(ethylene-butylene), poly(ethylene-propylene) or poly(ethylene-ethylene-propylene). The useful high viscosity branched copolymers have the general configuration $(A-B)_n$ wherein A is polystyrene and B is (ethylene-butylene), (ethylene-propylene) or (ethylene-ethylene-propylene) and the subscript n is an number. The B and A portions of the triblock and branched copolymers are incompatible and form a two-phase system consisting of sub-micron domains of glassy polystyrene interconnected by flexible B chains. These domains serve to crosslink and reinforce the structure. This physical elastomeric network structure is reversible, and heating the polymer above the softening point of polystyrene temporarily disrupt the structure, which can be restored by lowering the temperature. The notations A-B-A and A-Z-A are used, where midblock(s) are denoted by B or Z is use to avoid confusion of B with butadiene or butylene as use in the notations SBS, SEBS, and the like.

In the case of styrene glassy end blocks, the hydrogenated styrene isoprene/butadiene block copolymer(s) have the formula poly(styrene-ethylene-ethylene-propylene-styrene). The SEEPS linear copolymers are characterized as having a Brookfield Viscosity value at 5 weight percent solids solution in toluene at 30° C. of from less than about 40 cps to about 150 cps and higher, advantageously from about 40 cps to about 60 cps and higher, more advantageously from about 50 cps to about 80 cps and higher, still more advantageously from about 70 cps to about 110 cps and higher, and even more advantageously from about 90 cps to about 180 cps and higher.

The star-shaped copolymers are characterized as having a Brookfield Viscosity value at 5 weight percent solids solution in toluene at 30° C. of from about 150 cps to about 380 cps and higher, advantageously from about 150 cps to about 260 cps and higher, more advantageously from about 200 cps to about 580 cps and higher, and still more advantageously from about 500 cps to about 1,000 cps and higher.

Generally, one or more (E) midblocks can be incorporated at various positions along the midblocks of the block copolymers. The lower flexibility of block copolymer gels due to (E) midblocks can be balanced by the addition of sequentially (W) midblocks. For example, the sequentially synthesized block copolymer S-E-EB-S can maintain a high degree of flexibility due to the presence of amorphous -EB-block. The sequential block copolymer S-E-EB-B-S can maintain a high degree of flexibility due to the presence of amorphous -EB- and -B- midblocks. The sequential block copolymer S-E-EP-E-S can maintain a high degree of flexibility due to the presence of -EP— midblock. The sequential block copolymer S-E-B-S can maintain a high degree of flexibility due to the presence of the -B- midblock. For S-E-S, where the midblock may be crystalline and flexibility low, physical blending with amorphous block copolymers such as S-EP-S, S-EB-EP-S, $(S-EP)_n$ and the like can produce more softer, less rigid, and more flexible gel. Because of the high viscosity of the block copolymers and (E) midblocks, the invention gel exhibit different physical characteristics and improvements over amorphous gels including damage tolerance, improved crack propagation resistance, improved tear resistance producing knotty tears as opposed to smooth tears, improved resistance to fatigue, higher hysteresis, etc. Moreover, the invention gels when stretched exhibit additional yielding as shown by necking caused by stress induced crystallinity or yielding of the styrene glassy phases.

Regarding resistance to fatigue, fatigue (as used herein) is the decay of mechanical properties after repeated application of stress and strain. Fatigue tests give information about the ability of a material to resist the development of cracks or crazes resulting from a large number of deformation cycles. Fatigue test can be conducted by subjecting samples of amorphous and gels to deformation cycles to failure (appearance of cracks, crazes, rips or tears in the gels).

Tensile strength can be determined by extending a selected gel sample to break as measured at 180' U bend around a 5.0 mm mandrel attached to a spring scale. Likewise, tear strength of a notched sample can be determined by propagating a tear as measured at 180' U bend around a 5.0 mm diameter mandrel attached to a spring scale.

Various block copolymers can be obtained which are amorphous, highly rubbery, and exhibiting minimum dynamic hysteresis:

Block Copolymer S-EB-S

The monomer butadiene can be polymerized in a ether/hydrocarbon solvent to give a 50/50 ratio of 1,2 poly(butadiene)/1,4 poly(butadiene) and on hydrogenation no long runs of —$CH_2$— groups and negligible crystallinity, ie, about $(0.5)^4$ or 0.06 or 6% and actual crystallinity of about 3%. Due to the constraints of Tg and minimum hysteresis, conventional S-EB-S have ethylene-butylene ratios of about 60:40 with a crystallinity of about $(0.6)^4$ or 0.129 or 12% and actual crystallinity of about 7.7%.

Block Copolymer S-EP-S

The monomer isoprene when polymerized will produce 95% 1,4 poly(isoprene)/5% 3,4 poly(isoprene) and upon hydrogenation will form amorphous, rubbery poly(ethylene-propylene) midblock and no long runs of —$CH_2$— and no crystallinity.

Mixed Block Copolymer S-EB/EP-S

The polymerization of a 50/50 mixture of isoprene/butadiene monomers in suitable ether/hydrocarbon solvents to give equal amounts of 1,2 and 1,4 poly(butadiene) on hydrogenation will produce a maximum crystallinity of $(0.25)^4$ or 0.4%. The actual crystallinity would be approximately about 0.2%, which is negligible and results in a good rubbery midblock.

The polymerization of a 80/20 mixture of isoprene/butadiene monomers in suitable ether/hydrocarbon solvents to give equal amounts of 1,2 and 1,4 poly(butadiene) will upon hydrogenation produce a low crystallinity of $(0.10)^4$ or 0.01%. The actual crystallinity would be approximately about 0.006%, which is negligible and results in a good rubbery midblock.

The polymerization of a 20/80 mixture of isoprene/butadiene monomers in suitable ether/hydrocarbon solvents to give equal amounts of 1,2 and 1,4 poly(butadiene) will upon hydrogenation produce a low crystallinity of $(0.4)^4$ or 2.56%. The actual crystallinity would be approximately about 1.53%, which is negligible and results in a good rubbery midblock.

Block Copolymer S-EEP-S

The polymerization of a 20/80 mixture of isoprene/butadiene monomers in suitable ether/hydrocarbon solvents to give a 40:60 ratio of 1,2 and 1,4 poly(butadiene) will upon hydrogenation produce a low crystallinity of $(0.48)^4$ or 5.3%. The actual crystallinity would be approximately about 3.2%, which is negligible and results in a good rubbery midblock. This theoretical % of actual crystallinity corresponds well to commercially available SEEPS Septon 4033 and 4055 which varies with batch lots.

The midblock components (Z) can comprise various combinations of midblocks between the selected end blocks (A); these include: -E-EB-, -E-EP-, -E-EP-E-, -E-EB-E-, -E-E-EP-, -E-E-EB-, and the like.

The (Z) midblock of two or more polymer chains can be obtained by hydrogenation methods, for example: 1,4-polybutadiene ($B_{1,4}$) can be converted by hydrogenation to poly(ethylene), 1,4-polybutadiene ($B_{1,4}$) and 1,2-polybutadiene ($B_{1,2}$) can be converted by hydrogenation to poly(ethylene-butylene), 1,4-poly-isoprene ($I_{1,4}$) can be converted by hydrogenation to poly(ethylene-propylene), 1,2-polybutadiene ($B_{1,2}$) can be converted by hydrogenation to atactic poly(1-butene)(polybutylene), 1,4-polybutadiene ($B_{1,4}$) and polyisoprene (I) 1,4-poly-butadiene ($B_{1,4}$) can be converted by hydrogenation to poly(ethylene-ethylene-co-propylene-ethylene), 2-methyl-1,3-polybutadiene and 1,3-polybutadiene (I, $B_{1,3}$) can be converted by hydrogenation to poly(ethylene-ethylene-co-propylene), and the like. Polypropylene can be modified by tailblocking a poly(ethylene-propylene) copolymer segment on the propylene block to form poly(propylene-ethylene-co-propylene); likewise, poly(ethylene-propylene)$_n$ (EP), poly(propylene-ethylene-co-propylene-propylene) (P-EP-P), poly(propylene-ethylene-propylene) (P-E-P), poly(ethylene-ethylene-co-propylene) (E-EP) can be formed. It is noted herein that B (bold) denotes polybutadiene and B (plain) denotes polybutylene.

Further, the multiblock copolymers ($A^n$-Z-$A^n$) can be obtained by various synthesis methods including hydrogenation of selected block copolymers. When the subscript n of A is =1, (polystyrene) (S), for example, suitable block copolymers can be converted to the useful multiblock copolymers forming the invention gels. These include: conversions of S-I-$B_{1,3}$-S to (S-E-EP-S), S-$B_{1,4}$-I-$B_{1,4}$-S to (S-E-EP-E-S), S-$B_{1,2}$-I-S to (S-B-EP-S), S-$B_{1,3}$-$B_{1,2}$-$B_{1,4}$-S to (S-E-EB-S), S-$B_{1,4}$-$B_{1,2}$-I-S to (S-EB-EP-S), S—$B_{1,3}$-$B_{1,2}$-$B_{1,4}$-S to (S-E-EP-EB-S), etc. As denoted herein abbreviations are interchangeably used, for example, (S-E-EP-S) denotes poly(styrene-ethylene-ethylene-co-propylene-styrene). Other linear multiblock copolymers (denoted in abbreviations) can be formed, including: (S-B-EB-S), (S-E-EB-E-S), (S-B-EP-E-S), (S-B-EB-E-S), (S-E-E-EP-S), (S-E-E-EB-S), and the like.

The multiblock star-shaped (or radial) copolymers $(A_n-Z)_n$ can be obtained by various synthesis methods including hydrogenation of selected block copolymers. When the subscript n of A is =1, (polystyrene) (S), for example, suitable block copolymers can be converted to the useful multiblock copolymers forming the invention gels. These include: conversions of (S-I-$B_{1,3}$)$_n$ to poly(styrene-ethylene-ethylene-co-propylene)$_n$ denoted by the abbreviation (S-E-EP)$_n$, (S-$B_{1,4}$-I-$B_{1,4}$)$_n$ to (S-E-EP-E)$_n$, S-$B_{1,2}$-I)$_n$ to (S-B-EP)$_n$, (S-$B_{1,3}$-$B_{1,2}$-$B_{1,4}$)$_n$ to (S-E-EB)$_n$, (S-$B_{1,4}$-$B_{1,2}$-I)$_n$ to (S-EB-EP)$_n$, (S-I-$B_{1,3}$-$B_{1,2}$-$B_{1,4}$)$_n$ to (S-E-EP-EB)$_n$, etc. Other multiblock copolymers can be formed, including: (S-B-EB)$_n$, (S-E-EB-E)$_n$, (S-B-EP-E)$_n$, (S-B-EB-E)$_n$, (S-B-EP-B)$_n$, (S-B-EB-B)$_n$, (S-E-E-EP)$_n$, (S-E-E-EB)$_n$, (S-B-E-EP)$_n$, (S-B-E-EB)$_n$, (S-B-B-EP)$_n$, (S-B-B-EB)$_n$, (S-E-B-EB)$_n$, (S-E-B-EP)$_n$, (S-EB-EB)$_n$, (S-EP-EP)$_n$, (S-E-EB-EB)$_n$, (S-E-EP-EP)$_n$, (S-E-EB-EP)$_n$, (S-B-EB-EB)$_n$, (S-B-EP-EP)$_n$, and the like.

The Z and A portions of the linear and star-shaped multiblock copolymers are incompatible and form a two or more-phase system consisting of sub-micron glassy domains (A) interconnected by flexible Z chains. These domains serve to crosslink and reinforce the structure. This physical elastomeric network structure is reversible, and heating the polymer above the softening point of the glassy domains temporarily disrupt the structure, which can be restored by lowering the temperature.

It should be noted that when the A to Z ratios falls substantially below about 30:70, various properties such as elongation, tensile strength, tear resistance and the like can decrease while retaining other desired properties, such as gel rigidity, flexibility, elastic memory.

The most preferred gels can be prepared by melt blending an admixture comprising: (1) 100 parts by weight of one or more of a high viscosity triblock or branched copolymers or a mixture of two or more of poly(styrene-ethylene-ethylene-propylene-styrene), poly(styrene-ethylene-butylene-styrene), poly(styrene-ethylene-propylene-styrene), (styrene-ethylene-propylene)$_n$, (styrene-ethylene-butylene)$_n$, and optionally in combination with (II) a selected amount of one or more polymer or copolymer selected from the group consisting of poly(styrene-butadiene-styrene), poly(styrene-butadiene), poly(styrene-isoprene-styrene), poly(styrene-isoprene), poly(styrene-ethylene-propylene), poly(styrene-ethylene-ethylene-propylene-styrene) poly(styrene-ethylene-propylene-styrene), poly(styrene-ethylene-butylene-styrene), poly(styrene-ethylene-butylene), poly (styrene-ethylene-propylene)$_n$, poly(styrene-ethylene-butylene)$_n$, polystyrene, polybutylene, poly(ethylene-propylene), poly(ethylene-butylene), polypropylene, or polyethylene, wherein said selected copolymer is a linear, branched or star-shaped, or multiarm copolymer; and (111) from about 300 to about 1,600 parts by weight of an plasticizing oil.

As used herein, the liner triblock copolymers poly(styrene-ethylene-ethylene-propylene-styrene) is denoted by "SEEPS", poly(styrene-ethylene-butylene-styrene) is denoted by "SEBS", poly(styrene-ethylene-propylene-styrene) is denoted by "SEPS"; and the branched copolymers poly(styrene-ethylene-propylene)$_n$ is denoted by "(SEP)$_n$", and poly(styrene-ethylene-butylene)$_n$ is denoted by "(SEB)

$_n$". Branched copolymers are often times conventionally referred to as radial or star-shaped polymers.

Gel compositions of the invention are characterized by gel rigidities of from less than about 20 gram Bloom to about 700 gram Bloom and higher. As used herein, the term "gel rigidity" in gram Bloom is determined by the gram weight required to depress a gel a distance of 4 mm with a piston having a cross-sectional area of 1 square centimeter at 23° C.

It should be noted that when the A to B ratio falls substantially below 31:69, various properties such as elongation, tensile strength, tear resistance and the like can decrease while retaining other desired properties, such as gel rigidity, flexibility, elastic memory.

In general, for these block copolymers, the various measured viscosities of 5, 10, 15, and 20, weight percent solution values in toluene at 30° C. can be extrapolated to a selected concentration. For example, a solution viscosity of a 5 weight percent copolymer solution in toluene can be determined by extrapolation of 10, 15, and 20 weight percent measurements to 5 weight percent concentration.

The Brookfield Viscosities can be measured at various neat polymer concentrations, for example, the selected high viscosity linear multiblock copolymers in (I) can have a typical Brookfield Viscosity value of a 20 weight percent solids solution in toluene at 25° C. of about 1,800 cps and higher, and advantageously about 2,000 cps and higher.

Examples of high viscosity multiblock copolymers (I) having two or more midblocks are Kuraray's (S-E-EP-S) 4033, 4045, 4055 and 4077 hydrogenated styrene isoprene/butadiene block copolymers, more specifically, hydrogenated styrene block polymer with 2-methyl-1,3-butadiene and 1,3-butadiene. Kuraray's 4055 (S-E-EP-S) multiblock copolymer and 4077 exhibit viscosities at 5 weight percent solution in toluene at 30° C. of about 90 cps to about 120 cps and about 200 to about 380 cps respectively. At 10 weight percent SEEPS 4055 is about 5,800 cps and higher. Other linear and star multiblock copolymers (I) such as (S-E-EP-S), (S-E-EP-E-S), (S-B-EP-S), (S-E-EB-S), (S-EB-EP-S), (S-E-EP-EB-S), (S-B-EB-S), (S-E-EB-E-S), (S-B-EP-E-S), (S-B-EB-E-S), (S-B-EP-B-S), (S-B-EB-B-S), (S-E-E-EP-S), (S-E-E-EB-S), (S-B-E-EP-S), (S-B-E-EB-S), (S-B-B-EP-S), (S-B-B-EB-S), (S-E-B-EB-S), (S-E-B-EP-S), (S-E-EB-EP-S), (S-E-EP-EP-S), (S-E-EB-EP-S), (S-B-EB-EB-S), (S-B-EP-EP-S), (S-B-EB-EP-S), (S-B-EP-EB-S), (S-E-EP-E-EP-S), (S-E-EP)$_n$, (S-E-EP-E)$_n$, (S-B-EP)$_n$, (S-E-EB-S)$_n$, (S-EB-EP—)$_n$, (S-E-EP-EB)$_n$, (S-B-EB)$_n$, (S-E-EB-E)$_n$ can also exhibit viscosities at 5 weight percent solution in toluene at 30° C. of from less than about 100 to about 200, 300, 400, 500, 600, 700, 800, 900, 1,000, 1,200, 1,300, 1,600, 1,800, 2,000 cps and higher.

The high viscosity triblock, radial, star-shaped, and multiarm copolymers in (I) which are suitable for use in the present invention has a typical Brookfield Viscosity value of a 20 weight percent solids solution in toluene at 25° C. of at least about 1,800 cps, and preferably about 2,000 cps or higher. Typically, the Brookfield Viscosity values can range from at least about 1,800 to about 16,000 cps and higher. More typically, the Brookfield Viscosity values can range from at least about 1,800 cps to about 40,000 cps and higher. Still more typically, the Brookfield Viscosity values can range from at least about 1,800 cps to about 80,000 cps and higher. Due to structural variations between the triblock, radial, star-shaped, and multiarm copolymers, the high viscosity branched copolymers useful in the invention, typically, may exhibit a lower Brookfield Viscosity value than its counterpart triblock copolymers. However, when the triblock copolymers are considered as branched, then at equal branch lengths, the solution viscosities of the triblock copolymers and branched copolymers are about the same or equivalent. In other words, the typical Brookfield Viscosity values for branched copolymers of a 20 weight percent solids solution in toluene at 25° C. can be less than their counterpart triblock copolymers.

In all cases, the molecular chain lengths (molecular weights) of the triblock and branch copolymers must be sufficient to meet the high solution Brookfield Viscosities requirements described herein that is necessary for making the extremely soft and strong gel compositions.

The high viscosity triblock and branched copolymers: SEEPS, SEBS, SEPS, (SEB)$_n$, and (SEP)$_n$ can be measured under varying conditions of weight percent solution concentrations in toluene. The most preferred and useful triblock and branched copolymers selected have Brookfield Viscosity values ranging from about 1,800 cps to about 80,000 cps and higher when measured at 20 weight percent solution in toluene at 25° C., about 4,000 cps to about 40,000 cps and higher when measured at 25 weight percent solids solution in toluene. Typical examples of Brookfield Viscosity values for branched copolymers (SEB)$_n$ and (SEP)$_n$ at 25 weight percent solids solution in toluene at 25° C. can range from about 3,500 cps to about 30,000 cps and higher; more typically, about 9,000 cps and higher. Other preferred and acceptable triblock and branched copolymers can exhibit viscosities (as measured with a Brookfield model RVT viscometer at 25° C.) at 10 weight percent solution in toluene of about 400 cps and higher and at 15 weight percent solution in toluene of about 5,600 cps and higher. Other acceptable triblock and branched copolymers can exhibit about 8,000 to about 20,000 cps at 20 weight percent solids solution in toluene at 25° C. Examples of most preferred high viscosity triblock and branched copolymers can have Brookfield viscosities at 5 weight percent solution in toluene at 30° C. of from about 40 to about 50 cps and higher. While less preferred polymers can have a solution viscosity at 10 weight percent solution in toluene at 30° C. of about 59 cps and higher.

The high viscosity triblock, radial, star-shaped, and multiarm copolymer of the invention can have a broad range of styrene end block to ethylene and butylene center block ratio of about 20:80 or less to about 40:60 or higher. Examples of high viscosity triblock copolymers that can be utilized to achieve one or more of the novel properties of the present invention are styrene-ethylene-butylene-styrene block copolymers (SEBS) available from Shell Chemical Company and Pecten Chemical Company (divisions of Shell Oil Company) under trade designations Kraton G 1651, Kraton G 1654x, Kraton G 4600, Kraton G 4609 and the like. Shell Technical Bulletin SC: 1393-92 gives solution viscosity as measured with a Brookfield model RVT viscometer at 25° C. for Kraton G 1654X at 10% weight in toluene of approximately 400 cps and at 15% weight in toluene of approximately 5,600 cps. Shell publication SC:68-79 gives solution viscosity at 25° C. for Kraton G 1651 at 20 weight percent in toluene of approximately 2,000 cps. When measured at 5 weight percent solution in toluene at 30° C., the solution viscosity of Kraton G 1651 is about 40. Examples of high viscosity SEBS triblock copolymers includes Kuraray's SEBS 8006 which exhibits a solution viscosity at 5 weight percent at 30° C. of about 51 cps. Kuraray's 4055 SEEPS (styrene-ethylene/ethylene-propylene-styrene) block polymer made from hydrogenated styrene isoprene/butadiene block copolymer or more specifically made from hydrogenated styrene block polymer with 2-methyl-1,3-butadiene and 1,3-butadiene which exhibits a viscosity at 5 weight percent solution in toluene at 30° C. of about 90 mPa-S, at 10 weight percent about 5800 mPa-S. Kuraray's 2006 SEPS polymer exhibits a viscosity at 20 weight percent solution in toluene at 30° C. of about 78,000 cps, at 5 weight percent of about 27 mPa-S, at 10 weight percent of about 1220 mPa-S, and at 20 weight percent 78,000 cps. Kuraray SEPS 2005 polymer exhibits a viscosity at 5 weight percent solution in toluene at 30° C. of about 28 mPa-S, at 10 weight percent of about 1200 mPa-S, and at 20 weight percent 76,000 cps. Other grades of SEBS, SEPS, $(SEB)_n$, $(SEP)_n$ polymers can also be utilized in the present invention provided such polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene (S:EB) weight ratios for the Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values. In the case of Kuraray's SEBS polymer 8006 the S:EB weight ratio is about 35:65. In the case of Kuraray's 2005, 2006, and 4055 the and S:EEP weight ratios are 20, 35 and 30 respectively. Much like S:EB ratios of SEBS and $(SEB)_n$, the S:EP ratios of very high viscosity SEPS, $(SEP)_n$ copolymers are expected to be about the same and can vary broadly.

The S:EB, S:EP weight ratios of high viscosity SEBS, SEPS, $(SEB)_n$, and $(SEP)_n$ useful in forming the gel compositions of the invention can range from lower than about 20:80 to above about 40:60 and higher. More specifically, the values can be 19:81, 20:80, 21:79. 22:78. 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, 51:49 and etc. Other ratio values of less than 19:81 or higher than 51:49 are also possible. Broadly, the styrene block to elastomeric block ratio of the high viscosity triblock, radial, star-shaped, and multiarm copolymers of the invention is about 20:80 to about 40:60 or higher, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and most preferably about 33:67. In accordance with the present invention, triblock copolymers such as Kraton G 1654X having ratios of 31:69 or higher can be used and do exhibit about the same physical properties in many respects to Kraton G 1651 while Kraton G 1654x with ratios below 31:69 may also be use, but they are less preferred due to their decrease in the desirable properties of the final gel.

Theory notwithstanding, the multiblock copolymer gel properties can be attributed to the additional blocks affecting the separate polymer phases, the additional blocks affecting the heterophase structure, the additional blocks affecting the interfacial regions between phases of the multiblock polymers, the additional blocks forming a separate phase or inducing the formation of additional separate phases, or the high molecular weight and combination of high styrene content of the block copolymer. Due to the additional number of midblocks of the copolymers (I), the differences in solubility parameters between (A) and (Z) becomes greater than the solubility parameters differences between (A) and (D) of triblock copolymers, where D denotes the lone midblock polymer chain. Moreover, the presence of additional midblocks of ethylene, propylene, butylene, ethylene-propylene, or ethylene-butylene may contribute to stress-induced crystallization. This may explain why as the viscosity of the multiblock copolymers is increased to a higher level, the appearance of the invention gels change from clear to more translucent white.

The Kuraray SEPTON 4000 series block polymers: 4033, 4055, 4045, and the like useful in making the gels of the instant invention are made from hydrogenated styrene isoprene/butadiene styrene block copolymer or more specifically made from hydrogenated styrene block polymer with 2-methyl-1,3-butadiene and 1,3-butadiene. Such poly(styrene-isoprene-butadiene-styrene) polymers, depending on the butadiene structure, when hydrogenated will result in "(SEB/EPS)" or reading the other way "(SEP/EBS)". In cases where the butadiene structures are controlled, it is appropriate to denote (SEB/EPS) as (SE/EPS) where E/EP is ethylene-ethylene-propylene or more simply as (SEEPS) to indicate that the ethylene (E) of the ethylene-butylene (EB) segment of the midblock (EB/EP) of the (SEB/EPS) block polymer is substantially greater than butylene (B) and the amount of (E) can be sufficient so as to exhibit ethylene crystallinity.

Physical measurements (NMR and DSC) of typical commercial Kraton G 1651, Septon 2006, Septon 4033 and Septon 4055 block were performed. Two types of $^{13}C$ NMR spectra data were collected. The gated decoupled experiment provided quantitative data for each type of carbon atom. The DEPT experiment identified each type of carbon atom having attached protons. The DEPT data allowed assignment of the resonances in the gated decoupled experiment, which was then integrated for quantitation of the different types of midblock and end groups in each polymer tested The relative quantities of each type of carbon group in the various polymers were found. The uncertainty associated with these measurements is estimated as +3 percentage units. Only the Kraton 1651 spectrum had resonances below about 20 ppm. These resonances, at 10.7–10.9 ppm, were assigned to the butylene methyl group and distinguish the SEBS polymer from the SEPS and SEEPS types of polymer (36). Only the Septon 2006 spectrum lacked the resonance at about 20 ppm that is characteristic of polyethylene units (defined here as three contiguous $CH_2$ groups), and this feature distinguishes the SEPS polymer from the SEBS and SEEPS polymers (36). There were additional differences between the spectra. The Septon 2006 and the Septon 4033 and 4055 spectra all showed resonances at 20 ppm; whereas the spectrum of Kraton 1651 was missing this resonance. The 20 ppm peak is characteristic of the methyl group of a propylene subunit, which is present in SEPS and SEEPS polymers but absent in the SEBS polymer. There were also a methylene peak, at 24.6 ppm, and a methine peak at 32.8 ppm, in all of the Septon spectra but not in the Kraton 1651 spectra. These resonances also arise from the propylene subunit.

The chemical shifts, relative intensities, and relative integrations were the same for the spectra of the Septon 4033 and Septon 4055, indicating that these two polymeric compositions are identical based on NMR spectroscopy.

DSC of ASTM D3417-99 was modified to provide conditions for the samples to have the best possible chance to exhibit any crystallinity. The protocol was as follows: (1) heat to 140° C. @ 10° C./min., (2) cool to 0° C. @ 2° C./min., (3) place in freezer for 1 week, (4) heat to 140° C. @ 1° C./min, and (5) cool to 0° C. @ 1° C./min.

This protocol was used with the exception that the samples were left in the freezer for approximately 2 months, instead of 1 week, because the DSC equipment broke during the week after the first run and required some time for repair. This delay is not expected to have negatively impacted the results of the experiment.

Two HDPE reference samples gave clearly defined crystallization exotherms and fusion endotherms, allowing calculation of heats of crystallization and fusion. These results showed that the equipment and methodology were fully functional, and this check was performed daily during DSC operation. Of the samples, only Kraton 1651 showed discernable transitions for both crystallization and fusion. The Septon 2006 showed no discernable transitions, which is consistent with its SEPS structure being entirely amorphous. The Septons 4033 and 4055 showed crystallization exotherms.

The heats of crystallization for the Kraton 1651 and Septons 4033 and 4055 were small, below about 3 J/g, indicating that small amounts of crystallinity are present in these polymers. The DSC data show:

Kraton 1651: crystallization exotherm peak at 18.09° C., crystallization exotherm—mass normalized enthalpy (J/g) of 1.43, fusion endortherm peak at 34.13° C., and Fusion Endotherm—mass normalized enthalphy J/g of 15.17.

Septon 2006: crystallization exotherm peak (not detected), crystallization exotherm—mass normalized enthalpy (not detected), fusion endortherm peak NONE, and Fusion Endotherm—mass normalized enthalphy (not detected).

Septon 4033: crystallization exotherm peak at 2.86° C., crystallization exotherm—mass normalized enthalpy (J/g) of 3.00, fusion endortherm peak (not detected), and Fusion Endotherm—mass normalized enthalphy (not detected).

Septon 4055: crystallization exotherm peak at 14.4° C., crystallization exotherm—mass normalized enthalpy (J/g) of 1.32, fusion endortherm peak (not detected), and Fusion Endotherm—mass normalized enthalphy (not detected).

Aldrich 13813JU polyethylene reference: crystallization exotherm peak at 119.72° C., crystallization exotherm—mass normalized enthalpy (J/g) of 174.60, fusion endortherm peak at 130.70° C., and Fusion Endotherm—mass normalized enthalphy J/g of 189.90.

Other polymers and copolymers (in major or minor amounts) can be selectively melt blended with one or more of the high viscosity polymers as mentioned above without substantially decreasing the desired properties; these (111) polymers include (SBS) styrene-butadiene-styrene block copolymers, (SIS) styrene-isoprene-styrene block copolymers, (low styrene content SEBS) styrene-ethylene-butylene-styrene block copolymers, (SEP) styrene-ethylene-propylene block copolymers, (SEPS) styrene-ethylene-propylene-styrene block copolymers, $(SB)_n$ styrene-butadiene and $(SEB)_n$, $(SEBS)_n$, $(SEP)_n$, $(SI)_n$ styrene-isoprene multi-arm, (SEPS Kraton RP-1618) styrene-ethylene-propylene-styrene block copolymers, branched or star-shaped copolymers and the like. Still, other (III) polymers include homopolymers which can be utilized in minor amounts; these include: polystyrene, polybutylene, polyethylene, polypropylene and the like. The polymers and copolymers can be linear, star-shaped, branched, or multiarm. Representative plasticizer oil gels (polymer+oil) of the invention include: (a) Kraton G 1651, G 1654X gels; (b) Kraton G 4600 gels; (c) Kraton G 4609 gels; other suitable high viscosity polymer and oil gels include: (d) Tuftec H 1051 gels; (e) Tuftec H 1041 gels; (f) Tuftec H 1052 gels; (g) Kuraray SEEPS 4055 gel; (h) Kuraray SEBS 8006 gel; (i) Kuraray SEPS 2005 gel; (j) Kuraray SEPS 2006 gel, and (k) Gels made from blends (polyblends) of (a)–(h) with other polymers and copolymers include: (1) SEBS-SBS gels; (2) SEBS-SIS gels; (3) SEBS-(SEP) gels; (4) SEBS-$(SEB)_n$ gels; (5) SEBS-$(SEB)_0$ gels; (6) SEBS-$(SEP)_n$ gels; (7) SEBS-$(SI)_n$ gels; (8) SEBS-(SI) multiarm gels; (9) SEBS-$(SEB)_n$ gels; (10) $(SEB)_n$ star-shaped copolymer gels; (11) gels made from blends of (a)–(k) with other homopolymers include: (12) SEBS/polystyrene gels; (13) SEBS/polybutylene gels; (14) SEBS/polyethylene gels; (14) SEBS/polypropylene gels; (16) SEPISEBS oil gels (17), SEP/SEPS oil gels (18), SEP/SEPS/SEB oil gels (19), SEPS/SEBS/SEP oil gels (20), SEB/SEBS (21), EB-EP/SEBS (22), SEBS/EB (23), SEBS/EP (24), (25) $(SEB)_n$ gels, (26) $(SEP)_n$ gels and the like.

Representative examples of commercial elastomers that can be formed with plasticizing oils in combination with the high viscosity triblock and branched copolymers described above into suitable gels for use in making the gel compositions of the invention: Shell Kratons D1101, D1102, D1107, D1111, D1112, D1113X, D1114X, D 116, D1117, D1118X, D1122X, D1125X, D1133X, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1706, G2721X, G7155, G7430, G7450, G7523X, G7528X, G7680, G7705, G7702X, G7720, G7722X, G7820, G7821X, G7827, G7890X, G7940. Kuraray's SEEPS, SEP/SEPS or SEP/SEB/SEPS Nos. 1001, 1050, 2002, 2003, 3023, 2007, 2043, 2063, 2050, 2103, 2104, 2105, 4033 (SEEPS), 4045 (SEEPS), 8004 (SEBS), 8007, KRATON D 4150, 4101P, 4240, KX219, and the like.

Other (III) polymers useful in the invention gels include: of trifluoromethyl-4,5-difuoro-1,3-dioxole and tetrafluoroethylene, polytetrafluoroethylene, maleated poly(styrene-ethylene-butylene), maleated poly(styrene-ethylene-butylene)$_n$, maleated poly(styrene-ethylene-butylene-styrene), maleated poly(styrene-ethylene-propylene)$_n$, maleated poly (styrene-ethylene-propylene-styrene), poly(dimethylphenylene oxide), poly(ethylene-butylene), poly(ethylene-propylene), poly(ethylene-styrene) interpolymer made by metallocene catalysts, using single site, constrained geometry addition polymerization catalysts, poly(styrene-butadiene), poly(styrene-butadiene)$_n$, poly(styrene-butadiene-styrene), poly(styrene-ethylene-butylene), poly(styrene-ethylene-butylene)$_n$, poly(styrene-ethylene-butylene-styrene), poly(styrene-ethylene-butylene-styrene), poly (styrene-ethylene-propylene), poly(styrene-ethylene-propylene)$_n$, poly(styrene-ethylene-propylene-styrene), poly (styrene-isoprene), poly(styrene-isoprene)$_n$, poly(styrene-isoprene-styrene), poly(styrene-isoprene-styrene)$_n$, polyamide, polybutylene, polybutylene, polycarbonate, polydimethylsiloxane; polyethylene vinyl alcohol copolymer, polyethylene, polyethyleneoxide, polypropylene, polystyrene, polyvinyl alcohol, wherein said selected copolymer is a linear, radial, star-shaped, branched or multiarm copolymer, wherein n is greater than one When the selected (III) polymers and copolymers contain greater glassy block of styrene content of 33 and higher, such may be effective to provide a Gram Tack lower than a gelatinous composition having the same rigidity formed from the (I) block copolymers and corresponding first plasticizers alone or the first plasticizers with a second plasticizers. The selected component (III) polymers of polystyrene forming a styrene content of 33 and higher when used in effective amounts may provide a greater temperature compression set than a gelatinous composition having the same rigidity formed from the (I) block copolymers and corresponding first plasticizers alone or the first plasticizers with a second plasticizer.

On the other hand, the lower viscosity first plasticizer can impart lower Gram Tack to the invention gels than an increase of styrene content of the (I) copolymers or (III) polymers and copolymers. The low tack and non tacky invention gels can be made from one or more linear, branched, star-shaped (radial), or multiarm block copolymers or mixtures of two or more such block copolymers having one or more midblock polymer chains which invention gels have use as articles with high tear propagation resistance. The invention gels also possess high tensile strength and rapid return from high extension and can exist in an altered state of delay elastomeric recovery as it regains its original shape following high extensions or dynamic deformations. The invention gels also exhibit low set, high dimensional stability, crack, tear, craze, and creep resistance, excellent tensile strength and high elongation, long service life under shear, stress and strain and capable of withstanding repeated dynamic shear, tear and stress forces, excellent processing ability for cast molding, extruding, fiber forming film forming and spinning, non-toxic, nearly tasteless and odorless, soft and strong, optically clear, highly flexible, possessing elastic memory, substantially with little or no plasticizer bleedout, and having low or no tack in contact with human hand which reduction in tackiness can be measured. The non tacky and optical properties of the invention gels do not rely on powders or surface activation by additives to establish their non-tackiness. The invention gels' non-tackiness pervasive the gels' entire bulk or volume. No matter how deep or in which direction a cut is made, the invention gels are non tacky throughout (at all points internally as well as on the gels' surface). Once the gel is cut, the invention gel immediately exhibits non-tackiness at its newly cut surface. Hence, the homogeneity of the non-tackiness and optical properties of the invention gels are not known.

Dow poly(ethylene-styrene) random copolymers (interpolymers) produced by metallocene catalysts, using single site, constrained geometry addition polymerization catalysts resulting in poly(ethylene-styrene) substantially random copolymers such as ESI-#1 thru #38, including ES16, ES24, ES27, ES28, ES28, ES30, ES44 with styrene wt % of 15.7, 23.7, 27.3, 28.1, 39.6 & 43.9 respectively, M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively), S copolymers (ES72, ES73, and ES74 with styrene wt % of 72.7, 72.8, and 74.3 respectively). Other grade copolymers include ES60 (melt index 0.1, 0.5, 3, 10), ES20 (MI=0.1. 0.5, 3, 11).

The Brookfield Viscosity of a 5 weight percent solids solution in toluene at 30° C. of 2006 is about 27. Typical Brookfield Viscosities of a 10 weight percent solids solution in toluene at 30° C. of Kuraray SEP 1001, SEP 1050, SEPS 2007, SEPS 2063, SEPS 2043, SEPS 2005, SEPS 2006, are about 70, 70, 17, 29, 32, 50, 1200, and 1220 respectively. Typical Brookfield Viscosity of a 25 weight percent solids solution in toluene at 25° C. of Kraton D1101, D 116, D1184, D1300X, G1701X, G1702X are about 4000, 9000, 20000, 6000, 50000 and 50000 cps respectively. Typical Brookfield Viscosity of a 10 weight percent solids solution in toluene at 25° C. of G1654X is about 370 cps. The Brookfield Viscosities of a 20 and 30 weight percent solids solution in toluene at 30° C. of H-VS-3 are about 133 cps and 350 cps respectively. Other polymers such as, thermoplastic crystalline polyurethane copolymers with hydrocarbon midblocks can also be employed.

The glassy A component type homopolymers can be advantageously added to provide non-tackiness which are selected from one or more homopolymers of: polystyrene, poly(alpha-methylstyrene), poly(o-methylstyrene), poly(m-methylstryene), poly(p-methylstyrene), and poly(dimethylphenylene oxide) (GE PPO 612 and Arizona XR 6504). Such glassy polymers can be use in forming the invention gel, but would increase hot tack.

The average molecular weight of the glassy homopolymers useful in the invention gels advantageously can range from about 2,500 to about 90,000, typical about 3,000; 4,000; 5,000; 6,000; 7,000; 8,000; 9,000; 10,000; 11,000; 12,000, 13,000; 14,000; 15,000; 16,000; 17,000; 18,000; 19,000; 20,000; 30,000; 40,000; 50,000; 60,000; 70,000; 80,000; 90,000 and the like. Example of various molecular weights of commercially available polystyrene: Aldrich Nos.: 32,771-9 (2,500Mw), 32,772-7 (4,000 Mw), 37,9514 (13,000 Mw), 32-7743 (20,000 Mw), 32,775-1 (35,000 Mw), 33,0345 (50,000 Mw), 32,777-8 (90,000 Mw); poly (alpha-methylstyrene) #41,7947 (1,300 Mw), 19,184-1 (4,000 Mw); poly(4-methylstyrene) #18,227-3 (72,000 Mw), Endex 155, 160, Kristalex 120, 140 from Hercules Chemical, GE: Blendex HPP820, HPP822, HPP823, and the like.

Suitable triblock copolymers (III) and their typical viscosities are further described: styrene-ethylene-butylene-styrene block copolymers (SEBS) available from Shell Chemical Company and Pecten Chemical Company (divisions of Shell Oil Company) under trade designations Kraton G 1651, Kraton G 1654x, Kraton G 4600, Kraton G 4609 and the like. Shell Technical Bulletin SC: 1393-92 gives solution viscosity as measured with a Brookfield model RVT viscometer at 25° C. for Kraton G 1654X at 10% weight in toluene of approximately 400 cps and at 15% weight in toluene of approximately 5,600 cps. Shell publication SC:68-79 gives solution viscosity at 25° C. for Kraton G 1651 at 20 weight percent in toluene of approximately 2,000 cps. When measured at 5 weight percent solution in toluene at 30° C., the solution viscosity of Kraton G 1651 is about 40. Examples of high viscosity SEBS triblock copolymers includes Kuraray's SEBS 8006 which exhibits a solution viscosity at 5 weight percent at 30° C. of about 51 cps. Kuraray's 2006 SEPS polymer exhibits a viscosity at 20 weight percent solution in toluene at 30° C. of about 78,000 cps, at 5 weight percent of about 27 cps, at 10 weight percent of about 1220 cps, and at 20 weight percent 78,000 cps. Kuraray SEPS 2005 polymer exhibits a viscosity at 5 weight percent solution in toluene at 30° C. of about 28 cps, at 10 weight percent of about 1200 cps, and at 20 weight percent 76,000 cps. Other grades of SEBS, SEPS, $(SEB)_n$, $(SEP)_n$ polymers can also be utilized in the present invention provided such polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene (S:EB) weight ratios for the Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values. In the case of Kuraray's SEBS polymer 8006 the S:EB weight ratio is about 35:65. In the case of Kuraray's 2005 (SEPS), and 2006 (SEPS), the S:EP weight ratios are 20:80 and 35:65 respectively. Much like S:EB ratios of SEBS and (SEB)$_n$, the SEP ratios of very high viscosity SEPS triblock copolymers are about the same and can typically vary as broadly.

The triblock copolymers such as Kraton G 1654X having ratios of 31:69 or higher can be used and do exhibit about the same physical properties in many respects to Kraton G 1651 while Kraton G 1654x with ratios below 31:69 may also be use, but they are less advantageous due to their decrease in the desirable properties of the final gel.

The high glassy component copolymers suitable for use in forming the invention gel include high styrene component BASF's Styroflex series copolymers including BX 6105 with a statistical SB sequence for the low elastomeric segments (styrene to butadiene ratio of 1:1) and an overall styrene content of almost 70%, high styrene content Shell Kraton G, Kraton D-1122X (SB)$_n$, D4122 SBS, D4240 (SB)$_n$, D4230 (SB)$_n$, DX-1150 SBS, D14140 SBS, D-1115 SBS, D4222 SBS, Kraton D-1401P, SEBS, Dexco's Vector 6241-D, 4411-D, Fina's Finaclear high styrene content SBS series copolymers, Phillips Petroleum's XK40 K-Resin styrene/butadiene copolymers, Kuraray's S2104 SEPS. The copolymers include amorphous polymers with high styrene content: SBS, SIS, SEPS, SEB/EPS, and the like. The copolymers with glassy to elastomeric ratios can range from 37:63, 37.6:62.4, 38:62, 39:61, 40:60, 41:59, 42:58, 43:57, 44:65, 45:55, 46:54, 47:53, 48:52, 49:51, 50:50, 51:49 52:48, 53:47, 54:46, 55:45, 56:44, 57:43, 58:42, 59:41, 60:40, 6:39, 62:38, 63:37, 64:36, 65:35, 66:34, 67:33, 68:32, 69:31, 70:30, 7:29, 72:28, 73:27, 74:26, 75:25, 76:24, 77:23, 78:22, 79:21, to 80:20 and higher. High styrene content Dow ES30, and ES44 with styrene wt % of 15.7, 23.7, 27.3, 28.1, 39.6 & 43.9 respectively, M copolymers (ES53, ES58, ES62, ES63, and ES69 with styrene wt % of 52.5, 58.1, 62.7, 62.8, and 69.2 respectively and crystallinity, %, DSC, based on copolymer of 37.5, 26.6, 17.4, 22.9, 19.6 and 5.0 respectively, S copolymers ES72, ES73, and ES74 with styrene wt % of 72.7, 72.8, and 74.3 respectively may also be used. These hard to process polymers can be added (from 0.01 to 30 parts by weight) by dry blending in combination with 200400 parts oil and with SEEPS 4055, 4033, 4077, 4045 and the like and extruded at about between 75° C.–135° C. to form a pre-blend and then formulated with additional oil or/or oil and (I) copolymers to produce the final invention gel.

Suitable polyolefins include polyethylene and polyethylene copolymers such as Dow Chemical Company's Dowlex 3010, 20211D, 2038, 2042A, 2049, 2049A, 2071, 2077, 2244A, 2267A; Dow Affinity ethylene alpha-olefin resin PL-1840, SE-1400, SM-1300; more suitably: Dow Elite 5100, 5110, 5200, 5400, Primacor 141—XT, 1430, 1420, 1320, 3330, 3150, 2912, 3340, 3460; Dow Attane (ultra low density ethylene-octene-1 copolymers) 4803, 4801, 4602, Eastman Mxsten CV copolymers of ethylene and hexene (0.905–0.910 g/cm3).

On the other hand, the molten gelatinous elastomer composition will adhere sufficiently to certain plastics (e.g. acrylic, ethylene copolymers, nylon, polybutylene, polycarbonate, polystyrene, polyester, polyethylene, polypropylene, styrene copolymers, and the like) provided the temperature of the molten gelatinous elastomer composition is sufficient high to fuse or nearly fuse with the plastic. In order to obtain sufficient adhesion to glass, ceramics, or certain metals, sufficient temperature is also required (e.g. above 250° F.).

The incorporation of such adhesion resins is to provide strong and dimensional stable adherent invention gels, gel composites, and gel articles. Typically such adherent invention gels can be characterized as adhesive invention gels, soft adhesives or adhesive sealants. Strong and tear resistant adherent invention gels may be formed with various combinations of substrates or adhere (attach, cling, fasten, hold, stick) to substrates to form adherent gel/substrate articles and composites.

Various glassy phase associating resins having softening points above about 120° C. can also serve as additives to increase the glassy phase of the Invention gel and met the non-tackiness criteria, these include: Hydrogenated aromatic resins (Regalrez 1126, 1128, 1139, 3102, 5095, and 6108), hydrogenated mixed aromatic resins (Regalite R125), and other aromatic resin (Picco 5130, 5140, 9140, Cumar LX509, Cumar 130, Lx-1035) and the like.

The commercial resins which can aid in adhesion to materials (plastics, glass, and metals) may be added in minor amounts to the invention gels, these resins include: polymerized mixed olefins (Super Sta-tac, Betaprene Nevtac, Escorez, Hercotac, Wingtack, Piccotac), polyterpene (Zonarez, Nirez, Piccolyte, Sylvatac), glycerol ester of rosin (Foral), pentaerythritol ester of rosin (Pentalyn), saturated alicyclic hydrocarbon (Arkon P), coumarone indene, hydrocarbon (Picco 6000, Regalrez), mixed olefin (Wingtack), alkylated aromatic hydrocarbon (Nevchem), Polyalphamethylstyrene/vinyl toluene copolymer (Piccotex), polystyrene (Kristalex, Piccolastic), special resin (LX-1035), and the like.

In my U.S. Pat. No.: 5,760,117, is described a non-adhering gel which is made non-adhearing, by incorporating an advantage amount of stearic acid (octadecanoic acid), metal stearates (e.g., calcium stearate, magnesium stearate, zinc stearate, etc.), polyethylene glycol distearate, polypropylene glycol ester or fatty acid, and polytetramethylene oxide glycol disterate, waxes, stearic acid and waxes, metal stearate and waxes, metal stearate and stearic acid. Such non-adhering gels by including additives are no longer optical clear and with time some of the additives blooms uncontrollably to the gel surface.

Plasticizers particularly preferred for use in practicing the present invention are will known in the art, they include rubber processing oils such as paraffinic and naphthenic petroleum oils, highly refined aromatic-free paraffinic and naphthenic food and technical grade white petroleum mineral oils, and synthetic liquid oligomers of polybutene, polypropene, polyterpene, etc. The synthetic series process oils are high viscosity oligomers which are permanently fluid liquid nonolefins, isoparaffins or paraffins of moderate to high molecular weight.

Examples of representative commercially available plasticizing oils include Amoco® polybutenes, hydrogenated polybutenes, polybutenes with epoxide functionality at one end of the polybutene polymer, liquid poly(ethylene/butylene), liquid hetero-telechelic polymers of poly(ethylene/butylene/styrene) with epoxidized polyisoprene and poly(ethylene/butylene) with epoxidized polyisoprene: Example of such polybutenes include: L-14 (320 $M_n$), L-50 (420 $M_n$), L-100 (460 $M_n$), H-15 (560 $M_n$), H-25 (610 $M_n$), H-35 (660 $M_n$), H-50 (750 $M_n$), H-100 (920 $M_n$), H-300 (1290 $M_n$), L-14E (27–37 cst @ 100 oF Viscosity), H-300E (635–690 cst @ 210° F. Viscosity), Actipol E6 (365 $M_n$), E16 (973 $M_n$), E23 (1433 $M_n$), Kraton L-1203, EKP-206, EKP-207, HPVM-2203 and the like. Example of various commercially oils include: ARCO Prime (55, 70, 90, 200, 350, 400 and the like), Duraprime and Tufflo oils (6006, 6016, 6016M, 6026, 6036, 6056, 6206, etc), other white mineral oils include: Bayol, Bernol, American, Blandol, Drakeol, Ervol, Gloria, Kaydol, Litetek, Lyondell (Duraprime 55, 70, 90, 200, 350, 400, Ideal FG 32, 46, 68, 100, 220, 460, etc), Marcol, Parol, Peneteck, Primol, Protol, Sontex, and the like. Oils useful in the invention gel include: Witco 40 oil, Ervol, Benol, Blandol, Semtol-100, Semtol 85, Semtol 70, Semtol 40, Orzol, Britol, Protol, Rudol, Carnation, Klearol; 350, 100, 85, 70, 40, Pd-23, Pd 25, Pd28, FG 32, 46, 68, 100, 220, 460, Duroprime Ds-L, Ds-M, Duropac 70, 90, Crystex 22, Af-L, Af M, 6006, 6016, 6026, Tufflo 6056, Ste Oil Co, Inc: Crystal Plus 70, 200, 350, Lyondell: Duroprime DS L & M, Duropac 70, 90, Crystex 22, Crystex AF L & M, Tufflo 6006, 6016; Chevron Texaco Corp: Superta White Oil 5, Superta 7, 9, 10, 13, 18, 21, 31, 35, 38, 50, Penreco: Conosol 340, Conosol C-200, Drakeol 15, 13, 10, 10B, 9, 7, 5, 50, Peneteck, Ultra Chemical Inc, Ultraol White 60Nf, Ultraol White 50Nf, Witco Hydrobrite 100, 550, 1000, and the like.

Selected amounts of one or more compatible plasticizers can be used to achieve gel rigidities of from less than about 2 gram Bloom to about 1,800 gram Bloom and higher. Tack may not completely be dependent upon the amount of the glassy phase, by using selected amount of certain low viscosity oil plasticizers, block copolymers of SEBS, SEEPS, SEPS, SEPn, SEBn, and the like, gel tack can be reduced or the gel can be made non-tacky.

Major or minor amounts (based on 100 parts by weight of base elastomer) of any compatible second plasticizers can be utilized in forming the invention gel, but because of the non-tack property of the invention gel, the major amount of first plasticizers used should be low viscosity plasticizers having viscosities advantageously of not greater than about 30 cSt @ 40° C., for example 30, 29, 28, 27, 26, 25, 24, 23, 22, 21, 20, 19, 18, 17, 16, 15, 14, 13, 12, 11, 10, 9, 8, 7, 6, 5, 4, 3 and the like. The invention gel tack decreases with decreasing oil viscosities of from about 30 to 3. Invention gels which are non-tacky to the touch can be achieved using oils with viscosities of about 10 cSt @ 40° C. and less. Best result can be achieved using oils with viscosities of about 6 and less. Oils of higher viscosities of from about 500 cSt @ 40° C. to about 30 produce higher and higher tack with increase in viscosities. Heat temperature set resistance improves with increase in oil viscosity. Oils with viscosities less than about 15 exhibit heat set at about 50° C. Therefore a combination of low viscosity oils to improve low tack and high viscosity oils to improve set can be achieved by blending various oils having the desired viscosities for the desired end use. The disassociation of polystyrene is about 100° C. to about 135° C., the invention gels do not melt below the disassociation temperature of polystyrene. It is important that fishing bait when stored in a fishing box in the hot Sun at about 50° C. to about 58° C. do not suffer substantial heat set as tested at these temperatures in a 108' U bend for one hour.

It has been found that the lower the oil viscosity, the lower the heat set of the resulting gel composition and the higher the oil viscosity use in the gel compositions of the invention, the higher the heat set of the resulting gel composition. For example, if the first plasticizer is less than about 50 SUS @ 100° F., the heat set of the resulting gel composition comprising 100 parts of (I) copolymers of equal parts of SEEPS 4055 and Kraton G 1651 with about 600 parts by weight of the first plasticizer, the resulting is found to have a heat set less than that of a conventional PVC plastisol fishing bait at about 50° C. However, as the 50 Vis SUS @ 100° F. oil of the formulation is gradually replaced with a higher viscosity oil of about 80–90 SUS @ 100° C., the heat set deformation improves with increasing amounts of the higher viscosity oil. In order to obtain equal heat set performance as conventional PVC plastisol fishing bait, the first and second plasticizers would have to be of equal amounts in the gel composition. Replacing the first plasticizer with a greater amount would increase the gel tack. If tack is not of great concern, then a higher amount of the second plasticizers would be beneficial for improving heat set at higher and higher temperatures to the point that the second plasticizers can reach greater than 2525 SUS @ 100° C. (Ideal FG 100, 220, or 460 oil) the resulting gel composition would not exhibit set at even temperatures greater than 400° F.

Generally, plasticizing oils with average molecular weights less than about 200 and greater than about 700 may also be used (e.g. H-300 (1290 $M_n$)).

The cited first plasticizers with or without one or more second plasticizers can be used in sufficient amounts to achieve a gel rigidity of from about 20 gram Bloom to about 1,800 gram Bloom. The second plasticizers in effective amounts in combination with the first plasticizers can provide a greater temperature compression set than a gelatinous composition having the same rigidity formed from the first plasticizers alone. The second plasticizers when used can provide a greater temperature compression set than a gelatinous composition having the same rigidity formed from the first plasticizers alone or formed from a combination of the first plasticizers and the second plasticizers. The first plasticizers being in effective amounts with said second plasticizers can provide a Gram Tack lower than a gelatinous composition having the same rigidity formed from the second plasticizers alone.

Generally, plasticizing oils with average molecular weights less than about 200 and greater than about 700 may also be used (e.g. H-300 (1290 $M_n$)). It is well know that minor and sufficient amounts of Vitamin E is added to the described commercially available oils during bulk processing which is useful as a oil stabilizer, antioxidant, and preservative.

Of all the factors, the amount of plasticizing oils can be controlled and adjusted advantageously to obtain substantially higher tear and tensile strength gels. The improvements in tensile strength of the invention gels are accompanied by corresponding increase in gel rigidity as the amount of plasticizing oils are lowered until the rigidity of the invention gels becomes much higher than that of the gums which surround the teeth. Although higher tensile strengths can be obtained as the amount of plasticizing oils in the gel approaches zero, the tensile strength of the floss, however, must be maintained at an acceptable gel rigidity (at sufficient high plasticizing oil levels) in order to be as soft as the gums required for flossing. For example, the rigidities of a gel containing 100, 200, or 300 parts by weight of oil is much higher than a gel containing 300, 400, 500, 600, 800, or 900 parts of oil.

These gels can exhibit a larger unit lateral contraction at the same elongation per unit of length as their counterpart parent gels from which the invention gels are derived or formed. This property would allow a same unit volume of gel when elongated as its parent to easily wedge between the teeth when flossing. It would seem that a gel having the 1.0 cm3 volume made from a ratio of 100 parts by weight of copolymer and 400 parts plasticizer would have a unique macro volume configurations that is at equilibrium with the plasticizer which is much like a 3-D fingerprint which is uniquely different from any other gel of a different copolymer to plasticizer ratio. Reducing the plasticizer content of a ratio 100:400 gel to a 100:300 ratio of copolymer to plasticizer will decrease the amount of plasticizer, but the original macro volume configurations will remain the same.

Speculative theories not withstanding, configurations may take the form of (1) swiss cheese, (2) sponge, (3) the insides of a loaf of bread, (4) structures liken to ocean brain corals, (5) large structures and small structures forming the 3-D gel volume landscape, (6) the outer heated surface which cools faster than the inner volumes of the gel during its cooling histories may have a patterned crust (rich in A micro-phases) like that of a loaf of bread and the inner volume may have much like 1–5, and (7) the many different possible structures are unlimited and volume landscapes may be interconnected at the macro-level by threads or micro-strands of Z micro-phases.

The amount of plasticizer extracted can advantageously range from less than about 10% by weight to about 90% and higher of the total weight of the plasticizer. More advantageously, the extracted amounts of plasticizer can range from less than about 20% by weight to about 80% by weight of the total plasticizer, and still more advantageously, from about 25% to about 75%. Plasticizing oils contained in the invention gels can be extracted by any conventional methods, such as solvent extraction, physical extraction, pressure, pressure-heat, heat-solvent, pressure-solvent-heat, vacuum extraction, vacuum-heat extraction, vacuum-pressure extraction, vacuum-heat-pressure extraction, vacuum-solvent extraction, vacuum-heat-solvent-pressure extraction, etc. The solvents selected, should be solvents which do not substantially disrupt the A and Z phases of the (I) copolymers forming the invention gels. Any solvent which will extract plasticizer from the gel and do not disrupt the A and Z phases can be utilized. Suitable solvents include alcohols, primary, secondary and tertiary alcohols, glycols, etc., examples include methanol, ethanol, tetradecanol, etc. Likewise, the pressures and heat applied to remove the desired amounts of oils should not be sufficient to disrupt the A and Z domains of the (I) copolymers. To form a lower rigidity gel, the simplest method is to subject the gel to heat in a partial vacuum or under higher vacuum for a selected period of time, depending on the amount of plasticizer to be extracted.

Incorporated herein by reference, in part, is the "Physical and Chemical Properties of Mineral Oils That Affect Lubrication", © Copyright Herguth Laboratories, Inc. 1995, which is a review of mineral oils and terms for the tribologist working in the field of Tribology.

Viscosity is the property of a fluid that causes it to resist flow, which mechanically is the ratio of shear stress to shear rate. Viscosity may be visualized as a result of physical interaction of molecules when subjected to flow. Lubricating oils have long chain hydrocarbon structures, and viscosity increases with chain length. The unit of absolute or dynamic viscosity is Force/Area×Time. The basic SI unit is Pascal× second Pa s (or Ns m−2). Mineral oils are typically 0.02 to 0.05 Pa·s at 40 degree C. 1 mPa·s=1 Centipoise (cP) cP is commonly used for absolute viscosity. The symbol for viscosity is usually u. When gravity is used to cause flow for the viscosity measurement, the density p of the oil is involved and kinematic viscosity is reported=u/p. The basic SI unit is meter$^2$/second (m2 s−1). Also 1 cm2 s−1=1 Stoke (St), and 1 mm2 s$^{-1}$=1 centiStoke (cSt), cSt is commonly used for kinematic viscosity. Viscosity (by ASTM D445) of industrial lubricants is commonly classified using the International Standard Organization Viscosity Grade (ISOVG) system, which is the average viscosity in centiStokes (cSt) at 40 degree C. For example, ISOVG 32 is assigned to oils with viscosity between 28.8 and 35.2 cSt at 40 degree C.

Viscosity Index (VI) is a commonly used expression of an oil's change of viscosity with temperature. VI is based on two hypothetical oils with arbitrarily assigned VI's of 0 and 100. The higher the viscosity index the smaller the relative change in viscosity with temperature. A less arbitrary indication of the change in viscosity with temperature is the viscosity temperature coefficient. For 40 to 100 degree C. it is: Viscosity (cSt) at 40 degree C. minus Viscosity (cSt) at 100 degrees C=C-1, divided by the Viscosity (cSt) at 40 degrees C.

Paraffinic oils are straight chain or branched aliphatic hydrocarbons belonging to the series with the general formula CnH2n+2. Paraffin's are saturated with respect to hydrogen. A typical paraffinic oil molecule with 25 carbon and 52 hydrogen atoms has a molecular weight of 352. Very high molecular weight paraffins are solid waxes, also dissolved in small amounts of mineral oils.

Naphthenic or alicyclic oils have the characteristics of naphthenes, which are saturated hydrocarbons of which the molecules contain at least one closed ring of carbon atoms.

Paraffins are relatively unreactive and thus have better oxidation stability compared to naphthenes. In general, paraffins have a higher viscosity index than naphthenics.

Surprisingly, as disclosed in my application SSer. No. 09/896,047 filed Jun. 30, 2001, oil extraction from the invention gels can be achieved with little or no energy in the presence of one or more silicone fluids to almost any degree. A theory can be made to explain the physics involved in the extraction process which reasoning is as follows: (1) When water is placed in contact with an oil extended gel, the gel will not over time exhibit weight loss. (2) When oil is add to a column of water in a test tube, the oil will separate out and find its level above the column of water. (3) The surface tension of water at 25° C. is about 72.0 mN/m. (4) The surface tension of oil (mineral oil) at 25° C. is about 29.7 mN/m. (5) The surface tension of silicone fluid at 25° C. range from abut 16 to abut 22 mN/m (for example: the surface tension of 100 cSt silicone fluid at STP is 20.9 mN/m). (6) The density of oil is less than the density of silicone fluid, silicone grease, silicone gel, and silicone elastomer. (7) Oil is not a polar liquid and is highly compatible with the rubber phase of the oil gel forming polymer. (8) Silicone is polar and not compatible with the polymer's rubber phase.

The molecules of a liquid oil drop attract each other. The interactions of an oil molecule in the liquid oil drop are balanced by an equal attractive force in all directions. Oil molecules on the surface of the liquid oil drop experience an imbalance of forces at the interface with air. The effect is the presence of free energy at the surface. This excess energy is called surface free energy and is quantified as a measurement of energy/area. This can be described as tension or surface tension which is quantified as a force/length measurement or m/Nm.

Clearly gravity is the only force pulling on the extracted oil from the gel in the presence of silicone fluid at the gel-petri dish interface in the examples below. In the case of gel samples in the petri dishes in contact with silicone fluids, the extracted oil are collected on the top surface layer of the silicone fluid while the silicone fluid maintain constant contact and surrounds the gel sample. In the case of gel placed in a test tube of silicone fluid of different viscosity, the oil is extracted and migrates and collect at the top of the silicone fluid surface while the gel reduces in volume with time. The oil extraction process in silicone is accompanied by buoyant forces removing the extracted oil from the surroundings of the gel constantly surrounding the gel with fresh silicone fluid while in the example of alcohol, since the oil is heavier, the oil is maintained and surrounds the gel sample forming a equilibrium condition of oil surround the gel sample while keeping the alcohol from being in contact with the gel sample. Therefore in order to use alcohol to extract oil from a gel sample, the extracted oil must be constantly removed from the oil alcohol mixture as is the case during soxhlet extraction which process requires additional energy to pump the oil-alcohol mixture away from the sample and removing the oil before forcing the alcohol back to the gel sample surface to perform further extraction.

Silicone fluid is efficient and useful for extracting oil form oil gel compositions with the assistance of gravity and buoyancy of oil in the silicone fluids.

It is very difficult to extract, separate, or remove oil from an oil gel composition by positive or vacuum pressure or heat while using little or no energy and because of the affinity of the rubber midblock for oil, not even the weight of a two ton truck resting on a four square foot area (placing a layer of gel between four pairs of one foot square parallel steel plates one set under each of the truck tire resting on the gels) can separate the oil from the gel composition.

The use of silicone fluids of various viscosity acts as a liquid semi porous membrane when placed in constant contact with an oil gel composition will induce oil to migrate out of the gel composition. By the use of gravity or oil buoyancy, no energy is required run the oil extraction process.

In the case of the invention gels of this application made in the shape of a fishing bait in contact with silicone fluid, the elastomer or rubber being highly compatible with the oil, holds the oil in place within the boundary of the rubber molecular phase. It is this affinity of the (i) rubber and oil molecules and (ii) the attraction of oil molecules for each other that prevents the oil from bleeding out of the surface of the gel body. There exist then, at the surface of the gel several types of surface tensions of: (iii) oil-air surface tension, (iv) oil-rubber surface tension, (v) rubber-air surface tension, (vi) rubber/oil-air surface tension, and (vii) rubber-rubber surface tension. Other forces acting on the gel are: the elastic force of the polymer network pulling inwards, similar to stretched out rubber bands, which is in equilibrium with the oil molecules' attraction to the rubber molecules of the polymer network. In the case of SBS, the lower compatibility of the midblock butadiene with oil, once a gel is made, the SBS network immediately contracts due to elastic forces to produce oil bleeding which is evidence of the poor compatibility of the rubber block for the oil molecules.

The intermolecular forces that bind similar molecules together are called cohesive forces. Intermolecular forces that bind a substance to a surface are called adhesive forces.

When two liquids are in contact such as oil and silicone fluid, there is interfacial tension. The more dense fluid is referred to herein as the "heavy phase" and the less dense fluid is referred to as the "light phase". The action at the surface of the oil extended polymer gel surface when brought into contact with silicone fluid is as follows: a drop of silicone fluid when placed on the flat surface of a oil extended polymer gel will wet the gel surface and spread over a larger area as compared to a drop of oil placed on the same gel surface. Because the surface free energy of the silicone fluid in contact with the gel surface is lower than the surface free energy of the oil, the silicone fluid has the ability to displaces the oil from the surface of the gel.

The invention gels can be made to exhibit sufficient low Gram Tack to be noticeable non-tacky to the touch of the fingers of a typical human hand at 23° C. A simple way to accurately measure the non tacky feeling as sensed by the fingers is to drop a reference gel sample having a cylindrical shape of about 1.0 cm diameter and 1.0 cm in length a distance of 10 cm on to the surface of a polystyrene petri dish having a diameter of 10 cm inclined at 45'. The reference gel sample is considered non tacky if it (1) "bounce at least twice before coming to rest", (2) "bounce off", (3) "bounce and then rolls off", or (4) "rolls off" on striking the polystyrene surface. If none of (1) thru (4) is observed, then the level of Gram Tack can be determined by the gel sample method above.

The invention gel are non tacky to the touch and can be quantified using a simple test by taking a freshly cut Gel probe of a selected gel rigidity made from the invention gel. The gel probe is a substantially uniform cylindrical shape of length "L" of at least about 3.0 cm formed components (1)–(3) of the invention gel in a 16×150 mm test tube. The gel probe so formed has a 16 mm diameter hemi-spherical tip which (not unlike the shape of a human finger tip) is brought into perpendicular contact about substantially the center of the top cover of a new, untouched polystyrene reference surface (for example the top cover surface of a sterile polystyrene petri dish) having a diameter of 100 mm and a weight of 7.6 gram resting on its thin circular edge (which minimizes the vacuum or partial pressure effects of one flat surface in contact with another flat surface) on the flat surface of a scale which scale is tared to zero. The probe's hemi-spherical tip is place in contact with the center of the top of the petri dish cover surface and allowed to remain in contact by the weight of the gel probe while held in the upright position and then lifted up. Observation is made regarding the probe's tackiness with respect to the clean reference polystyrene surface. For purpose of the foregoing reference tack test, tackiness level 0 means the polystyrene dish cover is not lifted from the scale by the probe and the scale shows substantially an equal positive weight and negative weight swings before settling again back to zero with the swing indicated in (negative) grams being less than 1.0 gram. A tackiness level of one 1, means a negative swing of greater than 1.0 gram but less than 2.0 gram, tackiness level 2, means a negative swing of greater than 2 gram but less than 3 gram, tackiness level 3, means a negative swing of greater than 3 gram but less than 4 gram, before settling back to the zero tared position or reading. Likewise, when the negative weight swing of the scale is greater than the weight of the dish (i.e., for the example referred above, greater than 7.6 gram), then the scale should correctly read −7.6 gram which indicates the dish has completely been lifted off the surface of the scale. Such an event would demonstrate the tackiness of a gel probe having sufficient tack on the probe surface. The invention gel fails to lift off the polystyrene reference from the surface of the scale when subject to the foregoing reference tack test. Advantageously, the invention gel can register a tackiness level of less than 5, more advantageously, less than 3, still more advantageously, less than 2, and still more advantageously less than 1. The non-tackiness of the invention gel can advantageously range from less than 6 to less than 0.5 grams, typical tack levels are less than 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.5, 2.8, 3.0, 3.5, 4.0, 4.5, 5.0 grams and the like. Whereas probes of gels made from amorphous gels such as SEPS, SEBS, S-EP-EB-S, and the like with copolymer styrene to rubber ratio of less than 37:63 and plasticizer of higher than 30 cSt 40° C. are found to lift the polystyrene reference from the surface of the scale. For purposes of indicating tack, the method above can provide gel tack level readings of 1, 2, 3, 4, 5, 6, and 7 grams. More accurate and sensitive readings can be made using electronic scales of tack levels of less than 1 gram. By this simple method tack levels (of a gel probe on a polystyrene reference surface) can be measure in terms of gram weight displacement of a scale initially tared to zero. For purpose of the present invention the method of using a polystyrene reference surface having a weight of 7.6 grams in contact and being lifted by the tackiness of a cylindrical gel probe having a 16 mm diameter hemi-spherical tip is used to determine the tackiness of the invention gel. The level of tack being measured in gram Tack at 23° C.

Non tacky is defined for the purpose of the invention gel as the feeling registered in the mind by the sense of touch of the fingers of the human hand. An reinforcing observation is that a non tacky reference gel sample does not cling or stick to the fingers under its own weight when the force of holding the reference gel sample between the fingers is released and the sample is allowed to fall by the action of gravity. A simple way to accurately measure the non tacky feeling as sensed by the fingers is to drop a reference gel sample having a cylindrical shape of about 1.0 cm diameter and 1.0 cm in length a distance of 10 cm on to the surface of a polystyrene petri dish having a diameter of 10 cm inclined at 45'. The reference gel sample is considered non tacky if it (1) "bounce at least twice before coming to rest", (2) "bounce off", (3) "bounce and then rolls off", or (4) "rolls off" on striking the polystyrene surface. If none of (1) thru (4) is observed, then the level of Gram Tack can be determined by the gel sample method above.

The gel compositions of the invention can also be made into composites. The gels may be made non-adhearing, non-sticking, (non-tacky), by incorporating an advantage amount of stearic acid (octadecanoic acid) or metal stearates (e.g., calcium stearate, magnesium sterate, zinc stearate, etc.).

An advantage of making non-sticking, non-tacky gels is the use of waxes, stearic acid and waxes, metal sterate and waxes, metal sterate and stearic acid. The use of stearic acid alone do not reduce tack. The amount of stearic acid is also important. As an example, ratio of 200 grams stearic acid to 2,000 gram of SEBS (a ratio of 0.1) will result in spotted tack reduction on the surface of the gel. A ratio of 250 to 2,000 will result in spotted crystallized regions on the surface of the gel or spotted tack reduction. A ratio of 300 to 2,000 will result in complete tack reduction with large stearic acid crystallized regions on the surface of the gel. When microcrystalline waxes are incorporated together with stearic acid, the crystallization of stearic acid completely disappears from the surface of the gel. For example excellent result is achieved with 200 grams of stearic acid, 150 grams of microcrystalline wax and 2,000 grams of SEBS. The same excellent results is achieved when SEBS is adjusted to 3,000 grams, 4,000 grams, etc. The same result is achieved with SEPS, (SEB)$_n$, (SEP)$_n$ polymers.

The present invention also provides oriented gels with improved high strength alignment properties as evidenced by optical techniques such as viewing oriented gel in plane-polarized light. Oriented gels exhibit birefringence in the relaxed unextended state. Oriented gels with improved strength are suitable for use as dental floss since they do not break as easily as un-oriented gels of the same rigidity.

The gels of the invention including oriented gels disclosed in my U.S. Pat. No. 5,962,572 can also contain useful amounts of conventionally employed additives such as stabilizers, antioxidants, antiblocking agents, colorants, fragrances, flame retardants, flavors, other polymers in minor amounts and the like to an extend not affecting or substantially decreasing the desired properties of the invention.

Additives useful in the gel of the present invention include: tetrakis[methylene 3-(3'5'-di-tertbutyl-4"-hydroxyphenyl) propionate]methane, octadecyl 3-(3",5"-di-tert-butyl-4"-hydroxyphenyl) propionate, distearyl-pentaerythritol-diproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl]benzene), 4,4"-methylenebis(2,6-di-tert-butylphenol), Tinuvin P, 123, 144, 213, 234, 326, 327, 328, 571, 622, 770, 765, Chimassorb 119, 944, 2020, Uvitex OB, Irganox 245, 1076, 1098, 1135, 5057, HP series: 2215, 2225, 2921, 2411, 136, stearic acid, oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, calcium sterate, other metal sterates, waxes (e.g. polyethylene, polypropylene, microcrystalline, carnauba, paraffin, montan, candelilla, beeswax, ozokerite, ceresine, and the like). The gel can also contain metallic pigments (aluminum and brass flakes), TiO2, mica, fluorescent dyes and pigments, phosphorescent pigments, aluminatrihydrate, antimony oxide, iron oxides (Fe3O4, —Fe2O3, etc.), iron cobalt oxides, chromium dioxide, iron, barium ferrite, strontium ferrite and other magnetic particle materials, molybdenum, silicone fluids, lake pigments, aluminates, ceramic pigments, ironblues, ultramarines, phthalocynines, azo pigments, carbon blacks, silicon dioxide, silica, clay, feldspar, glass, microspheres, barium ferrite, wollastonite and the like. The report of the committee on Magnetic Materials, Publication NMAB426, National Academy Press (1985) is incorporated herein by reference.

Various glassy phase associating resins having softening points above about 120° C. can also serve as additives to increase the glassy phase of the Invention gel and met the non-tackiness criteria, these include: Hydrogenated aromatic resins (Regalrez 1126, 1128, 1139, 3102, 5095, and 6108), hydrogenated mixed aromatic resins (Regalite R125), and other aromatic resin (Picco 5130, 5140, 9140, Curmar LX509, Cumar 130, Lx-1035) and the like.

The commercial resins which can aid in adhesion to materials (plastics, glass, and metals) may be added in minor amounts to the invention gels, these resins include: polymerized mixed olefins (Super Sta-tac, Betaprene Nevtac, Escorez, Hercotac, Wingtack, Piccotac), polyterpene (Zonarez, Nirez, Piccolyte, Sylvatac), glycerol ester of rosin (Foral), pentaerythritol ester of rosin (Pentalyn), saturated alicyclic hydrocarbon (Arkon P), coumarone indene, hydrocarbon (Picco 6000, Regalrez), mixed olefin (Wingtack), alkylated aromatic hydrocarbon (Nevchem), Polyalphamethylstyrene/vinyl toluene copolymer (Piccotex), polystyrene (Kristalex, Piccolastic), special resin (LX-1035), and the like.

As disclosed in my copending U.S.SN application Ser. Nos. 09/285,809; 09/412,886, and my earlier U.S. Pat. No. 5,760,117, the stearic acid and microcrystalline wax components of the gels are non-sticky, crystal and non-adhering.

The non-adhering gels containing additives such as stearic acid and the like, however, feels greasy due the additive's high solubility in oil and low melting points forming a greasy coating on the surface of the gel. The inherently crystal gels which are an improvement over the greasy feeling gels of U.S. Pat. No. 5,760,117 described above, although feels non-adhering and completely non-tacky and non-greasy, can exhibit a high coefficient of friction or high COF.

Figure 5:
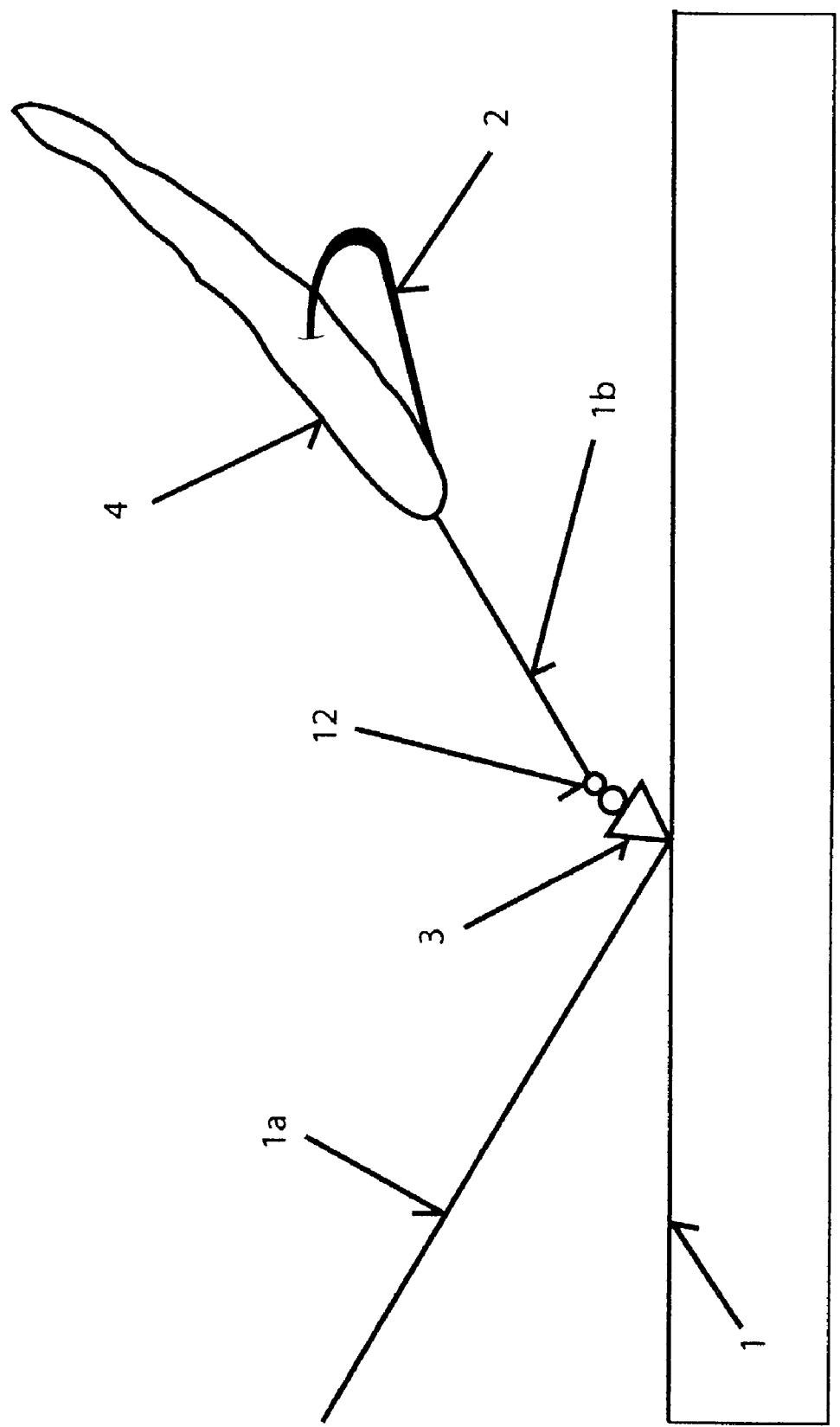

I have also found that by incorporating sufficient amounts of one or more of a selected (high melting, low oil soluble, and polar) low COF agents (such as polyphenolics with one or more sterically hindered phenolic hydroxyl groups) in the gels will result in the appearance of large crystals in the interior as well as on the surface of the gels. Such crystals are shown in FIG. 5 (top view) photo of the top of a crystal gel article with phenolic crystals. These crystals have no effect on the high COF of the resulting gels. Contrary to the combined effects of stearic acid and microcrystalline wax, the presence of microcrystalline wax with polyphenolic in gels does not lessen the gel's COF and have little effect on reducing the size of the large polyphenolic crystals. Likewise the crystallinity and glassy components by themselves can not by themselves reduce the inherent high COF of these gels. Consequently, gels containing microcrystalline wax and polyphenolics exhibit high COF.

Surprisingly, when selected amounts of internal nucleating agents are incorporated in the gels in combination with selected amounts of one or more of a low COF agents, the large crystals no longer forms within the gels; and the surface of the gels exhibit lower and lower COF with time. Bringing the gels in contact with selected external nucleating agents decreases the time or totally eliminates the time needed for the gel's outer surface to exhibit a low COF.

The gels and soft elastomers incorporating low COF agents and internal and/or external nucleating agents exhibit a much lower coefficient of friction when measured in contact with a reference surface than gels and soft elastomers made without such components.

School book physics teaches COF can be determined experimentally, for two given surfaces that are dry and not lubricated, the ratio of the tangential force needed to overcome the friction to the normal force which holds the two surfaces in contact (e.g., the weight of a block of gel or elastomer material on a surface) is a constant, independent of the area or of the velocity with which the surfaces (surface of a side of the block in contact with another surface) move over wide limits. This ratio is $\mu$, the coefficient of friction. The coefficient of sliding friction for a block of material being $$\mu=(f/F_n)$$

where f is the force of friction, and $F_n$ the normal force. For the case of the block on the horizontal table, if m is the mass of the block, then mg is the normal force and the above equation can be written as $$\mu=f/mg.$$

In the case the block of a block rests on a board, originally horizontal, and that the board then is tilted until a limiting angle ø is reached, beyond which the block will begin to slide down the board. At this angle the component of the weight of the object along the board is just equal in amount to that necessary to overcome the force of friction. The force down the plane is mg sin ø, while the normal force is mg cos ø. Therefore we have $$\mu=(mg \sin ø)/(mg \cos ø) \text{ or } \mu=\tan ø.$$

The limiting value of ø for which $\mu=\tan ø$ is true is call the angle of repose. Measurement of the tangent of this angle will give the coefficient of friction of the contacting surfaces of the block and the board that slide one upon the other.

As an example of low COF agents advantageously useful in soft thermoplastic elastomers and gels, excellent results is achieved with 50 grams of a polyphenolic with sterically hindered phenolic hydroxyl groups (Irganox 1010), about 100 grams of one or more nucleating agents (such as very fine particle size sodium benzoate, dibenzylidene sorbitol, its alkylated derivatives, talc, zinc sterate, amorphous silica, aluminum sterate, etc.) and 5,000 grams of S-EB-S and 25,000 gram of oil. The same excellent result is achieved when S-EB-S is adjusted to 3,000 grams, 4,000 grams, etc. The same result is achieved with copolymers as well as in combination with other polymers. Moreover, when about 50 grams of tetrakis[methylene 3-(3'5'-di-tertbutyl-4"-hydroxyphenyl) propionate]methane is use (per about 22.68 Kilograms or 50 lbs of gel) as a low COF agent, tack is completely removed from the surface of the gel after two to three weeks of blooming.

Figure 6:
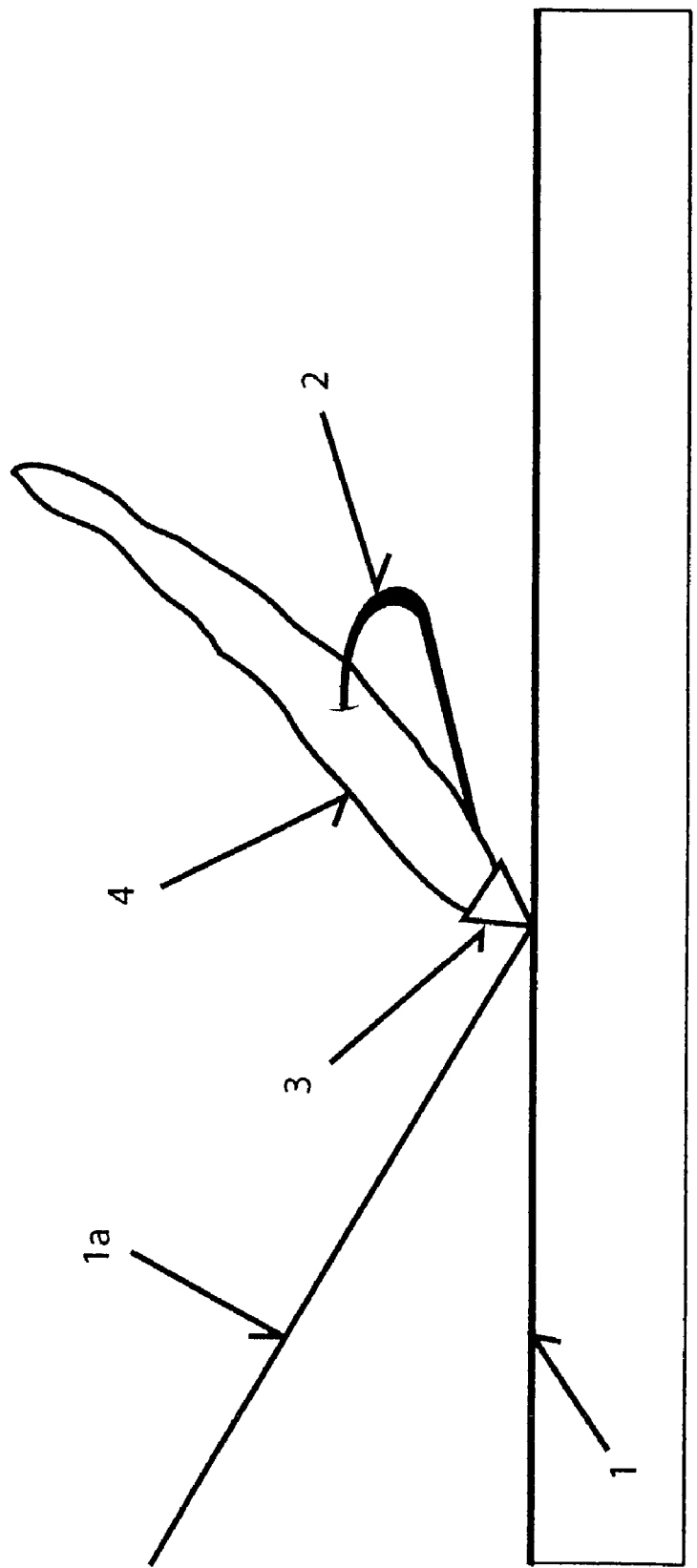
Figure 7:
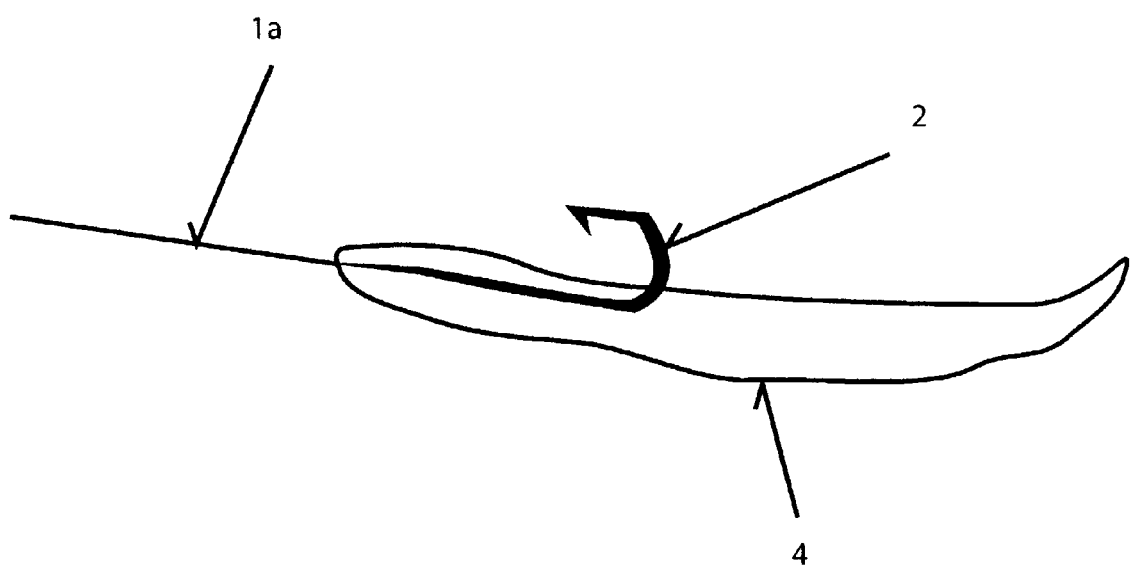
Figure 8:
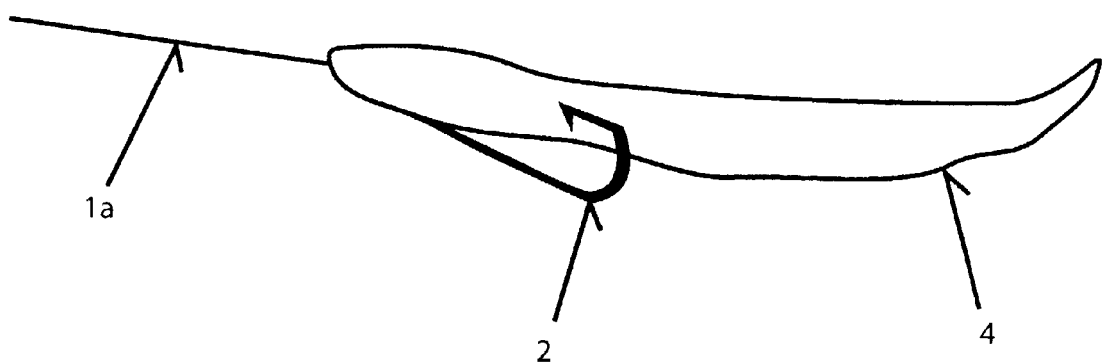
Figure 9:
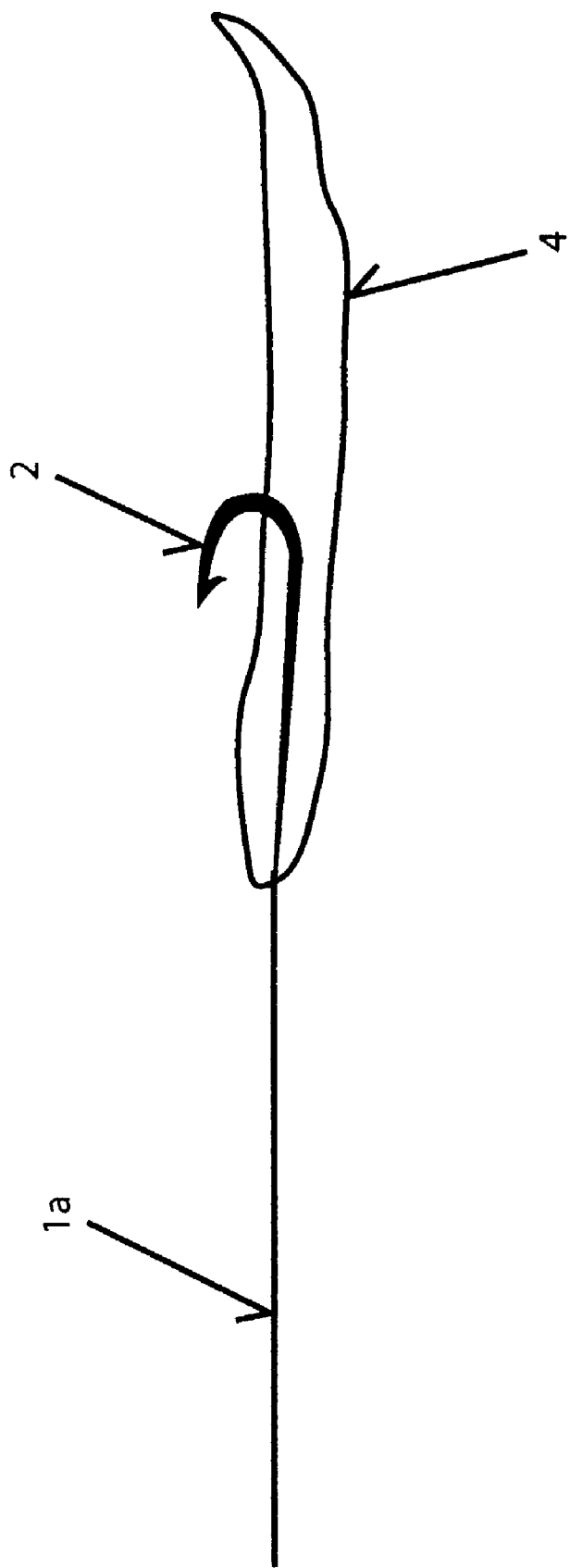
Figure 10:
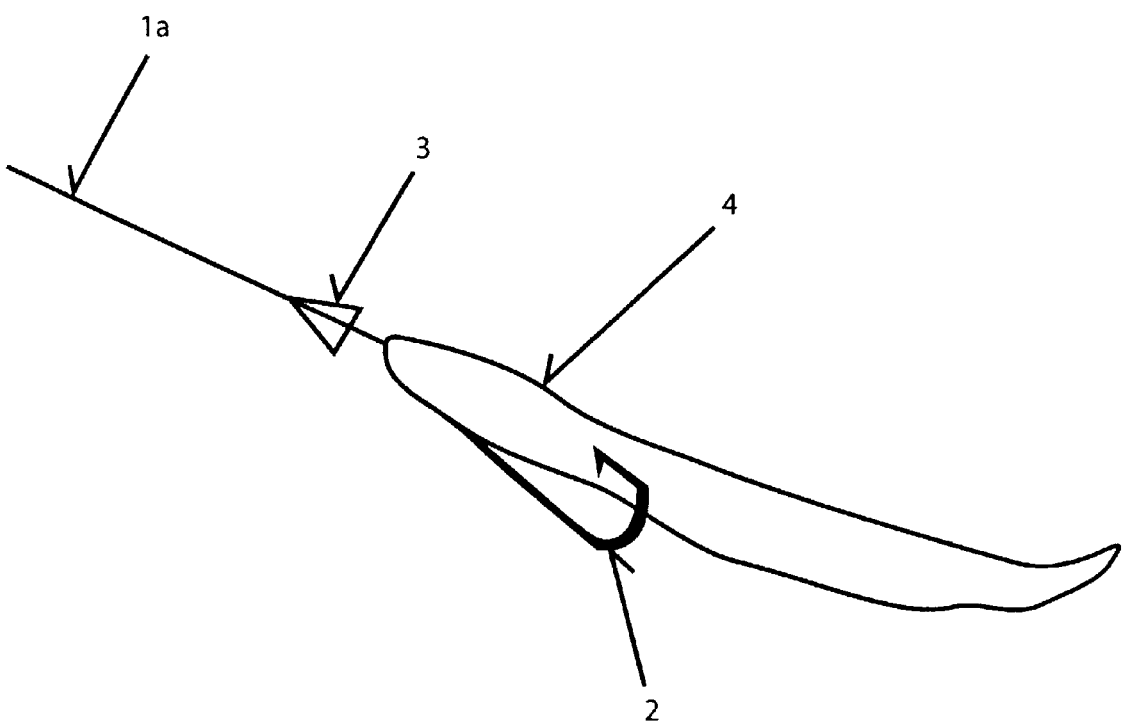
Figure 11:
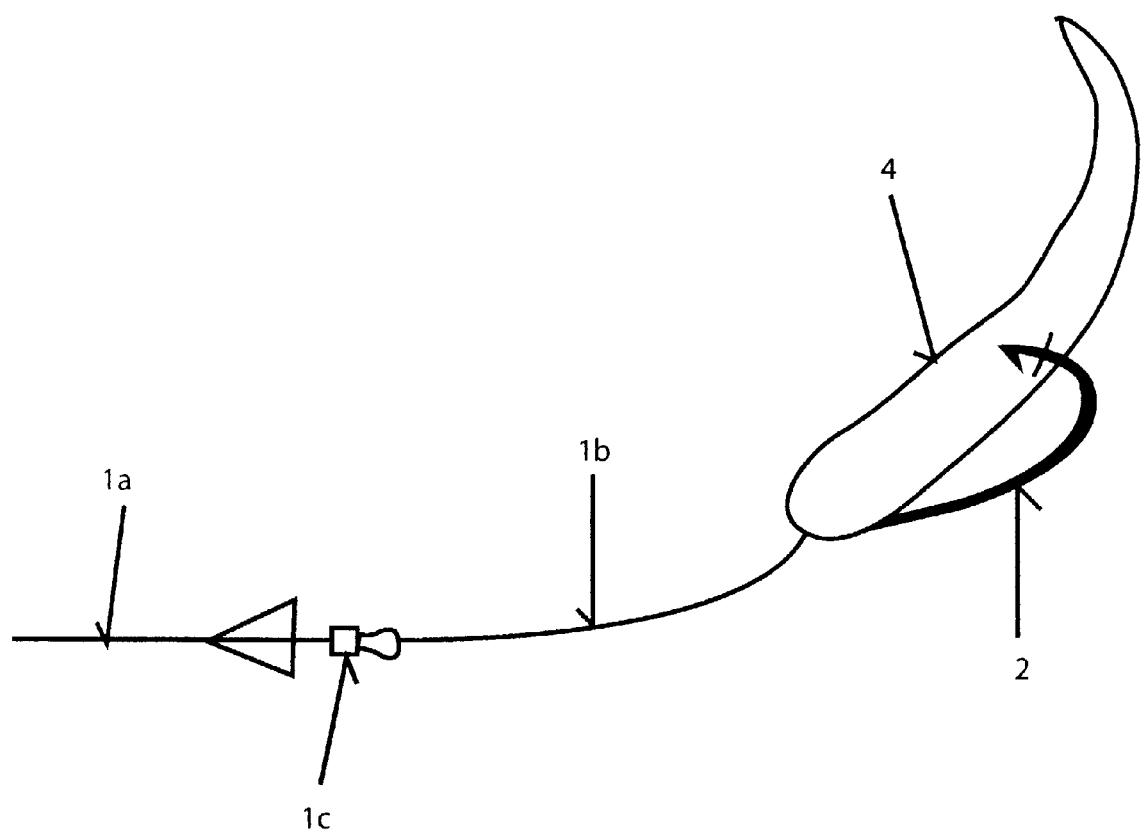
Figure 12:
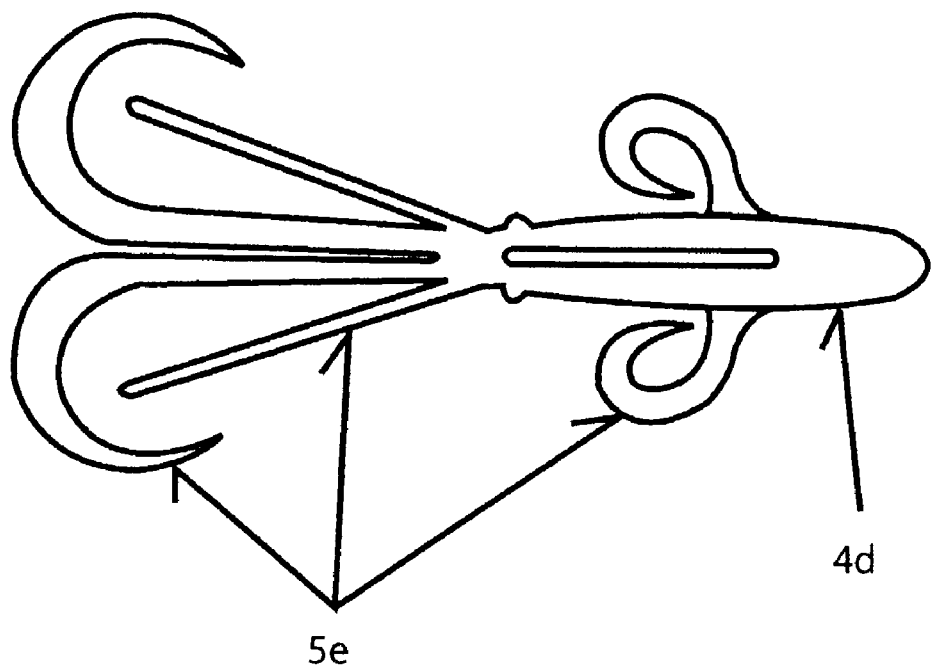
Figure 12A:
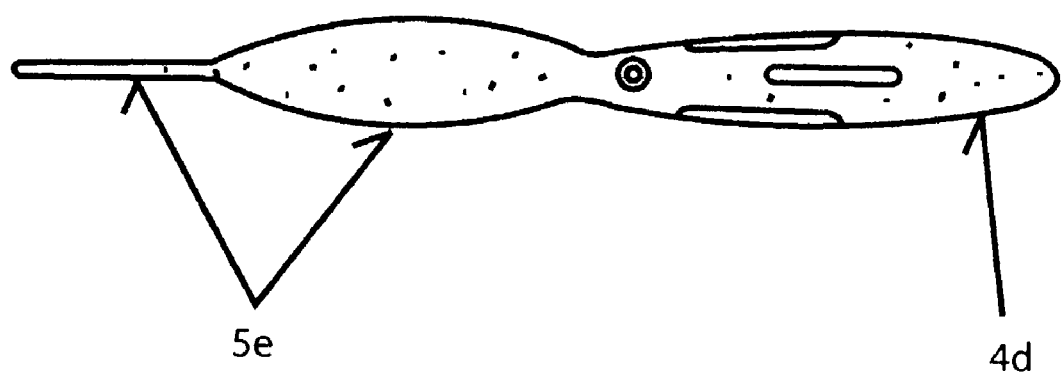
Figure 13:
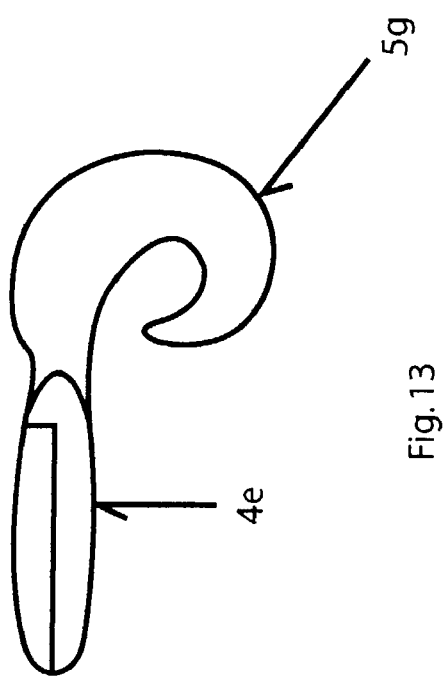
Figure 13A:
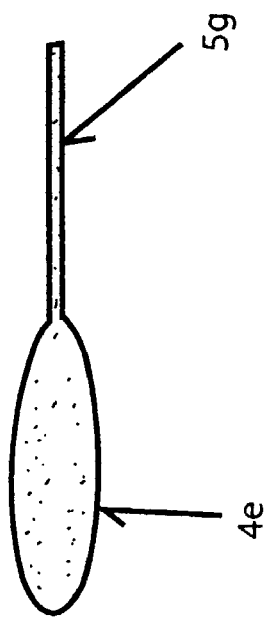
Figure 14:
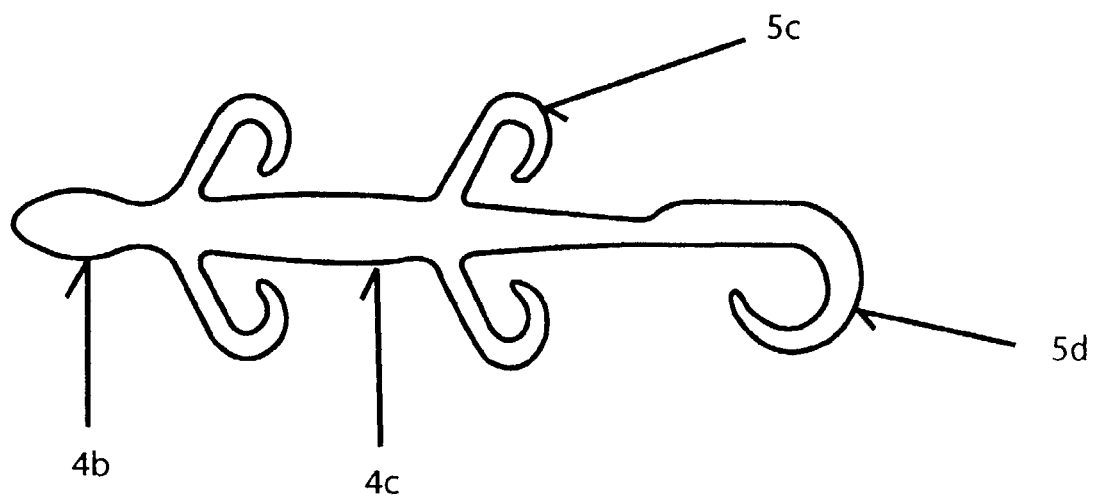
Figure 14A:
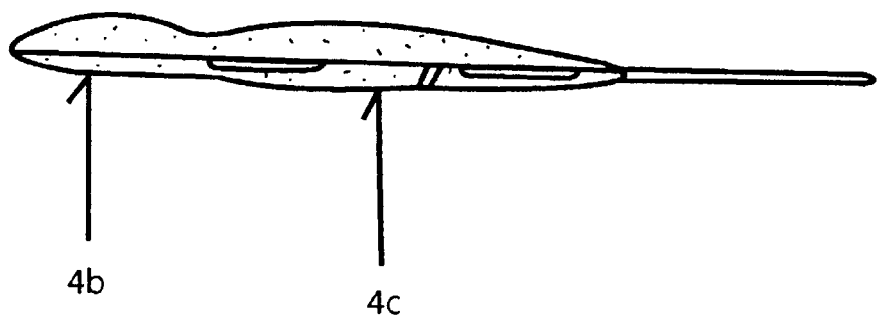
Figure 15:
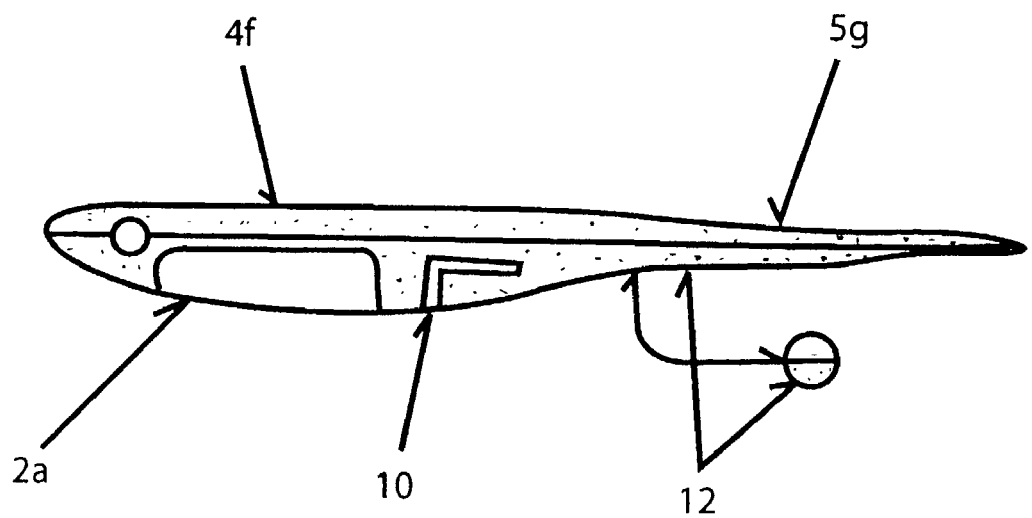
Figure 15A:
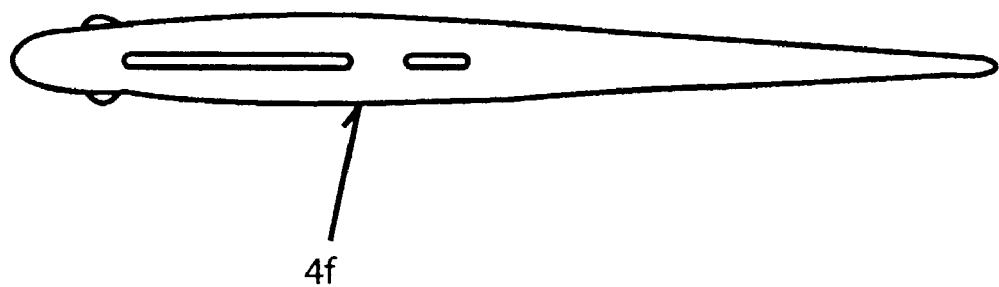
Figure 16:
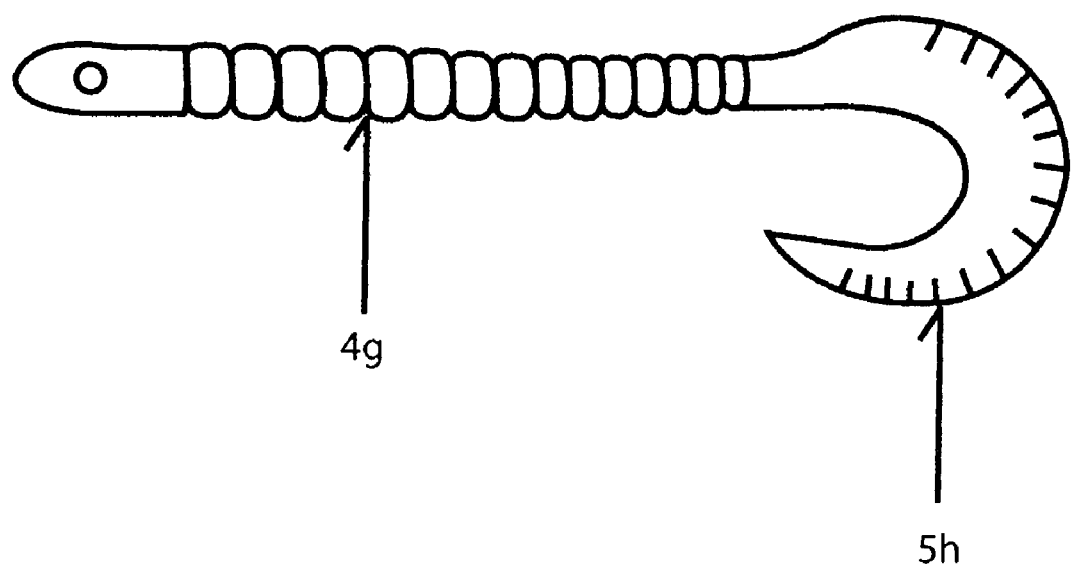
Figure 17:
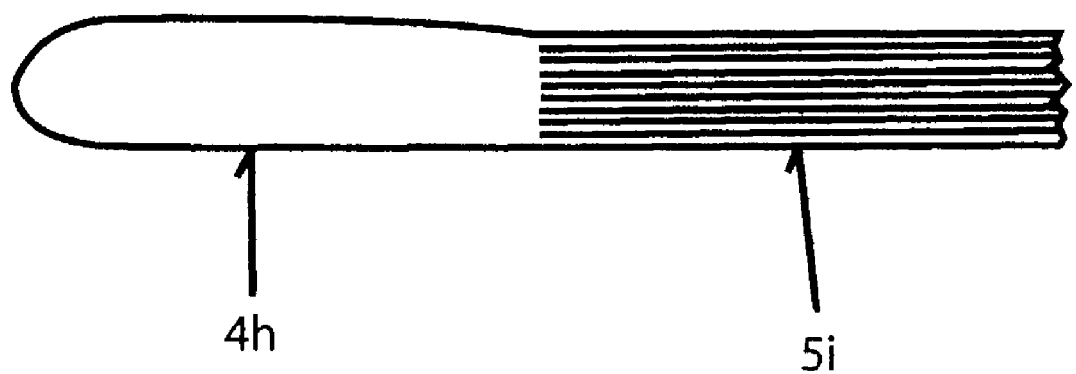
Figure 18:
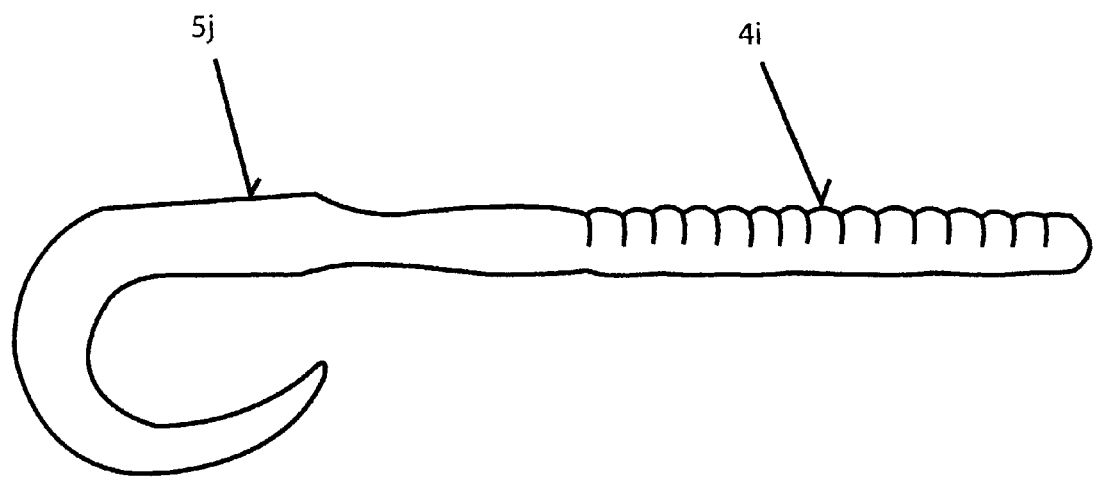
Figure 18A:
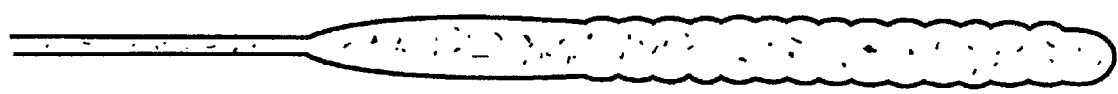
Figure 19:
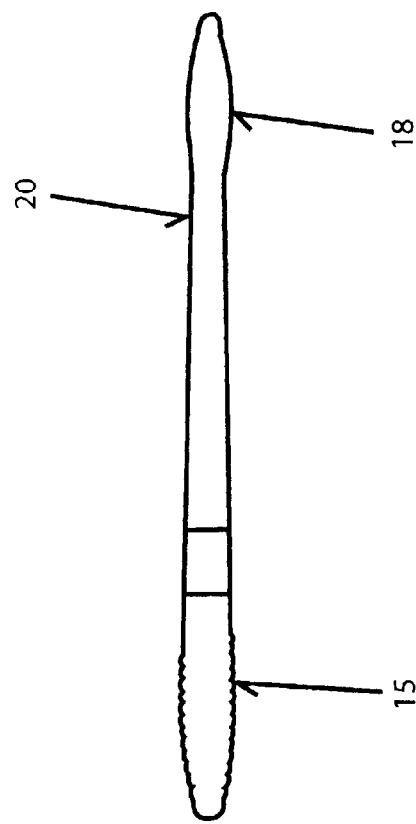
Figure 19A:
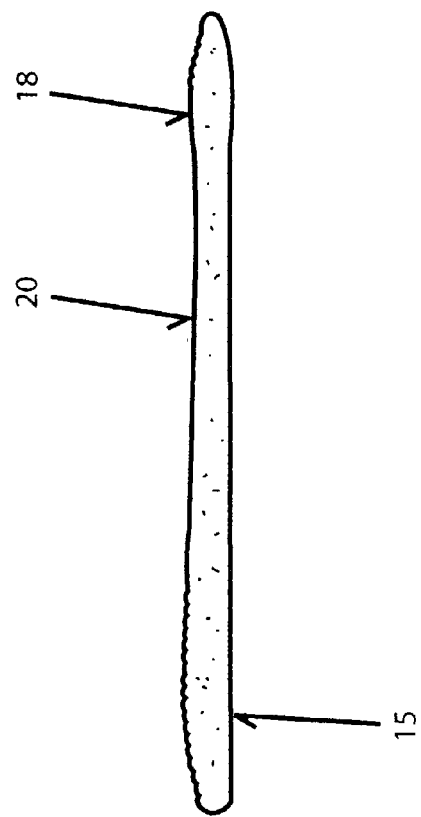
Figure 20:
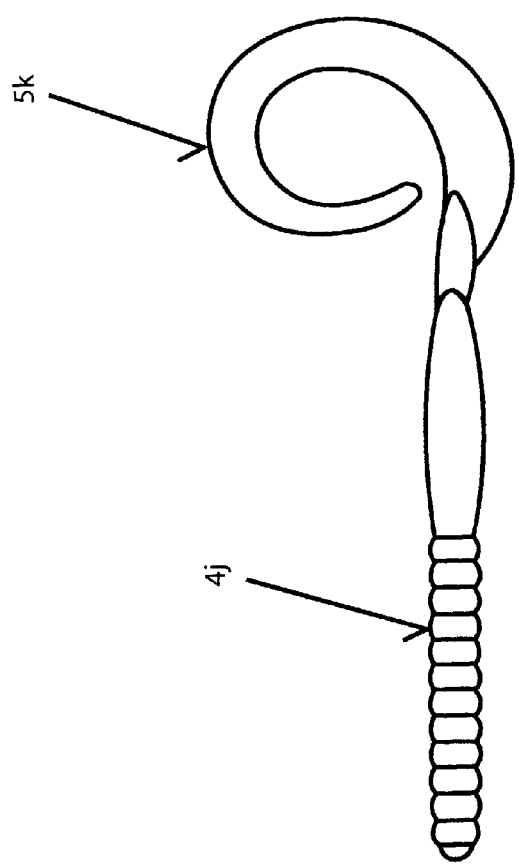
Figure 20A:
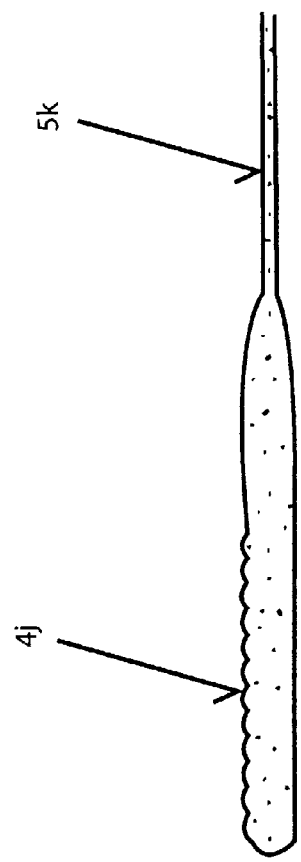
Figure 21:
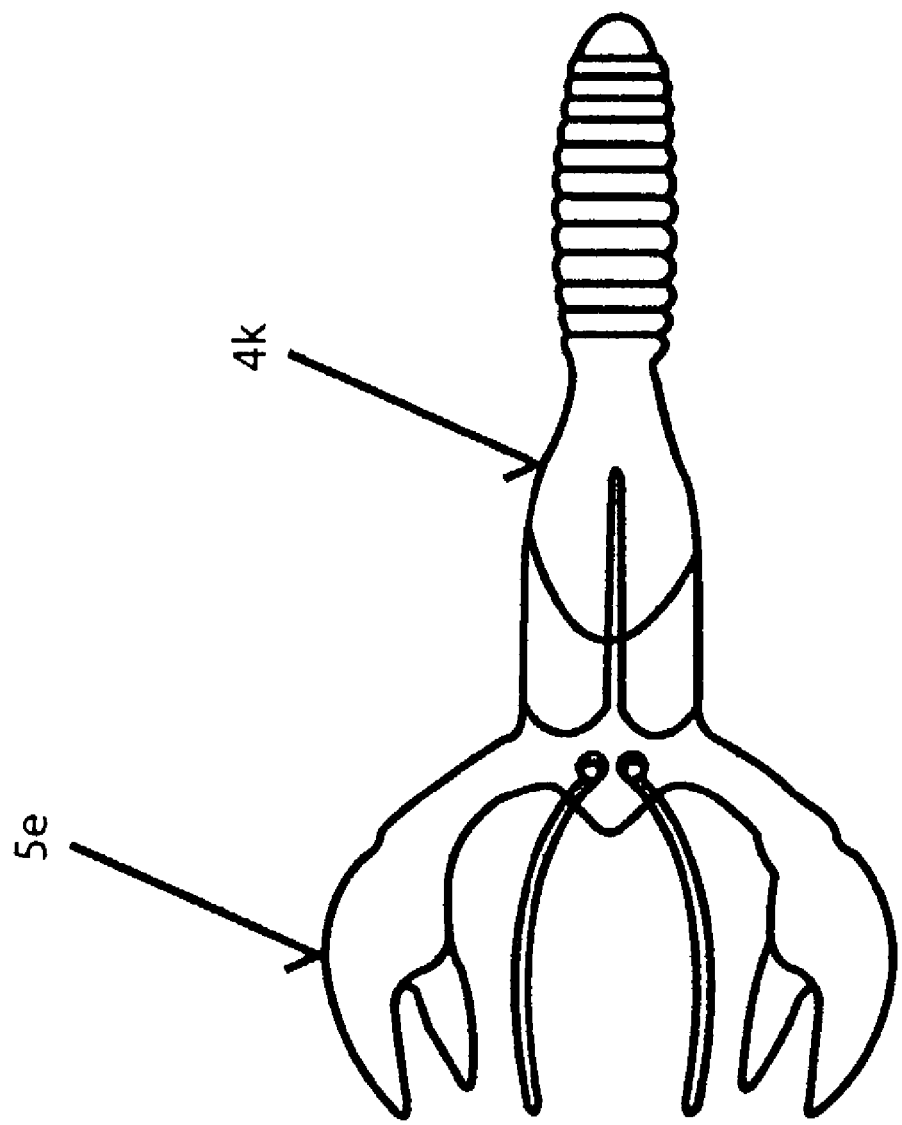
Figure 22:
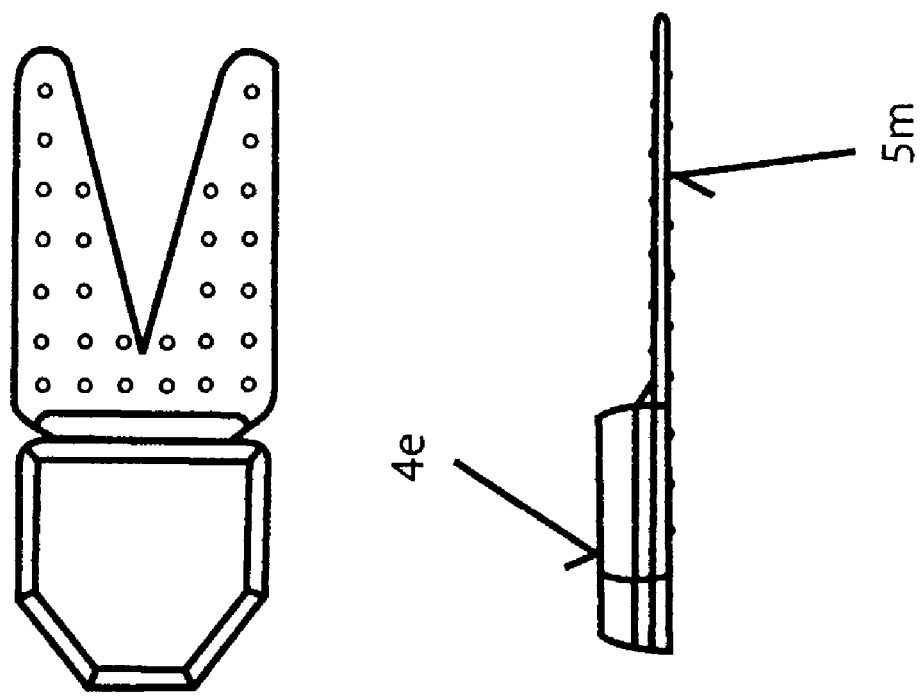
Figure 23:
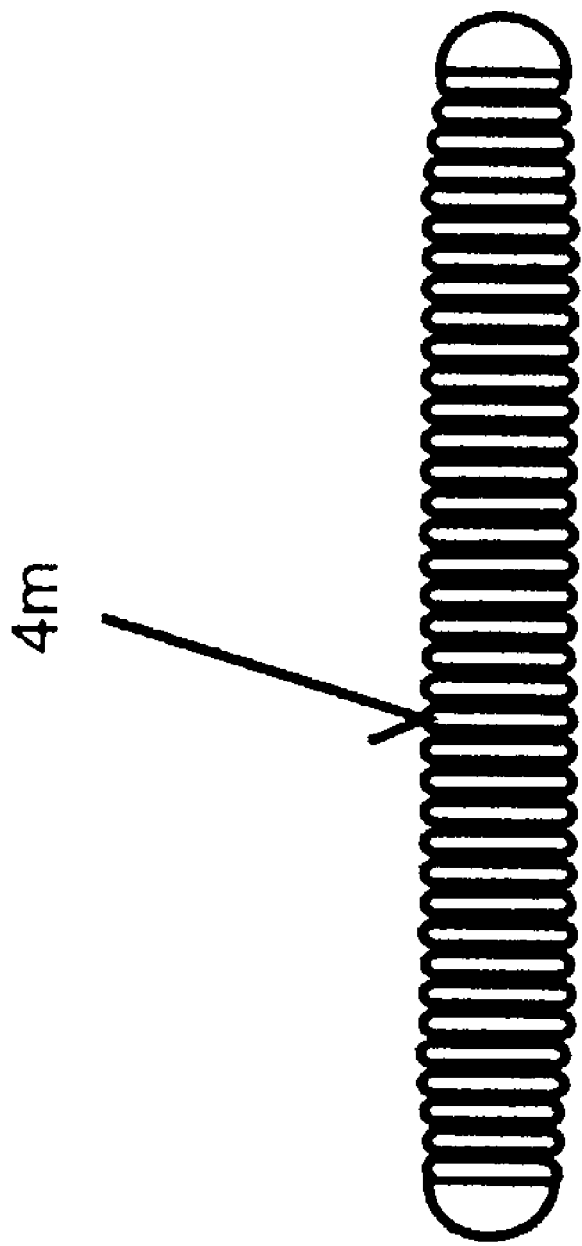
Figure 24:
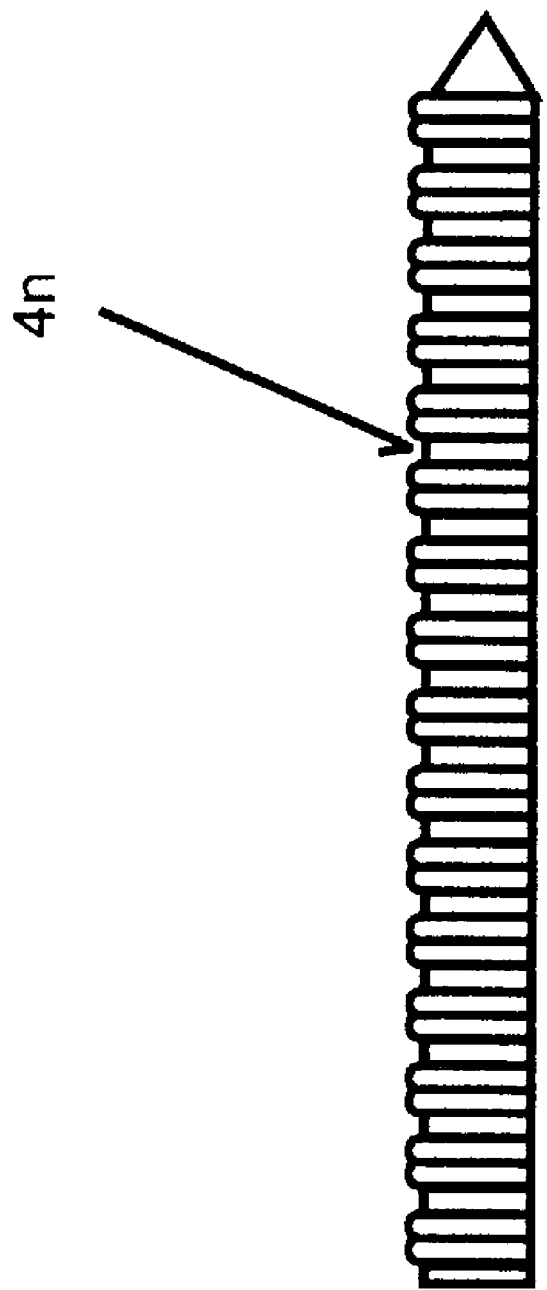
Figure 25:
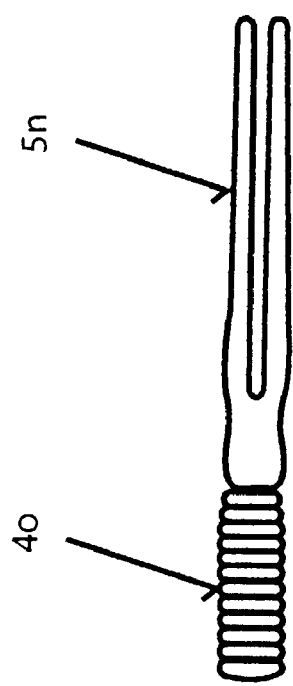
Figure 25A:
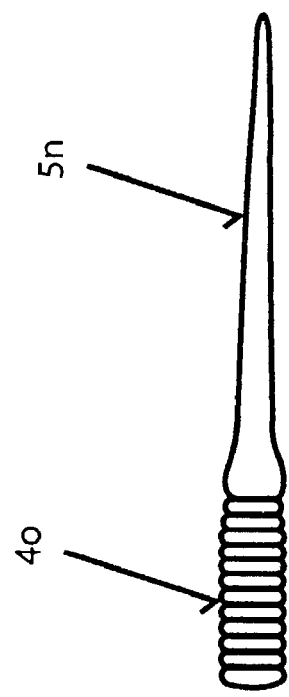
Figure 26:
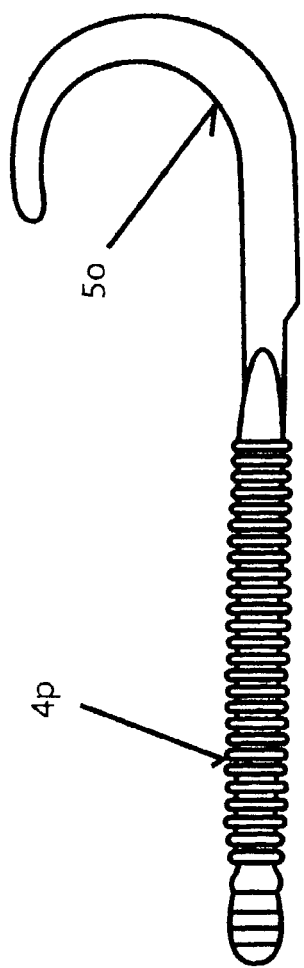
Figure 26A:
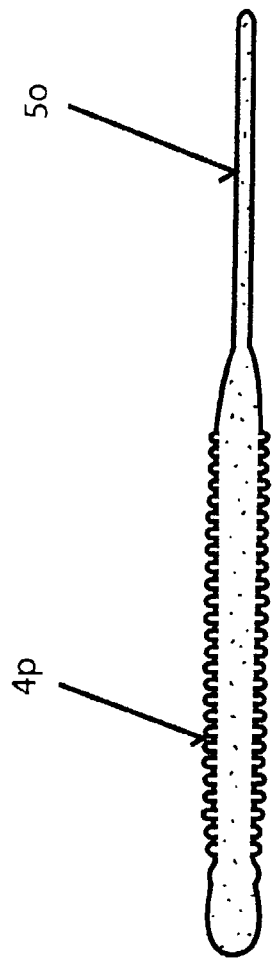
Figure 27:
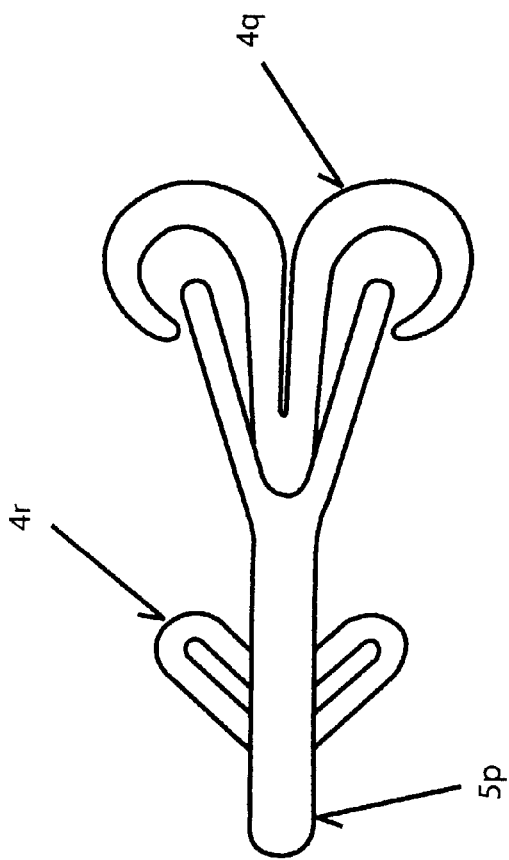
Figure 27A:
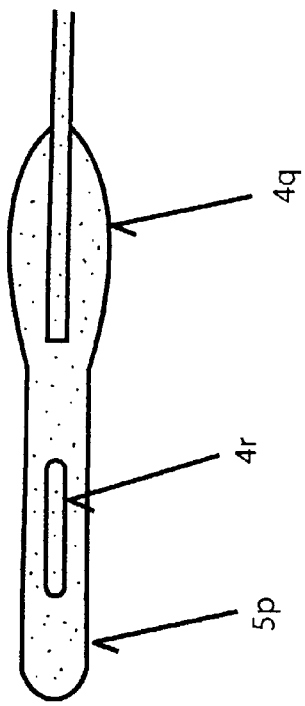
Figure 28A:
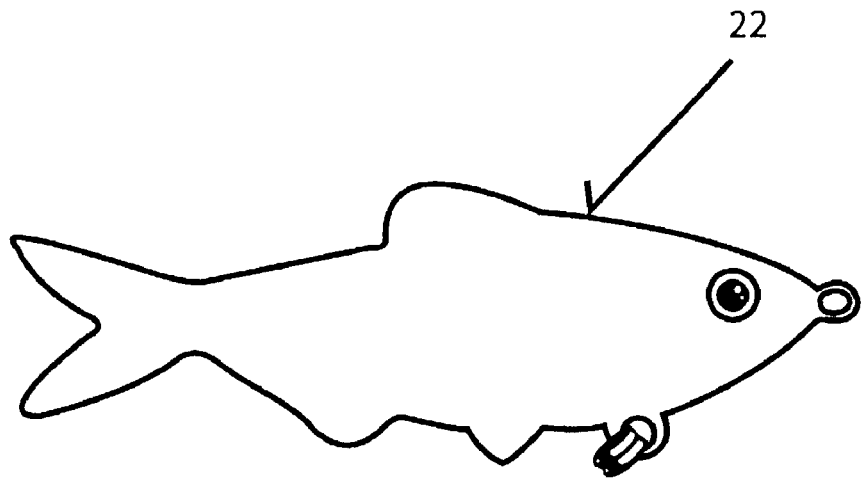
Figure 28B:
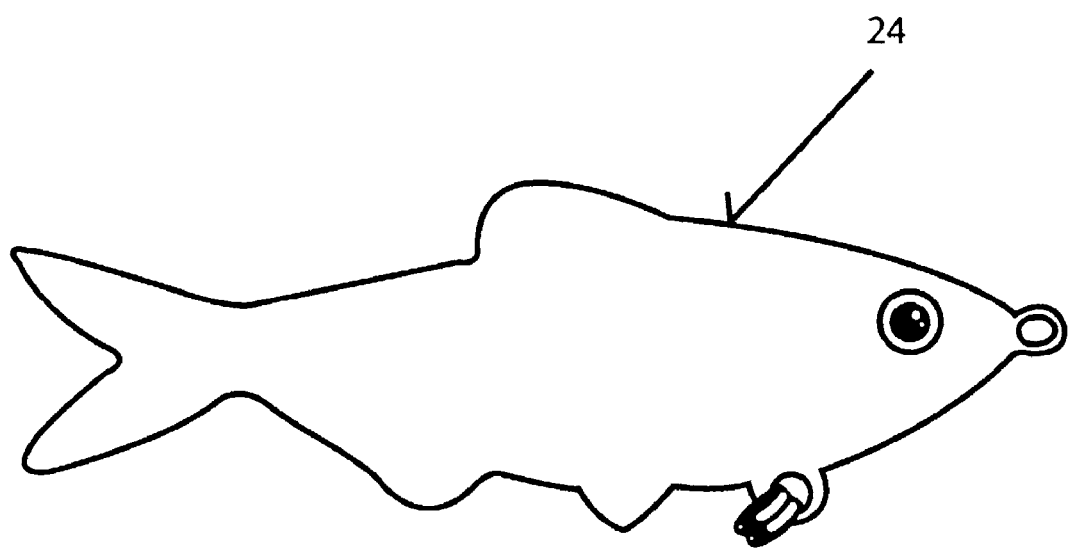
Figure 29:
Figure 29A:
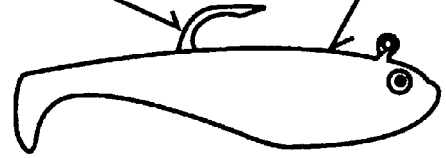
Figure 29B:
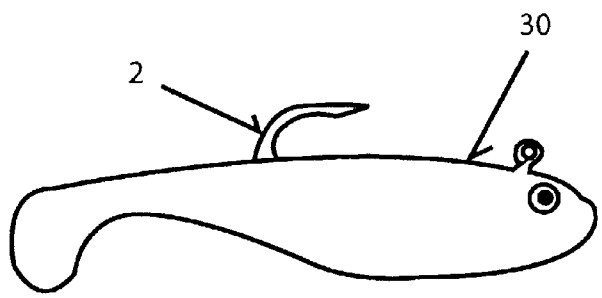
Figure 29C:
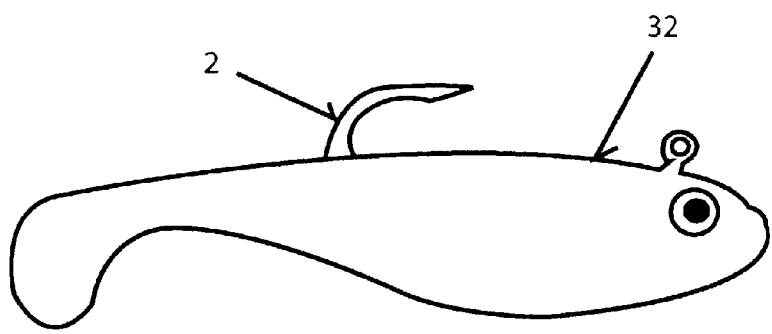
Figure 29D:
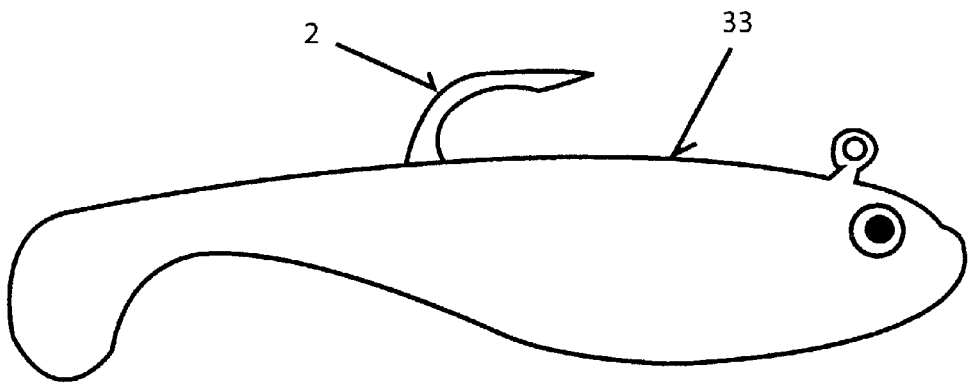
Figure 30:
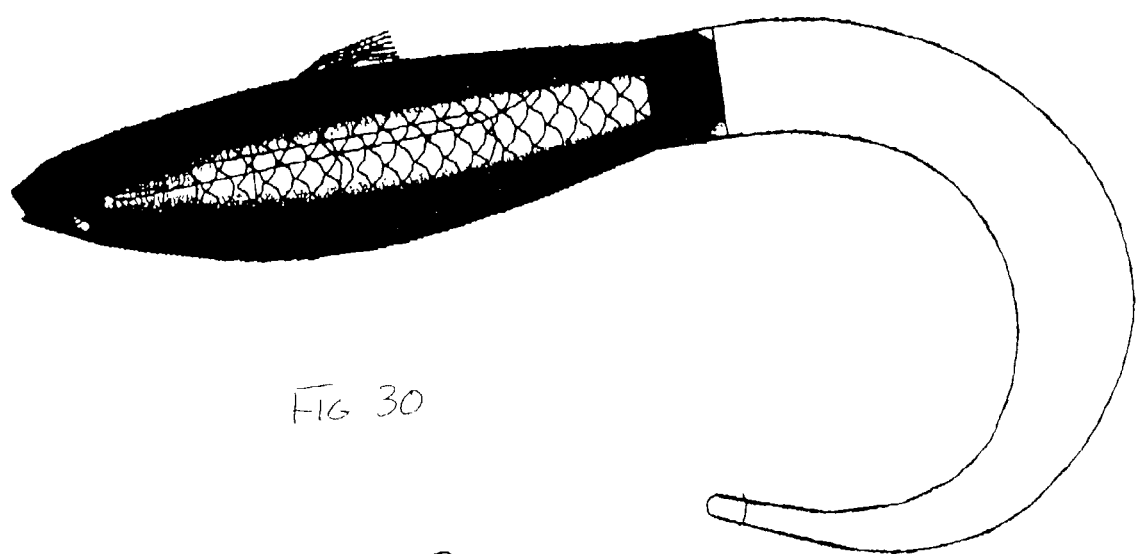
Figure 31:
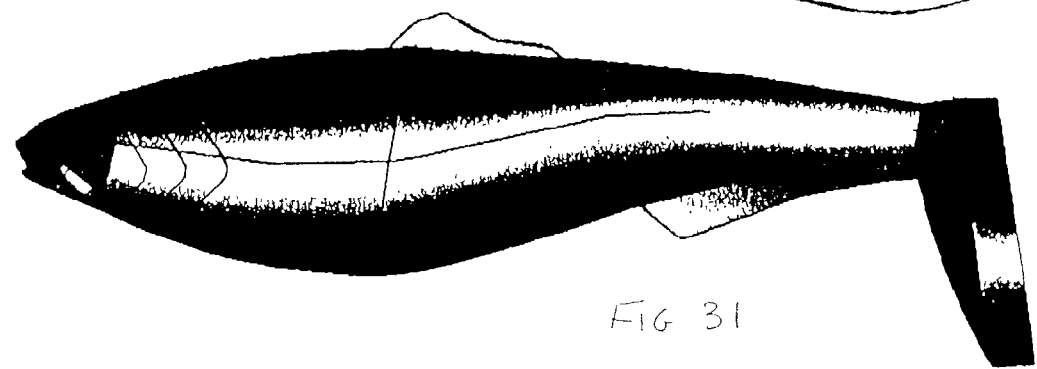
Figure 32:
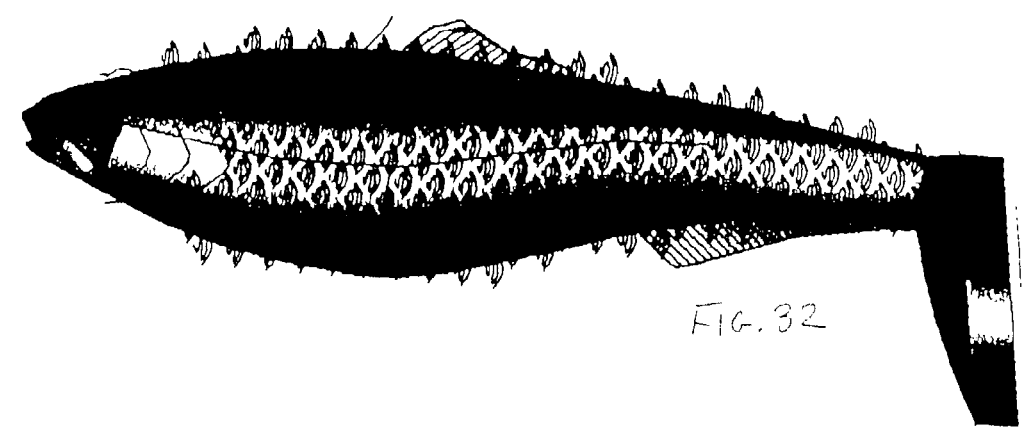
Figure 33:
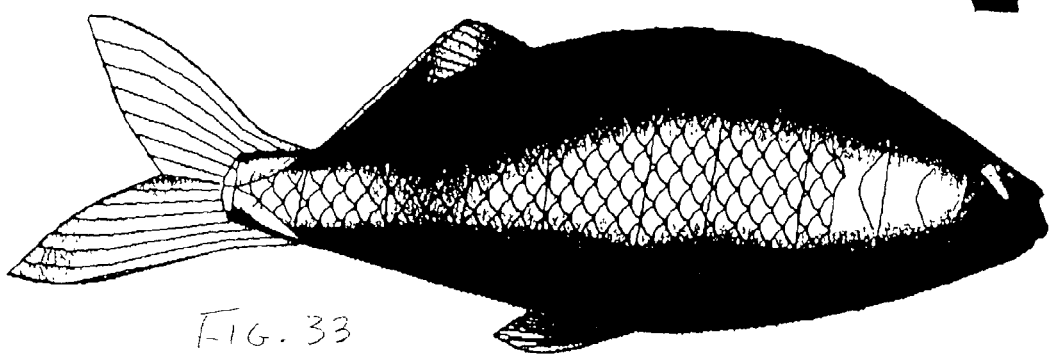
Figure 34:
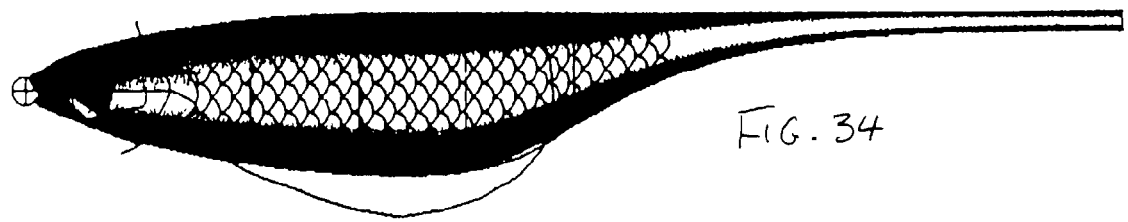
Figure 35:
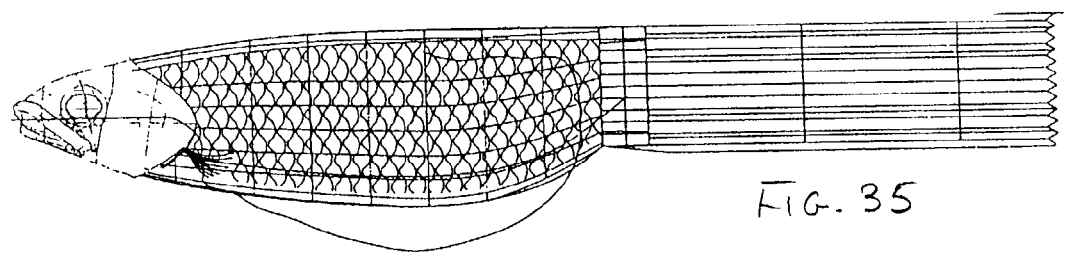
Figure 36:
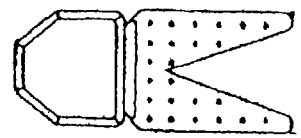
Figure 37:
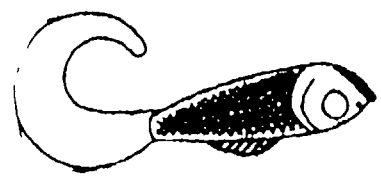
Figure 38:
Figure 39:
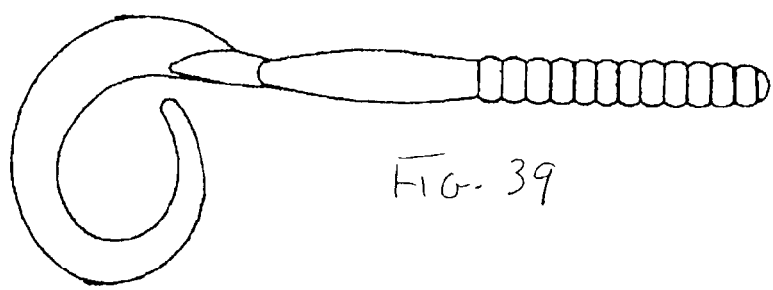

When this is repeated with an external nucleating agent, such as with various fine particles for coating the outside surface of the elastomer or gel, such as with talc, calcium stearate, zinc sterate, amorphous silica, aluminum sterate, fine flour, corn starch, fine soil, fine sand, fine metallic powder, vacuum dust, fine wood dusts and the like, lower COF is achieved within a few days to less than several hours. After coating the gel for the desired period of time, the fine polar and water soluble particles can be washed off with water and soap, while non-polar and non-water soluble fine powders can be removed by wearing it off or by lifting it off with the use of adhesive tapes if so desired. FIG. 6. (top view) photo of the top of a crystal gel article made with phenolics and external nucleating agents.

What is the surface properties of low CFO agents at the air/plasticizer-copolymer interface? Theory notwithstanding, the resulting gel surface will comprise of very fine molecular segments or even very fine crystal grains of low COF agents confined at the air/plasticizer and polymer interface. Depending on concentration, the non-polar segments of the low COF agents will have a tendency of being adsorpted by the predominate plasticizer and copolymer midblock phase at the gel surface. The slightly polar or more polar segments of the low COF agents are adsorbed to a lesser extent by the plasticizer-copolymer surface. This is supported by observing the water wetting characteristics at the gel surface with and with out low COF agents at the air gel surface interface. A drop of water will bead up and not readily wet the gel surface free of any low COF agents (hydrophobic). The presence of even slightly polar low COF agents exposed on the surface of the gel will make a drop of water flatten out and not bead up when place on the gel surface (hydrophilic).

Commercial high melting point, low oil solubility, and polar low COF agents such as polyphenolics which are advantageously useful in the present invention include: Ethanox 330 (Ethyl), Irganox 1010 (Ciba-Geigy), Santechhem A/O 15-1 (Santech), Ultra 210 (GE), Hostanox 03 (Hoechst Celanese), Irganox 3114 (Ciba-Geigy), Mixxim AO-3 (Fairmont), and the like. Other high melting point, low oil solubility, polar low COF agents contemplated are common amino acids: Such As Alamine, Arginine, Asparagine, Aspartic Acid, Cysteine, Glutamine, Glutamic Acid, Glycine, Histidine, Isoleucine, Leucine, Lysine, Methionine, Phenylalanine, Proline, Serine, Threonine, Tryptophan, Tyrosine and Valine. The melting points of these amino acids range from about 178° C. to about 344° C. The amino acids having greater advantage serving as low COF agents are Asparagine, Aspartic acid. Glutamine, Glutamic acid, Tryptophan, and Tyrosine Copolymer for forming the low COF compositions include block copolymers, random copolymers, metallocene catalyzed ethylene-styrene copolymers, Low COF crystal gels made from thermoplastic elastomer copolymers and block copolymers having one or more substantially crystalline polyethylene segments or midblocks. The low COF crystal gels advantageously exhibit high, higher, and higher, and ever higher tear resistance than realized before as well as improved high tensile strength. The low COF crystal gels also exhibit improved damage tolerance, crack propagation resistance and especially improved resistance to high stress rupture which combination of properties makes the gels advantageously and surprisingly suitable for use as toys, inflatable air cushions in automobiles, and the like.

The crystal gels of this invention are advantageously useful for making low COF gel compositions. Moreover, various polymer gels made from linear triblock copolymers, multi-arm block copolymers, branched block copolymers, radial block copolymers, multiblock copolymers, random/non-random copolymers, thermoplastic crystalline polyurethane copolymers with hydrocarbon midblocks or mixtures of two or more of such copolymers can also be made with low COF. The COF values of the crystal gels formed form the low COF and nucleating agents are found to be about less than 1, more advantageously less than 0.7, more advantageously less than 0.577, still more advantageously less than 0.466 and still more advantageously less tan 0.40. The low COF crystal gels of the invention can range from less than 1.0 to about less than 0.40.

Glassy phase associating homopolymers such as polystyrene and aromatic resins having low molecular weights of from about 2,500 to about 90,000 can be blended with the triblock copolymers of the invention in large amounts with or without the addition of plasticizer to provide a copolymer-resin alloy of high impact strengths. More advantageously, when blended with multiblock copolymers and substantially random copolymers the impact strengths can be even higher. The impact strength of blends of from about 150 to about 1,500 parts by weight glass phase associating polymer and resins to 100 parts by weight of one or more multiblock copolymers can provide impact strength approaching those of soft metals. At the higher loadings, the impact strength approaches that of polycarbonates of about 12 ft-lb/in notch and higher.

Oriented gels aligned by controlled stretching during the gel's transition from a heated, extremely viscous, non melting, non flowing state and the cooled solid gel state produces strong gels which are found to have greater tensile strength than gels of the same rigidity which have not been stretched to a selected degree during its heating and cooling histories. Gels which are selectively stretched during its (non melt flowing) heated state and rapidly cooled by flowing air, cold liquid bath or in contact with a cool surface exhibit optical birefringence when viewed under plane-polarized light. The degree of stretching during the gels cooling history from the heated state can vary. Stretching of at least about 50% to more than about 1000% are of advantage to produce birefringence and stronger gels. Birefrigence is not observed in relaxed gels which do not undergo stretching during its heating and cooling histories. Slight to very strong birefringence are observed in relaxed gels which are stretched during their heating and cooling histories. It is evident that stressing the gel during its cooling history as it cools from the heated state produce unexpected stronger oriented gels. We therefore consider oriented gels to be a new and novel composition physically different from the less stronger gels formed without stressing during the gels cooling history and which do not show birefrigence in the relaxed state. Oriented gels may be formed in combination with various substrates such as described below. In past situations where in order to obtain stronger gel strength, gels with higher rigidities and lower plasticizer content must be used, it is now possible to make a oriented gel with the same plasticizer content having a higher useful gel strength.

The gel compositions and oriented gel compositions of the invention can be casted unto various substrates, such as open cell materials, metals, ceramics, glasses, and plastics, etc.; the molten gel composition is deformed as it is being cooled. Useful open-cell plastics include: polyamides, polyimides, polyesters, polyisocyanurates, polyisocyanates, polyurethanes, poly(vinyl alcohol), etc. Open-celled Plastic (sponges) suitable for use with the compositions of the invention are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference.

The invention gels can be casted unto various substrates, such as open cell materials, metals, ceramics, glasses, and plastics, elastomers, fluropolymers, expanded fluropolymers, Teflon (TFE, PTFE, PEA, FEP, etc), expanded Teflon, spongy expanded nylon, etc.; the molten gel composition is deformed as it is being cooled. Useful open-cell plastics include: polyamides, polyimides, polyesters, polyisocyanurates, polyisocyanates, polyurethanes, poly(vinyl alcohol), etc. Open-celled Plastic (sponges) suitable for use with the compositions are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference.

The gel compositions denoted as "G" of the invention can be physically interlocked with a selected material denoted as "M" to form composites as denoted for simplicity by their combinations $G_nM_n$, $G_nM_nG_n$, $M_nG_nM_n$, $M_nG_nG_n$, $G_nG_nM_n$, $M_nM_nM_nG_n$, $M_nM_nM_nG_nM_n$, $M_nG_nG_nM_n$, $G_nM_nG_nG_n$, $G_nM_nM_nG_n$, $G_nM_nM_nG_n$, $G_nG_nM_nM_n$, $G_nG_nM_nG_nM_n$, $G_nM_nG_nG_n$, $G_nG_nM_n$, $G_nM_nG_nM_nM_n$, $M_nG_nM_nG_nM_nG_n$, $G_nG_nM_nM_nG_n$, $G_nG_nM_nG_nG_nM_nG_n$, and the like or any of their permutations of one or more $G_n$ with $M_n$ and the like, wherein when n is a subscript of M, n is the same or different selected from the group consisting of foam, plastic, fabric, metal, concrete, wood, glass, ceramics, synthetic resin, synthetic fibers or refractory materials and the like; wherein when n is a subscript of G, n denotes the same or a different gel rigidity of from about 20 to about 800 gram Bloom). The gel compositions of the composites are formed from I, II, and III components described above.

Sandwiches of gel/material (i.e. gel-material-gel or material-gel-material, etc.) are ideal for use as shock absorbers, acoustical isolators, vibration dampers, vibration isolators, and wrappers. For example the vibration isolators can be use under research microscopes, office equipment, tables, and the like to remove background vibrations.

Furthermore, the interlocking materials with the gel of the invention may be made from flexible materials, such as fibers and fabrics of cotton, flax, and silk. Other flexible materials include: elastomers, fiber-reinforced composites, mohair, and wool. Useful synthetic fibers include: acetate, acrylic, aremid, glass, modacrylic polyethylene, nylon, olefin, polyester, rayon, spandex, carbon, sufar, polybenzimidazole, and combinations of the above. Useful open-cell plastics include: polyamides, polyimides, polyesters, polyisocyanurates, polyisocyanates, polyurethanes, poly(vinyl alcohol), etc. Open-celled Plastic (foams) suitable for use with the compositions of the invention are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference. These include: open and non-opened cell silicone, polyurethane, polyethylene, neoprene, polyvinyl chloride, polyimide, metal, ceramic, polyether, polyester, polystyrene, polypropylene. Example of such foams are: Thanol®, Arcol®, Ugipol®, Arcel®, Arpak®, Arpro®, Arsan®, Dylite®, Dytherm®, Styrofoam®, Trymer®, Dow Ethafoam®, Ensolite®, Scotfoam®, Pyrell®, Volana®, Trocellen®, Minicel®, and the like.

The gelatinous elastomer compositions and oriented gel compositions are prepared by blending together the components including other additatives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amounts of SEBS, SEPS, $(SEB)_n$, $(SEP)_n$ or mixtures thereof used. These components blend easily in the melt and a heated vessel equipped with a stirrer is all that is required. Small batches can be easily blended in a test tube using a glass stirring rod for mixing. While conventional large vessels with pressure and/or vacuum means can be utilized in forming large batches of the instant compositions in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than 10 rpm to about 40 rpm or higher.

The oriented gelatinous elastomer composition of the invention is excellent for forming the strong gelatinous elastomer articles of the invention. The gelatinous elastomer articles can be formed by blending, injection molding, extruding and other conventional methods. For example, Shapes having various crossection can be extruded; and as the hot exudate is emerging from the extrusion die, the extradate can be stretched, pulled, twisted or in various manner stressed as it is rapidly placed in contact with cooling air, cool water bath, or other cooling media.

The gel compositions can also be formed directly into articles or remelted in any suitable hot melt applicator and extruded or spun into threads, bands, or other shapes.

The instant compositions is excellent for cast molding and the molded products have various excellent characteristics which cannot be anticipated form the properties of the raw components. Other conventional methods of forming the composition can be utilized.

The basis of this invention resides in the fact that one or more of a high viscosity triblock or branched copolymers or a mixture of two or more of such copolymers having styrene end block to elastomeric block ratio preferably within the contemplated range of from about 20:80 to about 40:60 and higher, more preferably from between about 31:69 to about 40:60 and higher when blended in the melt with an appropriate amount of plasticizing oil makes possible the attainment of gelatinous elastomer compositions having a desirable combination of physical and mechanical properties, notably high elongation at break of at least 1,600%, ultimate tensile strength of about at least $8\times10^5$ dyne/cm$^2$, low elongation set at break of substantially not greater than about 2%, tear resistance of at least $5\times10^5$ dyne/cm$^2$, substantially about 100% snap back when extended to 1,200% elongation, and a gel rigidity of substantially from about 20 gram to about 700 gram Bloom and higher.

More specifically, the gelatinous composition of the present invention exhibit one or more of the following properties. These are: (I) tensile strength of about $8\times10^5$ dyne/cm$^2$ to about 107 dyne/cm$^2$ and greater; (2) elongation of about 1,600% to about 3,000% and higher; (3) elasticity modulus of about 104 dyne/cm$^2$ to about 106 dyne/cm$^2$ and greater; (4) shear modulus of about 104 dyne/cm$^2$ to about 106 dyne/cm$^2$ and greater as measured with a 1, 2, and 3 kilogram load at 23° C.; (5) gel rigidity of about less than about 20 gram Bloom to about 700 gram Bloom and higher as measured by the gram weight required to depress a gel a distance of 4 mm with a piston having a cross-sectional area of 1 square cm at 23° C., (6) tear propagation resistance of at least about $5\times10^5$ dyne/cm$^2$; (7) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C.

The gelatinous elastomer articles molded from the instant compositions have various additional important advantages in that they do not crack, creep, tear, crack, or rupture in flexural, tension, compression, or other deforming conditions of normal use; but rather the molded articles made from the instant composition possess the intrinsic properties of elastic memory enabling the articles to recover and retain its original molded shape after many extreme deformation cycles as compared to prior art triblock copolymer oil-extended compositions. In applications where low rigidity, high elongation, good compression set and excellent tensile strength are important, the instant gel compositions would be preferred.

The gelatinous elastomer compositions of the present invention are useful in low frequency vibration applications, such as viscoelastic layers in constrained-layer damping of mechanical structures and goods, as viscoelastic layers used in laminates for isolation of acoustical and mechanical noise, as anti-vibration elastic support for transporting shock sensitive loads, as vibration isolators for an optical table, as viscoelastic layers used in wrappings, enclosures and linings to control sound, as compositions for use in shock and dielectric encapsulation of optical, electrical, and electronic components. The compositions are also useful as molded shape articles for use in medical and sport health care, such use include therapeutic hand exercising grips, dental floss, crutch cushions, cervical pillows, bed wedge pillows, leg rest, neck cushion, mattress, bed pads, elbow padding, dermal pads, wheelchair cushions, helmet liner, cold and hot packs, exercise weight belts, traction pads and belts, cushions for splints, slings, and braces (for the hand, wrist, finger, forearm, knee, leg, clavicle, shoulder, foot, ankle, neck, back, rib, etc.), and also soles for orthopedic shoes. Other uses may include as toys, optical uses (e.g. cladding for cushioning optical fibers from bending stresses) and various optical devices, as lint removers, dental floss, as tips for swabs, as fishing bait, as a high vacuum seal (against atmosphere pressure) which contains a useful amount of a mineral oil-based magnetic fluid particles, etc.

As an example of the versatility of use of the instant gel compositions, a hand exerciser can be made in any shape so long as it is suitable for use as a hand exerciser a sphere shape, a cube shape, a rectangular shape, etc. Likewise, a wheelchair cushion can be made from the composition in any shape, so long as it meets the needs of the user of the cushion. For example, a cushion can be made by forming the composition into a selected shape matching the contours of the specific body part or body region. The composition can be formed into any desired shaped, size and thickness suitable as a cushion; the shaped composition can be additionally surrounded with film, fabric, foam, or any other desired material or combinations thereof. Moreover, the composition can be casted onto such materials, provided such materials substantially maintain their integrity (shape, appearance, texture, etc.) during the casting process. The same applies for brace cushions for the hand, wrist, finger, forearm, knee, leg, etc.

Another versatile use of the composition is dental flossing. The dental floss can be almost any shape so long as it is suitable for dental flossing. A thick shaped piece of the composition can be stretched into a thin shape and used for flossing. A thinner shaped piece would require less stretching, etc.

The instant compositions can be formed in any shape; the original shape can be deformed into another shape (to contact a regular or irregular surface) by pressure and upon removal of the applied pressure, the composition in the deformed shape will recover back to its original shape. The gel articles molded from the instant compositions have various additional important advantages in that they do not crack, creep, tear, crack, or rupture in flexural, tension, compression, or other deforming conditions of normal use; but rather the molded articles made from the instant composition possess the intrinsic properties of elastic memory enabling the articles to recover and retain its original molded shape after many extreme deformation cycles.

The invention gels are especially suitable and have uses where resistance to dynamic stretching, shearing and tearing forces are particularly useful such as those forces acting during fishing as described above and as dental flossing. In the case of dental flossing, freeze dried dental paste can also be incorporated into the gel and formed into dental floss by passing coating the dental floss surface with flavors or other agents. Not only is the dental floss a floss, it is an effective tooth brush in between the tooth gap between making it a floss-brush with activated tooth past build in. The gel compounded with toothpaste can contain any anticavity agents including sodium fluoride, any antigingivitis agents, any whitening agents, and any plaque fighting agents. Freeze dry or powders containing hydrated silica, sorbitol, PVM/MA copolymer, sodium lauryl sulfate, flavor, sodium hydroxide, triclosan, monoammonium phosphate, calcium sulfate, ammonium chloride, magnesium chloride, methylparaben, propylparaben, coloring, and the like can be compounding into the gel composition forming a floss-brush gel composition.

Results of improved tear resistance and tensile strength are referenced and incorporated herein from U.S. Ser. No.: 10/199,364: example VI samples tested are shown in Table 3, #4–7; Table 4, #12–15 and 20; Table 5 #22, 23, 27–29; Table 6 #36–32; Table 7, #4043, #76 and 77. Sample Nos. 76 and 77 were tested together. Sample 77 exhibited higher tensile strength after 27.75% of plasticizing oil was extracted (with 2.89 parts by weight of oil remaining), its rigidity remained substantially unchanged. The results of example VII samples tested are shown in Table 3B, #8–11; Table 4, #16–19 and 21; Table 5, #24–26; Table 6, #33–35; and Table 7, #36–39.

While preferred components and formulation ranges have been disclosed herein. persons of skill in the art can extend these ranges using appropriate material according to the principles discussed herein. All such variations and deviations which rely on the teachings through which the present invention has advanced the art are considered to be within the spirit and scope of the present invention. The invention is further illustrated by means of the following illustrative embodiments, which are given for purpose of illustration only and are not meant to limit the invention to the particular components and amounts disclosed.

EXAMPLE I

A comparison was made between a low viscosity poly (styrene-ethylene-butylene-styrene) triblock copolymer having styrene end block to ethylene and butylene center block ratio below the range between 31:69 to 40:60 and a high viscosity poly(styrene-ethylene-butylene-styrene) triblock copolymer of the invention. Three different triblock copolymers were melt blended separately with a paraffinic white petroleum oil. Table I below shows the physical properties obtain with respect to each of the different viscosity and styrene to ethylene and butylene ratio triblock copolymer oil-blends tested.

The properties measured are as follows: Tear Propagation (ASTM D 19938 modified), Cracking (ASTM D 518 Method B modified), Tensile Strength (ASTM D 412 modified), Ultimate elongation (ASTM D 412 modified), Tensile Set (ASTM D 412 Modified), Compression Set (ASTM D 395 modified), Snap Back, and Hand Kneading (60 seconds). The methods of measurement are taught in U.S. Pat. Nos. 4,618,213 and 5,153,254; and, as well as, in copending applications Ser. Nos. 705,711; 934,027 and 935,540.

TABLE I

| | | Weight Parts | | |
|---|---|---|---|---|
| Formulation | S/EB Ratio[1] | A | B | C |
| SEBS[2] | 28:72 | 100 | | |
| SEBS[3] | 29:71 | | 100 | |
| SEBS[4] | 33:67 | | | 100 |
| Paraffinic oil[5] | | 400 | 400 | 400 |
| Stabilizer[6] | | 2.5 | 2.5 | 2.5 |
| Breaking strength[7], dyne/cm$^2$ | | $4 \times 10^5$ | $4 \times 10^5$ | $4 \times 10^6$ |
| Tear propagation[8], dyne/cm$^2$ | | $8 \times 10^4$ | $7 \times 10^4$ | $1 \times 10^6$ |
| Compression set[10] at 24 hours | | 81% (R) | 77% (R) | 0.0% |
| Rigidity, gram Bloom | | 1,536 | 1,520 | 360 |

[1]Styrene to ethylene and butylene ratio
[2]Shell Kraton G1650 having a Brookfield viscosity of 1,500 cps as measured for a 20% weight solids solution in toluene at 25° C.
[3]Shell Kraton G 1652 having a Brookfield viscosity of 550 cps as measured for a 20% weight solids solution in toluene at 25° C.
[4]Shell Kraton G 1651 having a Brookfield viscosity of 2,000 cps as measured for a 20% weight solids solution in toluene at 25° C.
[5]ARCO prime 200, [6]Irganox 1010, [7]ASTM D 412 modified, [8]ASTM D 1938 modified, [9]ASTM D 412 modified, [10]ASTM D 2395 modified, [R]ruptured completely The results of Table I show drastically unacceptable poor properties of low viscosity triblock copolymers having styrene to ethylene and butylene ratios and low viscosity which are below the contemplated (preferred) range of the instant invention.

Comparisons of oil extended triblock copolymers have been described in Shell Chemical Company Technical Bulletin SC: 1102-89 (April 1989) "KRATON® THERMOPLASTIC RUBBERS IN OIL GELS" which is incorporated herein by reference.

EXAMPLE II

One hundred parts by weight of a high viscosity poly(styrene-ethylene-butylene-styrene) triblock copolymer (Shell Kraton G 1651) having a styrene end block to ethylene and butylene center block ratio of about 33:67 with 0.1 parts by weight of a stabilizer (Irrganox 1010) was melt blended with various quantities of a napthenic oil (ARCO Tufflo 6024). Samples having the dimensions of 5 cm×5 cm×3 cm were cut and measured for gel rigidity on a modified Bloom gelometer as determined by the gram weight required to depress the gel a distance of 4 mm with a piston having a cross-sectional area of 1 cm$^2$. The average gel rigidity values with respect to various oil concentrations are set forth in Table II below.

TABLE II

| Oil per 100 parts of Triblock copolymer | Gel Rigidity, gram Bloom |
|---|---|
| 360 | 500 |
| 463 | 348 |
| 520 | 280 |
| 615 | 240 |
| 635 | 220 |
| 710 | 172 |
| 838 | 135 |
| 1,587 | 54 |

EXAMPLE III

Example II was repeated except about 980 parts oil was used and the gel rigidity found to about 101 gram Bloom. Other properties measured were: tensile strength at break about 4.4×10$^6$ dyne/cm$^2$, elongation at break about 2,4470%, elasticity modulus about 3.5×10$^4$ dyne/cm$^2$, and shear modulus about 3.7×10$^4$ dyne/cm$^2$. The tensile strength, elongation, elasticity modulus were measured with cross-head separation speed of 25 cm/minute at room temperature. The shear modulus was measured with a 1, 2, and 3 kilogram load at room temperature.

EXAMPLE IV

Example II was repeated except about 520 parts of a polybutene (Amoco Indopol H-300) was used and the gel rigidity found to be about substantially unchanged with respect to use of naphthenic oil alone.

EXAMPLE V

Example II was repeated except about 520 parts of a polypropylene (Amoco C-60) was used and the gel rigidity found to be about substantially unchanged with respect to use of naphthenic oil alone.

EXAMPLE VI

Example II was repeated except about 520 parts of a polyterpene (Hercules Piccolyte S10) was used and the gel rigidity found to be about substantially unchanged with respect to use of naphthenic oil alone.

EXAMPLE VII

Example II was repeated except about 360 parts of a combined mixture of: 72 parts of a paraffinic oil (ARCO prime 200), 72 pars of a naphthenic oil (ARCO Tufflo 6014), 72 parts of a polybutene oligomer (Amoco Indopol H-200), 72 parts of a polypropene oligomer (Amoco Polypropene C-60), and 72 parts of a polyterpene oligomer (Hercules Piccolyte SIO) was used and the gel rigidity found to be about substantially unchanged with respect to the use of naphthenic oil alone.

EXAMPLE VIII

Example III was repeated except 933 parts oil with 147 parts by weight of a high viscosity poly(styrene-ethylene-butylene-styrene) triblock copolymer containing 47 parts of a naphthenic process oil (Shell Kraton G 4609) having a styrene to ethylene and butylene ratio of about 33:67 was used and the physical properties were found to be about substantially unchanged with respect to the components used in Example III.

EXAMPLE IX

Example III was repeated except 933 parts oil with 147 parts by weight of a high viscosity poly(styrene-ethylene-butylene-styrene) triblock copolymer containing 47 parts of a paraffinic white petroleum oil (Shell Kraton G 4609) having a styrene to ethylene and butylene ratio of about 33:67 was used and the physical properties were found to be about substantially unchanged with respect to the components used in Example I.

EXAMPLE X

Example I was repeated except about 400 parts of oil was used and the properties measured were: tear propagation about 1.4×10$^6$ dyne/cm$^2$, no crack growth in 180° bend under 50 gram load for 5,000 hours at room temperature, tensile strength about 4×10$^6$ dyne/cm$^2$, elongation at break about 1,700%, tensile set about 0% at 1,200% elongation, compression set about 0% when tested under 5,000 gram load for 24 hours, and 100% snap back recovery after extension to 1,200%.

Examples XI–XIV-t below illustrate other modes of practice contemplated.

EXAMPLE XI

The procedure of Example II is repeated except Shell Kraton G 1651, poly(styrene-ethylene-butylene-styrene) triblock copolymer is used having a styrene end block to ethylene and butylene center block ratio of about 32:68 and the gel rigidity is found to be within the range of about 20 to about 700 gram Bloom.

EXAMPLE XII

The procedure of Example II is repeated except Shell Kraton G 1651, poly(styrene-ethylene-butylene-styrene) triblock copolymer, is used having a styrene end block to ethylene and butylene center block ratio of about 34:66 and the gel rigidity is found to be within the range of about 20 to about 700 gram Bloom.

EXAMPLE XIII

The procedure of Example II is repeated except Shell Kraton G 1651, poly(styrene-ethylene-butylene-styrene) triblock copolymer, is used having a styrene end block to ethylene and butylene center block ratio of about 36:64 and the gel rigidity is found to be within the range of about 20 to about 700 gram Bloom.

EXAMPLE XIV

The procedure of Example II is repeated except Shell Kraton G 1651, poly(styrene-ethylene-butylene-styrene) triblock copolymer, is used having a styrene end block to ethylene and butylene center block ratio of about 38:62 and the gel rigidity is found to be within the range of about 20 to about 700 gram Bloom.

EXAMPLE XIV-a

The procedure of Example II is repeated except Shell Kraton G 1651, poly(styrene-ethylene-butylene-styrene) triblock copolymer, is used having a styrene end block to ethylene and butylene center block ratio of about 31:69 and the gel rigidity is found to be within the range of about 20 to about 800 gram Bloom.

EXAMPLE XIV-b

The procedure of Example II is repeated except Shell Kraton G 1651, poly(styrene-ethylene-butylene-styrene) triblock copolymer, is used having a styrene end block to ethylene and butylene center block ratio of about 37:63 and the gel rigidity is found to be within the range of about 20 to about 800 gram Bloom.

EXAMPLE XIV-c

The procedure of Example II is repeated except Shell Kraton G 1651, poly(styrene-ethylene-butylene-styrene) triblock copolymer, is used having a styrene end block to ethylene and butylene center block ratio of about 19:81 and the gel rigidity is found to be within the range of about 20 to about 800 gram Bloom.

EXAMPLE XIV-d

The procedure of Example II is repeated except Shell Kraton G 1651, poly(styrene-ethylene-butylene-styrene) triblock copolymer, is used having a styrene end block to ethylene and butylene center block ratio of about 20:80 and the gel rigidity is found to be within the range of about 20 to about 800 gram Bloom.

EXAMPLE XIV-e

The procedure of Example II is repeated except Shell Kraton G 1651, poly(styrene-ethylene-butylene-styrene) triblock copolymer is used having a styrene end block to ethylene and butylene center block ratio of about 38:62 and the gel rigidity is found to be within the range of about 20 to about 800 gram Bloom.

EXAMPLE XIV-f

The procedure of Example II is repeated except Shell Kraton G 1651, poly(styrene-ethylene-butylene-styrene) triblock copolymer, is used having a styrene end block to ethylene and butylene center block ratio of about 29:71 and the gel rigidity is found to be within the range of about 20 to about 800 gram Bloom.

EXAMPLE XIV-g

The procedure of Example II is repeated except Shell Kraton G 1651, poly(styrene-ethylene-butylene-styrene) triblock copolymer, is used having a styrene end block to ethylene and butylene center block ratio of about 26:74 and the gel rigidity is found to be within the range of about 20 to about 800 gram Bloom.

EXAMPLE XIV-h

The procedure of Example II is repeated except Shell Kraton G 1651, poly(styrene-ethylene-butylene-styrene) triblock copolymer, is used having a styrene end block to ethylene and butylene center block ratio of about 22:78 and the gel rigidity is found to be within the range of about 20 to about 800 gram Bloom.

EXAMPLE XIV-i

The procedure of Example II is repeated except Shell Kraton G 1651, poly(styrene-ethylene-butylene-styrene) triblock copolymer, is used having a styrene end block to ethylene and butylene center block ratio of about 25:75 and the gel rigidity is found to be within the range of about 20 to about 800 gram Bloom.

EXAMPLE XIV-j

The procedure of Example II is repeated except Shell Kraton G 1651, poly(styrene-ethylene-butylene-styrene) triblock copolymer, is used having a styrene end block to ethylene and butylene center block ratio of about 26:74 and the gel rigidity is found to be within the range of about 20 to about 800 gram Bloom.

EXAMPLE XIV-k

Example II is repeated except a high viscosity poly(styrene-ethylene-propylene-styrene) polymer having a S:EP ratio of 35:65 and a Brookfield Viscosity at 20 weight percent at 30° C. of about 78,000 cps is used and the gel rigidity found to be found to be within the range of about 20 to about 800 gram Bloom.

EXAMPLE XIV-l

Example II is repeated except a high viscosity poly(styrene-ethylene-propylene-styrene) polymer having a S:EP ratio of 20:80 and a Brookfield Viscosity at 20 weight percent at 30° C. of about 76,000 cps is used and the gel rigidity found to be found to be within the range of about 20 to about 800 gram Bloom.

EXAMPLE XIV-m

Compositions of Example II are continuously extruded into 1 meter length rod shape articles through a 0.05, a 0.1, a 0.2, a 0.4, a 0.8, a 1.0, a 1.5, a 1.8, a 2.0, a 4.0, a 8.0 cm (inside diameter) pipe and the extruded articles are allowed to cool to room temperature. Light from a Spectra Physics Model 155A laser with a wavelength of about 632.80 nm is introduced at one end of each article and the light transmitted therethrough.

EXAMPLE XIV-n

Example II is repeated except a high viscosity star-shaped poly(styrene-ethylene-butylene) block copolymer having a S:EB ratio of 30:70 and a Brookfield Viscosity at 25 weight percent at 25° C. of about 9000 cps is used and the gel rigidity found to be found to be within the range of about 20 to about 800 gram Bloom.

EXAMPLE XIV-o

Example II is repeated except a high viscosity star-shaped poly(styrene-ethylene-propylene) random copolymer having a S:EP ratio of 35:65 and a Brookfield Viscosity at 25 weight percent at 25° C. of about 20,000 cps is used and the gel rigidity found to be found to be within the range of about 20 to about 800 gram Bloom.

EXAMPLE XIV-p

Example II is repeated except the molten composition is casted onto a polyether, a polyester, a surlyn ionomer open cell sponge thereby displacing the air space within the sponge and the gel rigidity is found to be greater than about the sum of the combined rigidity of the composition and sponge alone.

EXAMPLE XIV-q

Example II is repeated except a high viscosity star-shaped mixed poly(styrene-ethylene-propylene) copolymer having a S:EP ratio of 35:65 and a Brookfield Viscosity at 25 weight percent at 25° C. of about 12,000 cps is used and the gel rigidity found to be found to be within the range of about 20 to about 800 gram Bloom.

EXAMPLE XIV-r

Example II is repeated except a high viscosity star-shaped mixed poly(styrene-ethylene-butylene) block copolymer having a S:EB ratio of 35:65 and a Brookfield Viscosity at 25 weight percent at 25° C. of about 9,000 cps is used and the gel rigidity found to be found to be within the range of about 20 to about 800 gram Bloom.

EXAMPLE XIV-s

The composition of Example XXI is casted unto a SCOT-FOAM® ⅛" thick: 5, 10, 15, 20, 25, 30, 35, 40, 45, 50, 60, 70, 80, 90, 100, and 200 ppi foam sheet.

EXAMPLE XIV-t

The procedure of Example II is repeated except Shell Kraton G 1855x, poly(styrene-ethylene-butylene-styrene) triblock copolymer is used having a styrene end block to ethylene and butylene center block ratio of about 27:73 and the gel rigidity is found to be within the range of about 10 to about 800 gram Bloom.

EXAMPLE XV

Examples I–XIV, XIV-I, n, o, q, r and t are repeated and the gels are extruded and rapidly stretched up to 800% elongation by hand in a cooled water bath. The resulting gels show birefrigence and greater strength than corresponding unstressed (unstretched) gels.

EXAMPLE XVI

A gelatinous elastomer composition of 100 parts of Kraton G1651 and 400 parts by weight of Duraprime 200 white oil is made according to Example II and extruded and drawn into selected lengths of varying diameters from about 0.01 cm to about 0.25 cm for use as dental floss, the gel rigidity being within the range of about 20 to about 800 gram Bloom.

EXAMPLE XVII

Example XVII is repeated using Kurarary SEPS 2006 copolymer, Kurarary SEEPS 4055 copolymer, a high viscosity $(SEB)_n$ copolymer, and a high viscosity $(SEP)_n$ copolymer, the gel rigidities being within the range of about 20 to about 800 gram Bloom.

EXAMPLE XVIII

Gels of 100 parts of (50 parts by weight of Septon (SEEPS) and 50 parts by weight of Kraton 1651) copolymers in combination with 600 parts by weight of (300 parts by weight of Witco 40 oil and 300 parts of Blandol), 0.05 parts by weight of Irganox 1010, and 0.1 parts by weight of Tinuvin P, are melt blended, tests, and tack probe samples molded, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have an elongation greater than 500% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XIX

Gels of 100 parts of (50 parts by weight of Septon (SEEPS) and 50 parts by weight of Kraton 1651) copolymers in combination with 600 parts by weight of (300 parts by weight of Witco 40 oil and 300 parts of Blandol), 0.05 parts by weight of Irganox 1010, and 0.1 parts by weight of Tinuvin P, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have an elongation greater than 800% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XX

Gels of 100 parts of (50 parts by weight of Septon (SEEPS) and 50 parts by weight of Kraton 1651) copolymers in combination with 600 parts by weight of (300 parts by weight of Witco 40 oil and 300 parts of Blandol), 0.05 parts by weight of Irganox 1010, and 0.1 parts by weight of Tinuvin P, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have an elongation greater than 900% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XXI

Gels of 100 parts of (50 parts by weight of Septon (SEEPS) and 50 parts by weight of Kraton 1651) copolymers in combination with 600 parts by weight of (300 parts by weight of Witco 40 oil and 300 parts of Blandol), 0.05 parts by weight of Irganox 1010, and 0.1 parts by weight of Tinuvin P, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have an elongation greater than 1,000% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XXII

Gels of 100 parts of (50 parts by weight of Septon (SEEPS) and 50 parts by weight of Kraton 1651) copolymers in combination with 600 parts by weight of about 4, 5, 6, 7, 8, 9, 10, 11 12, 13, and about 14 cSt @ 40° C. viscosity oils, 0.05 parts by weight of Irganox 1010, and 0.1 parts by weight of Tinuvin P, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have increasing Gram Tack values with increasing oil viscosity, increase resistance to heat set at 50° C. as determined under 180' U bend for one hour, an elongation greater than 500% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XXIII

Gels of 100 parts of (50 parts by weight of Septon (SEEPS) and 50 parts by weight of Kraton 1651) copolymers in combination with 600 parts by weight of about 18, 24, 28, 35, 39, 57, 61 and about 64 cSt @ 40° C. viscosity oils, 0.05 parts by weight of Irganox 1010, and 0.1 parts by weight of Tinuvin P, the bulk gel rigidities are found to be within the range of 2 gram to 800 gram Bloom and the notched tear strength and resistance to fatigue of the gel at corresponding rigidities are found to be greater than that of amorphous gels of made from Septon 2006 SEPS. The resulting gel is found to have increasing Gram Tack values with increasing oil viscosity, increase resistance to heat set at 50° C. as determined under 180' U bend for one hour, an elongation greater than 500% and is used to mold fishing baits in the form of a worm, a frog, a lizard, a fish for use on a Carolina Rig, a Texas Rig, and a Wacky Rig presentation and the fishing baits are found to exhibit a success hook to catch ratio greater than 5 as compared to a conventional plastisol polyvinyl chloride fishing bait of corresponding rigidity.

EXAMPLE XXIV

Gel of 100 parts of of Kraton 1651 copolymer in combination with 600 parts by weight of (300 parts by weight of Arcro Prime 55 and 300 parts by weight of Arco prime 70), 0.05 parts by weight of Irganox 1010, and 0.1 parts by weight of Tinuvin P, the bulk gel rigidities are found to be within the range of 2 gram to 800 gram Bloom. The resulting gel is found to have heat set greater than 50° C. as determined under 180' U bend for one hour, an elongation greater than 500% and mold in the form of a fishing bait exhibit greater strength than a conventional plastisol polyvinyl chloride fishing bait of corresponding rigidity.

EXAMPLE XXV

When poly(styrene-ethylene-butylene-styrene) (SEBS) is substituted in place of (I) block copolymer of the invention in Examples XVIII through XXIV above, the (SEBS) strength is slightly lower, the tear resistance and rupture resistance is also lower. For use as fishing bait, (SEBS) gels can also be made soft and is an improvement over conventional plastisol polyvinyl chloride fishing baits of corresponding rigidity.

EXAMPLE XXVI

The following gels were made with 600 parts by weight of oil, 0.5 parts by weight of Irganox 1010, and 0.5 parts by weight of Tinuvin P, melt blended in a 16×150 mm glass test tube, cooled, removed, and 180' U bend tested 50° C. for 1.0 hour:

1. 80 parts by weight of Septon 4055 and 20 parts by weight of Septon 2006, block copolymers, Witco 40 oil, the gel sample retained a deformation of about 30'.

2. 80 parts by weight of Septon 8006 and 20 parts by weight of Septon 4055, block copolymers, 35 parts by weight of Endex 160, Witco 40 oil, the gel heat tested sample retained a deformation of about 84°.

3. Gels of 90 parts by weight of Septon 8006 and 10 parts by weight of Septon 4055, block copolymers, 35 parts by weight of Endex 160, Witco 40 oil, the gel heat tested sample retained a deformation of about 85'.

4. Gels of 80 parts by weight of Septon 8006 and 20 parts by weight of Septon 4055, block copolymers, 45 parts by weight of Endex 160, Witco 40 oil, the gel heat tested sample retained a deformation of about 91'.

5. Gels of 90 parts by weight of Septon 8006 and 10 parts by weight of Septon 4055, block copolymers, 45 parts by weight of Endex 160, Witco 40 oil, the gel heat tested sample retained a deformation of about 95'.

6. Gels of 100 parts by weight of Septon 8006, block copolymers, 25 parts by weight of Endex 155, Witco 40 oil, the gel heat tested sample retained a deformation of about 56'.

7. Gels of 100 parts by weight of Septon 8006, block copolymers, 45 parts by weight of Endex 155, Witco 40 oil, 0.5 parts by weight of Irganox 1010, the gel heat tested sample retained a deformation of about 57'.

8. Gels of 100 parts by weight of Septon 4055, block copolymers, Witco 40 oil, the gel heat tested sample retained a deformation of about 90'.

9. Gels of 60 parts by weight of Septon 4055 & 30 parts by weight of Kraton 1651 block copolymers, Witco 40 oil, the gel heat tested sample retained a deformation of about 45'.

10. Gels of 30 parts by weight of Septon 4055 & 60 parts by weight of Kraton 1651 block copolymers, Witco 40 oil, the gel heat tested sample retained a deformation of about 55'.

11. Gels of 100 parts by weight of Septon 8006 block copolymers in combination with 33 parts by weight of a GE PPO Blendex® HPP821, 600 parts by weight of Witco 40 oil, the gel heat tested sample retained a deformation of about 10'.

12. Gels of 60 parts by weight of Septon 4055 & 30 part by weight of Kraton 1651 block copolymers in combination with 33 parts by weight of a GE PPO Blendex® HPP821, Witco 40 oil, the gel heat tested sample retained a deformation of about 33'.

13. Gels of 100 parts by weight of Septon 4055 block copolymers in combination with 25 parts by weight of a GE PPO BlendexG HPP821, Witco 40 oil, the gel heat tested sample retained a deformation of about 30'.

14. Gels of 100 parts by weight of Septon 2006 block copolymers in combination with 25 parts by weight of a GE PPO Blendex® HPP821, Witco 40 oil, the gel heat tested sample retained a deformation of about 15'.

15. Gels of 100 parts by weight of Septon 8006 block copolymers in combination with 25 parts by weight of a GE PPO Blendex® HPP821, Witco 40 oil, the gel heat tested sample retained a deformation of about 35'.

16. Gels of 100 parts by weight of Kraton 1651 block copolymers in combination with 25 parts by weight of a GE PPO Blendex® HPP821, Witco 40 oil, the gel heat tested sample retained a deformation of about 25'.

17. Gels of 100 parts by weight of Septon 4055 block copolymers in combination with 25 parts by weight of Endex 155, Witco 40 oil, the gel heat tested sample retained a deformation of about 75'.

18. Gels of 100 parts by weight of Septon 2006 block copolymers in combination with 25 parts by weight of Endex 155, Witco 40 oil, the gel heat tested sample retained a deformation of about 55'.

19. Gels of 100 parts by weight of Septon 8006 block copolymers in combination with 25 parts by weight of Endex 155, Witco 40 oil, the gel heat tested sample retained a deformation of about 30'.

20. Gels of 100 parts by weight of Kraton 1651 block copolymers in combination with 25 parts by weight of Endex 155, Witco 40 oil, the gel heat tested sample retained a deformation of about 27'.

21. Gels of 100 parts by weight of Septon 4055 block copolymers, Blandol, the gel heat tested sample retained a deformation of about 30'.

22. Gels of 100 parts by weight of Septon 4055 block copolymers, Carnation, the gel heat tested sample retained a deformation of about 30'.

23. Gels of 100 parts by weight of Septon 4055 block copolymers, Klearol, the gel heat tested sample retained a deformation of about 40'.

25. Gels of 50 parts by weight of Septon 4055 & 50 parts by weight of Septon 2006 block copolymers, (equal weight of Blandol and Witco 40 oil), the gel heat tested sample retained a deformation of about 57'.

26. Gels of 50 parts by weight of Septon 4055 & 50 parts by weight of Septon 2006 block copolymers, Witco 40 oil, the gel heat tested sample retained a deformation of about 78'.

27. Gels of 50 parts by weight of Septon 4055 & 50 parts by weight of Septon 2006 block copolymers, Witco 40 oil, the gel heat tested sample retained a deformation of about 80'.

28. Gels of 50 parts by weight of Septon 4055 & 50 parts by weight of Kraton 1651 block copolymers, (equal weight of Blandol and Witco 40 oil), the gel heat tested sample retained a deformation of about 55'.

29. Gels of 100 parts by weight of Septon 2006 block copolymers, (equal weight of Blandol and Witco 40 oil), the gel heat tested sample retained a deformation of about 45'. The resulting gel is highly tacky.

30. A Berkly and V & M PVC fishing baits were 180' U bend tested @ 50° C. for 1.0 hour, both baits retained a deformation of about 34'.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. A fishing bait comprising a non-tacky article in the shape of a prey for presentation in fresh or salt water made from a soft gelatinous elastomer composition comprising
   (I) 100 parts by weight of one or more of a linear, radial or multiblock poly(styrene-ethylene-butylene)$_n$ copolymer(s); in combination with
   (II) one or more selected low viscosity first plasticizer(s) and one or more selected high viscosity second plasticizer(s); said selected first and second plasticizers being in sufficient amounts to achieve a gel rigidity of from about 20 gram Bloom to about 800 gram Bloom, wherein n is greater than one.

2. A fishing bait comprising a non-tacky article in the shape of a prey for presentation in fresh or salt water made from a soft gelatinous elastomer composition comprising
   (I) 100 parts by weight of one or more of a linear, radial or multiblock copolymer(s); in combination with
   (II) at least one low viscosity first plasticizer and at least one high viscosity second plasticizer; said selected first and second plasticizers being in sufficient amounts to achieve a gel rigidity of from about 20 gram Bloom to about 800 gram Bloom; wherein said copolymers is selected from poly(styrene-ethylene-butylene-styrene), poly(styrene-ethylene-propylene-styrene), poly(styrene-ethylene-propylene)$_n$, and poly(styrene-ethylene-butylene), wherein n is greater than one.

3. A fishing bait comprising a non-tacky article in the shape of a prey for presentation in fresh or salt water made from a soft gelatinous elastomer composition comprising
(I) 100 parts by weight of one or more of a linear, radial or multiblock copolymer(s); in combination with
(II) one or more selected low viscosity first plasticizer(s) and one or more selected high viscosity plasticizer(s); said selected first and second plasticizers being in sufficient amounts to achieve a gel rigidity of from about 20 gram Bloom to about 800 gram Bloom; wherein said block copolymer(s) is selected from poly (styrene-ethylene-butylene-styrene), poly(styrene-butadiene-styrene), poly(styrene-butadiene)$_n$, poly(styrene-isoprene-styrene)$_n$, poly(styrene-isoprene)$_n$, poly(styrene-ethylene-propylene), poly(styrene-ethylene-propylene-styrene), poly(styrene-ethylene-butylene), poly(styrene-ethylene-propylene)$_n$, and poly(styrene-ethylene-butylene)$_n$, wherein n is greater than one.

4. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ copolymer(s); and from
(II) about 300 to about 1,600 parts by weight of a selected amount of at least one low viscosity first plasticizer(s) and a selected amount of at least one high viscosity second plasticizer(s); and in combination with
(III) a selected amount of one or more polymers or copolymers of poly(styrene-butadiene-styrene), poly (styrene-butadiene)$_n$, poly(styrene-isoprene-styrene)$_n$, poly(styrene-isoprene)$_n$, poly(styrene-ethylene-propylene), poly(styrene-ethylene-propylene-styrene), poly (styrene-ethylene-propylene)$_n$, poly(styrene-ethylene-butylene)$_n$, polystyrene, polybutylene, poly(ethylene-propylene), poly(ethylene-butylene), polypropylene, or polyethylene, wherein said selected copolymer is a linear, radial, star-shaped, branched or multiarm copolymer, wherein n is greater than one.

5. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ copolymer(s);
(II) one or more low viscosity first plasticizer(s) with one or more high viscosity second plasticizer(s); and one or more polymers selected from
(III) polystyrene, poly(alpha-methylstyrene), poly(o-methylstyrene), poly(m-methylstryene), poly(p-methylstyrene), and poly(dimethylphenylene oxide);
said selected first and second plasticizers being in sufficient amounts to achieve a gel rigidity of from about 20 gram Bloom to about 800 gram Bloom.

6. A fishing bait comprising a non-tacky article in the shape of a prey for presentation in fresh or salt water made from a soft gelatinous elastomer composition comprising
(I) 100 parts by weight of one or more of a linear, radial or multiblock copolymer(s);
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said gelatinous elastomer composition in combination with or without one or more selected polymers or copolymers;
said high viscosity second plasticizer(s) being in effective amounts in combination with said low viscosity first plasticizer(s) for said gelatinous compositions to have a greater temperature compression set than a gelatinous composition having the same rigidity formed from said low viscosity first plasticizer(s) alone;
said high viscosity second plasticizer(s) for said gelatinous compositions to have a greater temperature compression set than a gelatinous composition having the same rigidity formed from said low viscosity first plasticizer(s) alone or formed from a combination of said first plasticizer(s) and said second plasticizer(s); wherein said block copolymers is selected from poly (styrene-ethylene-butylene-styrene), poly(styrene-ethylene-propylene-styrene), poly(styrene-ethylene-propylene)$_n$, and poly(styrene-ethylene-butylene)$_n$, wherein n is greater than one.

7. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ copolymer(s);
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said gelatinous elastomer composition in combination with or without one or more selected polymers or copolymers;
said high viscosity second plasticizer(s) being in effective amounts in combination with said low viscosity first plasticizer(s) for said gelatinous compositions to have a greater temperature compression set than a gelatinous composition having the same rigidity formed from said low viscosity first plasticizer(s) alone;
said high viscosity second plasticizer(s) for said gelatinous compositions to have a greater temperature compression set than a gelatinous composition having the same rigidity formed from said low viscosity first plasticizer(s) alone or formed from a combination of said first plasticizer(s) and said second plasticizer(s); and
said fishing bait being life like, soft, flexible, capable of exhibiting buoyancy in water.

8. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ and poly(styrene-ethylene-propylene)$_n$ copolymer(s), wherein n is greater than one;
(II) one or more low viscosity first plasticizer(s) with one or more high viscosity second plasticizer(s); and
(III) a selected amount of one or more polymers and copolymers of poly(styrene-butadiene-styrene), poly (styrene-butadiene)$_n$, poly(styrene-isoprene-styrene)$_n$, poly(styrene-isoprene)$_n$, poly(styrene-ethylene-propylene), poly(styrene-ethylene-propylene-styrene), poly (styrene-ethylene-butylene-styrene), poly(styrene-ethylene-butylene), poly(styrene-ethylene-propylene)$_n$, poly(styrene-ethylene-butylene)$_n$, polystyrene, poly(alpha-methylstyrene), poly(4-methylstyrene), polyphenylene oxide, polybutylene, poly(ethylene-propylene), poly(ethylene-butylene), polypropylene, and polyethylene, wherein said selected copolymer is a linear, radial, star-shaped, branched or multiarm copolymer, wherein n is greater than one;

said selected first and second plasticizers being in sufficient amounts to achieve a gel rigidity of from about 20 gram Bloom to about 800 gram Bloom; said gelatinous elastomer composition in combination with or without one or more selected polymers or copolymers;

said fishing bait being life like, soft, flexible, capable of exhibiting buoyancy in water, and having a elongation greater than 500%;

said fishing bait being rupture resistant to dynamic stretching, shearing, resistant to ball-up during casting, resistant to tearing encountered during hook penetration, casting, and presentation;

said fishing bait capable of exhibiting a success hook to catch ratio greater than 5, and said fishing bait having greater elongation, greater tear resistance, or greater fatigue resistance than a plastisol polyvinyl chloride fishing bait of corresponding rigidity.

9. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ copolymer(s); and
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom;

said gelatinous elastomer composition have a greater temperature compression heat set as determined for 1.0 hour at 50° C. in 180° U bend than a plastisol polyvinyl chloride fishing bait of corresponding rigidity.

10. A fishing bait comprising a non-tacky article in the shape of a prey for presentation in fresh or salt water made from a soft gelatinous elastomer composition comprising
(I) 100 parts by weight of one or more of a poly(styrene-ethylene-butylene-styrene) block copolymer(s);
(II) one or more low viscosity first plasticizer(s) with one or more high viscosity second plasticizer(s); and
(III) a selected amount of one or more polymers and copolymers of trifluoromethyl-4,5-difuoro-1,3-dioxole, tetrafluoroethylene, polytetrafluoroethylene, maleated poly(styrene-ethylene-butylene), maleated poly(styrene-ethylene-butylene)$_n$, maleated poly(styrene-ethylene-butylene-styrene), maleated poly(styrene-ethylene-propylene)$_n$, maleated poly(styrene-ethylene-propylene-styrene), poly(dimethylphenylene oxide), poly(ethylene-butylene), poly(ethylene-propylene), poly(ethylene-styrene) interpolymer made by metallocene catalysts, using single site, constrained geometry addition polymerization catalysts, poly(styrene-butadiene), poly(styrene-butadiene)$_n$, poly(styrene-butadiene-styrene), poly(styrene-ethylene-butylene), poly(styrene-ethylene-butylene)$_n$, poly(styrene-ethylene-butylene-styrene), poly(styrene-ethylene-butylene-styrene), poly(styrene-ethylene-propylene), poly(styrene-ethylene-propylene)$_n$, poly(styrene-ethylene-propylene-styrene), poly(styrene-isoprene), poly(styrene-isoprene)$_n$, poly(styrene-isoprene-styrene), poly(styrene-isoprene-styrene)$_n$, polyamide, polybutylene, polybutylene, polycarbonate, polydimethylsiloxane; polyethylene vinyl alcohol copolymer, polyethylene, polyethyleneoxide, polypropylene, polystyrene, and polyvinyl alcohol, wherein said selected copolymer is a linear, radial, star-shaped, branched or multiarm copolymer, wherein n is greater than one;

said selected first and second plasticizers being in sufficient amounts to achieve a gel rigidity of from about 20 gram Bloom to about 800 gram Bloom;

said fishing bait having greater resistant to tearing encountered during hook penetration followed by elongation to 200% as compared to a plastisol polyvinyl chloride fishing bait of corresponding rigidity.

11. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ and poly(styrene-ethylene-propylene)$_n$ copolymer(s), wherein n is greater than one;
(II) one or more selected low viscosity first plasticizer(s) and one or more selected high viscosity plasticizer(s);
said selected first and second plasticizers being in sufficient amounts to achieve a gel rigidity of from about 20 gram Bloom to about 800 gram Bloom.

12. A fishing bait comprising a non-tacky article in the shape of a prey for presentation in fresh or salt water made from a soft gelatinous elastomer composition comprising
(I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s);
(II) about 300 to about 1,600 parts by weight of a selected amount of at least one low viscosity first plasticizer(s) and a selected amount of at least one high viscosity second plasticizer(s); and in combination with
(III) a selected amount of one or more polymers or copolymers of poly(styrene-butadiene-styrene), poly(styrene-butadiene)$_n$, poly(styrene-isoprene-styrene)$_n$, poly(styrene-isoprene)$_n$, poly(styrene-ethylene-propylene), poly(styrene-ethylene-propylene-styrene), poly(styrene-ethylene-butylene), poly(styrene-ethylene-propylene)$_n$, poly(styrene-ethylene-butylene)$_n$, polystyrene, polybutylene, poly(ethylene-propylene), poly(ethylene-butylene), polypropylene, or polyethylene, wherein said selected copolymer is a linear, radial, star-shaped, branched or multiarm copolymer, wherein n is greater than one.

13. A fishing bait comprising a non-tacky article in the shape of a prey for presentation in fresh or salt water made from a soft gelatinous elastomer composition comprising
(I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein n is greater than one, and wherein said block copolymers having a styrene to rubber ratio of at least 37:63;
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said gelatinous elastomer composition in combination with or without one or more selected polymers or copolymers;

said high viscosity second plasticizer(s) being in effective amounts in combination with said low viscosity first plasticizer(s) for said gelatinous compositions to have a greater temperature compression set than a gelatinous composition having the same rigidity formed from said low viscosity first plasticizer(s) alone;

said high viscosity second plasticizer(s) for said gelatinous compositions to have a greater temperature compression set than a gelatinous composition having the same rigidity formed from said low viscosity first plasticizer(s) alone or formed from a combination of said first plasticizer(s) and said second plasticizer(s).

14. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ copolymer(s), wherein n is greater than one;
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said gelatinous elastomer composition in combination with or without one or more selected polymers or copolymers;
said high viscosity second plasticizer(s) being in effective amounts in combination with said low viscosity first plasticizer(s) for said gelatinous compositions to have a greater temperature compression set than a gelatinous composition having the same rigidity formed from said low viscosity first plasticizer(s) alone;
said high viscosity second plasticizer(s) for said gelatinous compositions to have a greater temperature compression set than a gelatinous composition having the same rigidity formed from said low viscosity first plasticizer(s) alone or formed from a combination of said first plasticizer(s) and said second plasticizer(s); and
said fishing bait being life like, soft, flexible, capable of exhibiting buoyancy in water.

15. A fishing bait comprising a non-tacky article in the shape of a prey for presentation in fresh or salt water made from a soft gelatinous elastomer composition comprising
(I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein n is greater than one, and wherein said block copolymers having a selected styrene to rubber ratio of at least 37:63, 38:62, 39:61, 40:60, 41:59, 42:58, 43:57, 44:65, 45:55, 46:54, 47:53, 48:52, 49:51, 50:50, and 51:49;
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said gelatinous elastomer composition in combination with or without one or more selected polymers or copolymers;
said fishing bait being life like, soft, flexible, capable of exhibiting buoyancy in water, and having a elongation greater than 500%;
said fishing bait being rupture resistant to dynamic stretching, shearing, resistant to ball-up during casting, resistant to tearing encountered during hook penetration, casting, and presentation;
said fishing bait capable of exhibiting a success hook to catch ratio greater than 5, and
said fishing bait having greater elongation, greater tear resistance, or greater fatigue resistance than a plastisol polyvinyl chloride fishing bait of corresponding rigidity.

16. A fishing bait comprising a non-tacky article in the shape of a prey for presentation in fresh or salt water made from a soft gelatinous elastomer composition comprising
(I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein said block copolymers having a selected styrene to rubber ratio of at least about 37:63, 38:62, 39:61, 40:60, 41:59, 42:58, 43:57, 44:65, 45:55, 46:54, 47:53, 48:52, 49:51, 50:50, and 51:49;
(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; wherein said low viscosity first plasticizers having a selected viscosity of about 30, 29, 28, 27, 26, 25, 24, 23, 22, 21, 20, 19, 18, 17, 16, 15, 14, 13, 12, 11, 10, 9, 8, 7, 6, 5, 4, and 3 cSt @ 40° C.;
said gelatinous elastomer composition have a greater temperature compression heat set as determined for 1.0 hour at 50° C. in 180° U bend than a plastisol polyvinyl chloride fishing bait of corresponding rigidity.

17. A fishing bait comprising a non-tacky article in the shape of a prey for presentation in fresh or salt water made from a soft gelatinous elastomer composition comprising
(I) 100 parts by weight of one or more of a linear, radial or multiblock poly(styrene-ethylene-butylene)$_n$ and poly(styrene-ethylene-propylene)$_n$ copolymer(s), wherein n is a number greater than one;
(II) one or more low viscosity first plasticizer(s) with one or more high viscosity second plasticizer(s); in combination with one or more metal flakes of aluminum and brass;
said selected first and second plasticizers being in sufficient amounts to achieve a gel rigidity of from about 20 gram Bloom to about 800 gram Bloom;
said fishing bait having greater resistant to tearing encountered during hook penetration followed by elongation to 200% as compared to a plastisol polyvinyl chloride fishing bait of corresponding rigidity.

18. A fishing bait comprising a non-tacky article in the shape of a prey for presentation in fresh or salt water made from a soft gelatinous elastomer composition comprising
(I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein n is greater than one;

(II) one or more low viscosity first plasticizer(s) with one or more high viscosity second plasticizer(s); in combination with one or more metal flakes of aluminum and brass;

said selected first and second plasticizers being in sufficient amounts to achieve a gel rigidity of from about 20 gram Bloom to about 800 gram Bloom;

said fishing bait having greater resistant to tearing encountered during hook penetration followed by elongation to 500% as compared to a conventional plastisol polyvinyl chloride fishing bait of corresponding rigidity.

19. A fishing bait comprising a non-tacky article in the shape of a prey for presentation in fresh or salt water made from a soft gelatinous elastomer composition comprising (I) 100 parts by weight of one or more of a linear, radial or multiblock poly(styrene-ethylene-propylene)$_n$ copolymer(s), wherein n is greater than one;

(II) one or more low viscosity first plasticizer(s) with one or more high viscosity second plasticizer(s); wherein said low viscosity first plasticizers having a selected viscosity of less than about 30 cSt @ 40° C.;

said selected first and second plasticizers being in sufficient amounts to achieve a gel rigidity of from about 20 gram Bloom to about 800 gram Bloom;

said fishing bait having greater resistant to tearing encountered during hook penetration followed by elongation to 500% as compared to a plastisol polyvinyl chloride fishing bait of corresponding rigidity.

20. A fishing bait comprising a non-tacky article in the shape of a prey for presentation in fresh or salt water made from a soft gelatinous elastomer composition comprising (I) 100 parts by weight of one or more of a poly(styrene-ethylene-butylene-styrene) block copolymer(s);

(II) one or more low viscosity first plasticizer(s) with one or more high viscosity second plasticizer(s); in combination with or without a minor amount of one or more additives of talc, silicon dioxide, silicone fluid, metal flakes of aluminum and brass, mica, and amorphous silica;

said selected first and second plasticizers being in sufficient amounts to achieve a gel rigidity of from about 20 gram Bloom to about 800 gram Bloom;

said fishing bait having greater resistant to tearing encountered during hook penetration followed by elongation to 500% as compared to a plastisol polyvinyl chloride fishing bait of corresponding rigidity.

21. A fishing bait comprising a non-tacky article in the shape of a prey for presentation in fresh or salt water made from a soft gelatinous elastomer composition comprising (I) 100 parts by weight of one or more of a poly(styrene-ethylene-butylene-styrene) block copolymer(s) and from (II) about 300 to about 1,600 parts by weight of a selected amount of at least one low viscosity first plasticizer(s) and a selected amount of at least one high viscosity second plasticizer(s); and in combination with (III) a selected amount of one or more of poly(styrene-butadiene-styrene), poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene)$_n$, poly(styrene-ethylene-propylene)$_n$; wherein n is greater than one.

22. A fishing bait comprising a non-tacky article in the shape of a prey for presentation in fresh or salt water made from a soft gelatinous elastomer composition comprising (I) 100 parts by weight of one or more of a poly(styrene-ethylene-butylene-styrene), poly(styrene-ethylene-butylene)$_n$, poly(styrene-isoprene-styrene)$_n$, poly(styrene-ethylene-propylene-styrene), poly(styrene-ethylene-butylene-styrene), poly(styrene-ethylene-butylene)$_n$, and poly(styrene-ethylene-propylene)$_n$ block copolymer(s) and from (II) about 300 to about 1,600 parts by weight of a selected amount of at least one low viscosity first plasticizer(s) and a selected amount of at least one high viscosity second plasticizer(s); and in combination with (III) a selected amount of poly(styrene-butadiene-styrene) having a styrene to rubber ratio of at least about 35:65; wherein n is greater than one.

23. A fishing bait comprising a non-tacky article in the shape of a prey for presentation in fresh or salt water made from a soft gelatinous elastomer composition comprising (I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein n is greater than one; and wherein said block copolymers having a selected styrene to rubber ratio of about 22:78. 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, 47:53, 48:52, 49:51, 50:50, and 51:49, and from (II) about 300 to about 1,600 parts by weight of a selected amount of at least one low viscosity first plasticizer(s) and a selected amount of at least one high viscosity second plasticizer(s).

24. A fishing bait comprising a non-tacky article in the shape of a prey for presentation in fresh or salt water made from a soft gelatinous elastomer composition comprising (I) 100 parts by weight of one or more of a linear, radial or poly(styrene-ethylene-butylene)$_n$, poly(styrene-butadiene)$_n$, poly(styrene-isoprene-styrene)$_n$, poly(styrene-ethylene-propylene-styrene), poly(styrene-ethylene-butylene-styrene), poly(styrene-ethylene-butylene)$_n$, poly(styrene-ethylene-propylene)$_n$ multiblock copolymer(s), wherein n is greater than one; and wherein said block copolymers having a selected styrene to rubber ratio of about 35:65, 36:64, 37:63, 38:62, 39:61, 40:60, 41:59, 42:58, 43:57, 44:65, 45:55, 46:54, 47:53, 48:52, 49:51, 50:50, and 51:49, and from (II) about 300 to about 1,600 parts by weight of a selected amount of at least one low viscosity first plasticizer(s) and a selected amount of at least one high viscosity second plasticizer(s); said article having a coating of one or more powder(s) selected from talc, silicon dioxide, amorphous silica, and silicone fluid.

25. A fishing bait comprising a non-tacky article in the shape of a prey for presentation in fresh or salt water made from a soft gelatinous elastomer composition comprising (I) 100 parts by weight of one or more of a linear, radial or multiblock poly(styrene-ethylene-butylene)$_n$, poly(styrene-butadiene)$_n$, poly(styrene-isoprene-styrene)$_n$, poly(styrene-ethylene-butylene)$_n$, poly(styrene-ethylene-propylene)$_n$ copolymer(s), wherein n is greater than one;

(II) one or more low viscosity first plasticizer(s) with one or more high viscosity second plasticizer(s); said selected first and second plasticizers being in sufficient amounts to achieve a gel rigidity of from about 20 gram Bloom to about 800 gram Bloom; said article having a coating of one or more powder(s) selected from talc, silicon dioxide, amorphous silica, and silicone fluid.

* * * * *